(12) United States Patent  (10) Patent No.: US 8,792,026 B2
Kiyama et al.  (45) Date of Patent: Jul. 29, 2014

(54) VIDEO DATA REPRODUCING APPARATUS AND METHOD UTILIZING ACQUIRED DATA STRUCTURE INCLUDING VIDEO DATA AND RELATED REPRODUCTION INFORMATION, AND NON-TRANSITORY RECORDING MEDIUM STORING CONTROL PROGRAM FOR CAUSING COMPUTER TO OPERATE AS REPRODUCING APPARATUS

(75) Inventors: Jiro Kiyama, Chiba (JP); Hideaki Kizuki, Chiba (JP); Katsushi Ohizumi, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 953 days.

(21) Appl. No.: 12/798,242

(22) Filed: Mar. 30, 2010

(65) Prior Publication Data

US 2010/0189406 A1    Jul. 29, 2010

Related U.S. Application Data

(63) Continuation of application No. 10/575,431, filed as application No. PCT/JP2004/014954 on Oct. 8, 2004, now Pat. No. 8,233,770.

(30) Foreign Application Priority Data

| | | |
|---|---|---|
| Oct. 10, 2003 | (JP) | 2003-352932 |
| Jul. 12, 2004 | (JP) | 2004-205234 |
| Aug. 6, 2004 | (JP) | 2004-231734 |
| Aug. 9, 2004 | (JP) | 2004-232677 |
| Sep. 10, 2004 | (JP) | 2004-264721 |
| Oct. 1, 2004 | (JP) | 2004-290771 |
| Oct. 8, 2004 | (JP) | 2004-296073 |

(51) Int. Cl.
*H04N 9/80* (2006.01)

(52) U.S. Cl.
USPC .......................................................... 348/248

(58) Field of Classification Search
USPC .......... 386/248, 291, 239, 240, 241, 201, 228
See application file for complete search history.

(56) References Cited

U.S. PATENT DOCUMENTS

| | | |
|---|---|---|
| 5,903,775 A | 5/1999 | Murray |
| 5,931,908 A | 8/1999 | Gerba et al. |

(Continued)

FOREIGN PATENT DOCUMENTS

| | | |
|---|---|---|
| CN | 1111463 A | 11/1995 |
| EP | 0660298 A1 | 6/1995 |

(Continued)

OTHER PUBLICATIONS

U.S. Office Action dated Dec. 27, 2011 for U.S. Appl. No. 10/575,431.

(Continued)

*Primary Examiner* — David Harvey
(74) *Attorney, Agent, or Firm* — Edwards Wildman Palmer LLP; David G. Conlin; David A. Tucker

(57) ABSTRACT

A video disk player includes (i) a disk reading section for reading out video data, a program, synchronization timing information from an optical disk; (ii) a clock for generating a clock signal; (iii) a decoder for converting, in accordance with the clock signal, the video data into decompressed video data for reproduction output; (iv) a video reproducing section including a synchronization control section for transmitting, in accordance with the clock signal, a synchronization control signal to the program executing section at a timing specified by a field timing contained in the synchronization timing information, and (v) a program executing section for executing a program in accordance with the synchronization control signal received from the synchronization control section. This makes it possible to efficiently execute the program in synchronization with reproduction of AV data or the like.

4 Claims, 33 Drawing Sheets

(56) References Cited

U.S. PATENT DOCUMENTS

| | | | |
|---|---|---|---|
| 6,067,400 | A | 5/2000 | Saeki et al. |
| 6,173,317 | B1 | 1/2001 | Chaddha et al. |
| 6,181,871 | B1 | 1/2001 | Saeki et al. |
| 6,208,802 | B1 | 3/2001 | Mori et al. |
| 6,219,488 | B1 | 4/2001 | Mori et al. |
| 6,222,805 | B1 | 4/2001 | Mori et al. |
| 6,239,793 | B1* | 5/2001 | Barnert et al. ............... 715/201 |
| 6,285,823 | B1 | 9/2001 | Saeki et al. |
| 6,297,797 | B1 | 10/2001 | Takeuchi et al. |
| 6,389,221 | B1 | 5/2002 | Saeki et al. |
| 6,404,418 | B1 | 6/2002 | Leem |
| 6,411,338 | B1 | 6/2002 | Neill |
| 6,526,223 | B1 | 2/2003 | Mori et al. |
| 6,564,006 | B1 | 5/2003 | Mori et al. |
| 6,574,419 | B1 | 6/2003 | Nonomura et al. |
| 6,580,870 | B1 | 6/2003 | Kanazawa et al. |
| 6,662,060 | B1* | 12/2003 | Maliszewski et al. ......... 700/94 |
| 6,678,463 | B1 | 1/2004 | Pierre et al. |
| 7,000,245 | B1 | 2/2006 | Pierre et al. |
| 7,222,155 | B1 | 5/2007 | Gebhardt et al. |
| 7,346,920 | B2 | 3/2008 | Lamkin et al. |
| 7,440,675 | B2 | 10/2008 | Kanazawa et al. |
| 7,561,779 | B2 | 7/2009 | Yahata et al. |
| 7,617,518 | B2 | 11/2009 | Jung et al. |
| 7,620,895 | B2 | 11/2009 | Adkins et al. |
| 7,634,787 | B1 | 12/2009 | Gebhardt et al. |
| 7,930,624 | B2 | 4/2011 | Phillips et al. |
| 7,945,141 | B2 | 5/2011 | Jung et al. |
| 8,233,770 | B2 | 7/2012 | Kiyama et al. |
| 8,244,099 | B2 | 8/2012 | Kakumu et al. |
| 2001/0010757 | A1 | 8/2001 | Mori et al. |
| 2002/0021887 | A1 | 2/2002 | Yoshikawa |
| 2002/0106193 | A1 | 8/2002 | Park et al. |
| 2002/0110368 | A1 | 8/2002 | Mori et al. |
| 2002/0110369 | A1 | 8/2002 | Mori et al. |
| 2002/0127002 | A1 | 9/2002 | Mori et al. |
| 2002/0127003 | A1 | 9/2002 | Mori et al. |
| 2002/0135607 | A1 | 9/2002 | Kato et al. |
| 2002/0135608 | A1 | 9/2002 | Hamada et al. |
| 2002/0145702 | A1 | 10/2002 | Kato et al. |
| 2002/0150383 | A1 | 10/2002 | Kato et al. |
| 2002/0164152 | A1 | 11/2002 | Kato et al. |
| 2002/0186485 | A1 | 12/2002 | Cho et al. |
| 2002/0188628 | A1 | 12/2002 | Cooper et al. |
| 2002/0194618 | A1 | 12/2002 | Okada et al. |
| 2003/0007780 | A1 | 1/2003 | Senoh |
| 2003/0090711 | A1 | 5/2003 | Yoshii et al. |
| 2003/0095794 | A1 | 5/2003 | Chung et al. |
| 2003/0103604 | A1 | 6/2003 | Kato et al. |
| 2003/0108338 | A1 | 6/2003 | Nonomura et al. |
| 2003/0113096 | A1 | 6/2003 | Taira et al. |
| 2003/0161615 | A1 | 8/2003 | Tsumagari et al. |
| 2003/0175014 | A1 | 9/2003 | Mori et al. |
| 2003/0175016 | A1 | 9/2003 | Mori et al. |
| 2003/0208771 | A1 | 11/2003 | Hensgen et al. |
| 2003/0208778 | A1 | 11/2003 | Aratani et al. |
| 2003/0229899 | A1 | 12/2003 | Thompson et al. |
| 2004/0015984 | A1 | 1/2004 | Yamamoto et al. |
| 2004/0047588 | A1* | 3/2004 | Okada et al. ............... 386/46 |
| 2004/0120694 | A1 | 6/2004 | Hamada et al. |
| 2004/0126096 | A1* | 7/2004 | Moon et al. ................ 386/95 |
| 2004/0175154 | A1 | 9/2004 | Yoon et al. |
| 2004/0213552 | A1 | 10/2004 | Kato |
| 2005/0019007 | A1 | 1/2005 | Kato et al. |
| 2005/0022226 | A1 | 1/2005 | Ackley et al. |
| 2005/0025459 | A1 | 2/2005 | Kato et al. |
| 2005/0025461 | A1 | 2/2005 | Kato et al. |
| 2005/0152681 | A1 | 7/2005 | Jung et al. |
| 2005/0188408 | A1 | 8/2005 | Wallis et al. |
| 2005/0201732 | A1 | 9/2005 | Nonomura et al. |
| 2006/0136982 | A1 | 6/2006 | Martinolich et al. |
| 2006/0143666 | A1 | 6/2006 | Okada et al. |
| 2006/0239147 | A1 | 10/2006 | Mori et al. |
| 2006/0239148 | A1 | 10/2006 | Mori et al. |
| 2006/0239149 | A1 | 10/2006 | Mori et al. |
| 2006/0239150 | A1 | 10/2006 | Mori et al. |
| 2006/0239647 | A1 | 10/2006 | Mori et al. |
| 2006/0239662 | A1 | 10/2006 | Nonomura et al. |
| 2006/0239663 | A1 | 10/2006 | Nonomura et al. |
| 2007/0122118 | A1 | 5/2007 | Seo et al. |
| 2007/0172207 | A1 | 7/2007 | Cho et al. |
| 2007/0217296 | A1 | 9/2007 | Kato et al. |
| 2007/0217297 | A1 | 9/2007 | Kato et al. |
| 2007/0286577 | A1 | 12/2007 | Kato et al. |
| 2008/0010342 | A1 | 1/2008 | Gebhardt et al. |
| 2008/0112685 | A1 | 5/2008 | Kato |
| 2009/0148123 | A1 | 6/2009 | Kato |
| 2010/0080534 | A1 | 4/2010 | Kato et al. |

FOREIGN PATENT DOCUMENTS

| | | |
|---|---|---|
| EP | 0751515 A2 | 1/1997 |
| EP | 0898279 A2 | 2/1999 |
| EP | 0915470 A2 | 5/1999 |
| EP | 0949619 A2 | 10/1999 |
| EP | 0961279 A1 | 12/1999 |
| EP | 0967799 A1 | 12/1999 |
| EP | 0969472 A1 | 1/2000 |
| EP | 0982725 A2 | 3/2000 |
| EP | 1193981 A2 | 4/2002 |
| EP | 1249835 A2 | 10/2002 |
| EP | 1251514 A2 | 10/2002 |
| EP | 1293982 A1 | 3/2003 |
| EP | 1308956 A1 | 5/2003 |
| EP | 1 534 004 | 5/2005 |
| JP | 10/70718 A | 3/1998 |
| JP | 10-285460 | 10/1998 |
| JP | 11-041563 A | 2/1999 |
| JP | 11-053528 A | 2/1999 |
| JP | 11-120749 A | 4/1999 |
| JP | 11-136611 | 5/1999 |
| JP | 11-146362 | 5/1999 |
| JP | 11-176087 | 7/1999 |
| JP | 11-215460 A | 8/1999 |
| JP | 11-238367 A | 8/1999 |
| JP | 11-341443 A | 12/1999 |
| JP | 2000/59724 A | 2/2000 |
| JP | 2000-175142 | 6/2000 |
| JP | 2000-278635 | 10/2000 |
| JP | 2000/333126 A | 11/2000 |
| JP | 2000-353353 A | 12/2000 |
| JP | 2001-110170 A | 4/2001 |
| JP | 2001-118360 A | 4/2001 |
| JP | 2001-251589 A | 9/2001 |
| JP | 2001-346144 A | 12/2001 |
| JP | 2002-10215 | 1/2002 |
| JP | 2002-044589 A | 2/2002 |
| JP | 2002-056651 A | 2/2002 |
| JP | 2002-057990 | 2/2002 |
| JP | 2002/091625 A | 3/2002 |
| JP | 2002-157859 A | 5/2002 |
| JP | 2002-158965 A | 5/2002 |
| JP | 2002-158971 A | 5/2002 |
| JP | 2002-158972 A | 5/2002 |
| JP | 2002-158974 A | 5/2002 |
| JP | 2002-159004 A | 5/2002 |
| JP | 2002-163865 A | 6/2002 |
| JP | 2002/238032 A | 8/2002 |
| JP | 2002-278993 A | 9/2002 |
| JP | 2002-359816 A | 12/2002 |
| JP | 2002-369154 A | 12/2002 |
| JP | 2003-6979 | 1/2003 |
| JP | 2003-009090 | 1/2003 |
| JP | 2003-9090 A | 1/2003 |
| JP | 2003-501965 A | 1/2003 |
| JP | 2003/502920 T | 1/2003 |
| JP | 2003-061055 A1 | 2/2003 |
| JP | 2003-123389 A | 4/2003 |
| JP | 2003-134436 A | 5/2003 |
| JP | 2003-250118 | 9/2003 |
| JP | 2003-264793 A | 9/2003 |
| JP | 2003-274306 A | 9/2003 |
| JP | 2003-289506 A | 10/2003 |
| JP | 2004/536480 T | 12/2004 |

(56) References Cited

FOREIGN PATENT DOCUMENTS

| WO | WO-98/47288 | | 10/1998 |
|---|---|---|---|
| WO | WO-00/68840 | | 11/2000 |
| WO | WO0076213 | A1 | 12/2000 |
| WO | WO-02/37841 | A1 | 5/2002 |
| WO | WO 02/058383 | A1 | 7/2002 |
| WO | WO-02-075739 | A1 | 9/2002 |
| WO | WO-2004/019318 | A2 | 3/2004 |
| WO | WO-2004/025651 | A1 | 3/2004 |

OTHER PUBLICATIONS

Tanebaum, Andrew; "Structured Computer Organization", Prentice Hall, Englewood, California, 1984, pp. 10-12.
U.S. Office Action dated May 9, 2011 for U.S. Appl. No. 10/575,431.
U.S. Office Action dated Feb. 16, 2011 for U.S. Appl. No. 10/575,431.
Search Report for corresponding European Patent Application No. 10158506.5 dated Jun. 21, 2010.
Search Report for corresponding European Patent Application No. 10158507.3 dated Jun. 25, 2010.
"Digital Video Broadcasting . . . " ETSI Standards, LIS, Sophia Antipolis Cedex, France, Jun. 1, 2002.
U.S. Office Action dated Sep. 15, 2011 for U.S. Appl. No. 10/575,431.
U.S. Office Action dated Oct. 12, 2012 for U.S. Appl. No. 12/798,241.
Notice of Allowance issued on issued on Jun. 17, 2013 for co-pending related U.S. Appl. No. 12/798,241.
Notice of Allowance issued on Jun. 25, 2013 for co-pending related U.S. Appl. No. 12/798,237.
Notice of Allowance issued on Aug. 30, 2013 for co-pending related U.S. Appl. No. 12/798,245.
U.S. Office Action dated Mar. 27, 2013 for U.S. Appl. No. 12/798,245.
"Petition for Rulemaking" by CBS to the FCC, Jul. 29, 1980.
U.S. Office Action dated Mar. 14, 2013 for U.S. Appl. No. 12/798,243.
U.S. Office Action dated Mar. 26, 2013 for U.S. Appl. No. 12/798,237.
U.S. Office Action dated Oct. 31, 2013 for U.S. Appl. No. 12/798,243.
Sharp Service Manual; "Sharp DVD video player Models DV-SL10S(G), DV-SL10W, DV-SL10, DV-SL10X, DV-SL10S(Q), DV-SL10(S), DV-SL10(RU)".
Notice of Allowance issued on Apr. 3, 2014 for U.S. Appl. No. 12/798,243.
Office Action for U.S. Appl. No. 13/430,967 (Jun. 4, 2014).

* cited by examiner

FIG. 5(a)

```
SYNCHRONIZATION TIMING INFORMATION {
        number_of_sync_info;
        for (i=0; i < number_of_sync_info; i++){
                sync_info();
        }
}
```

FIG. 5(b)

```
sync_info() {
        timing;
        target;
        action_id;
}
```

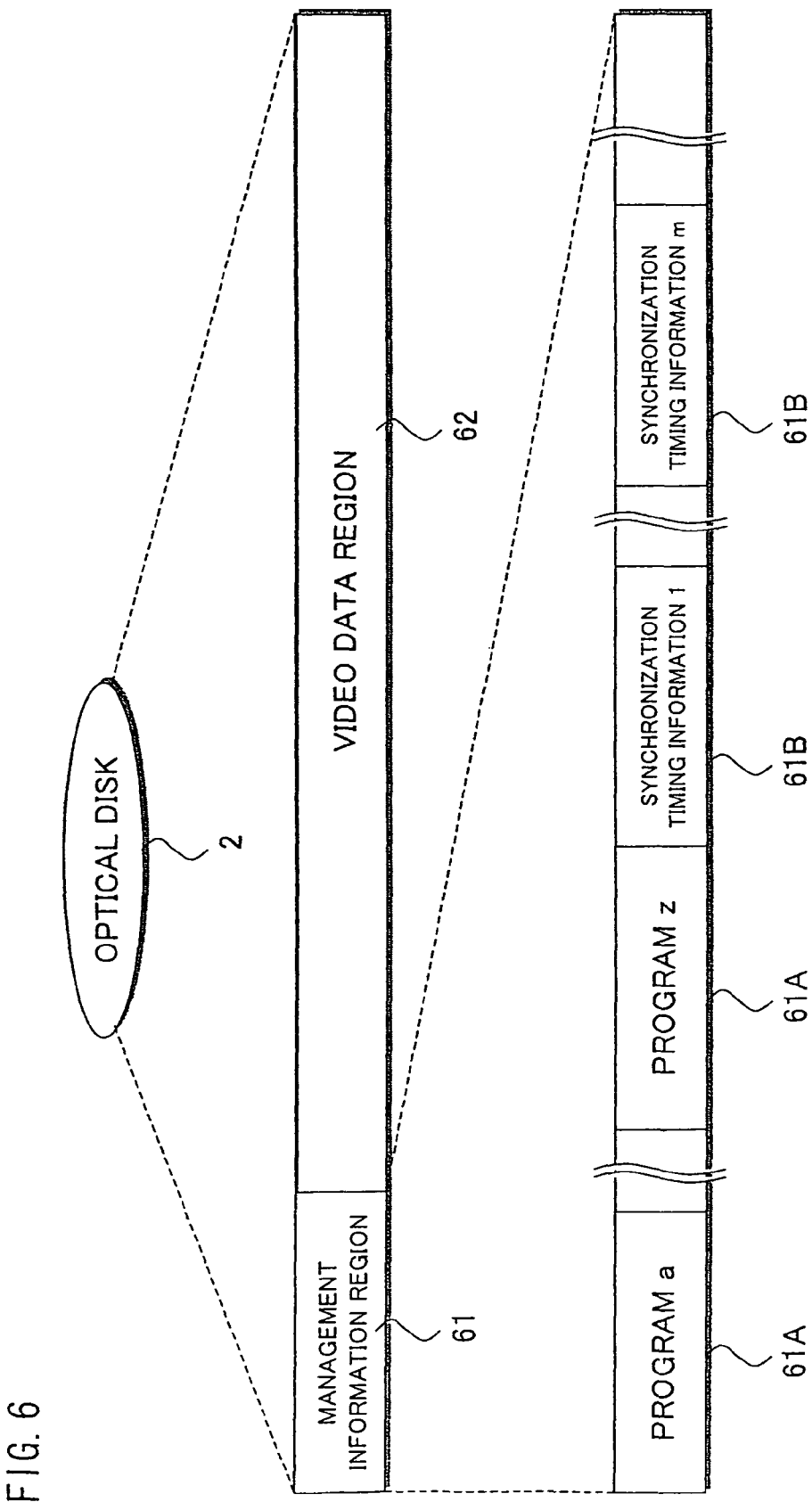

| entry no | timing | target | action_id |
|---|---|---|---|
| 1 | T1 | PROGRAM EXECUTING SECTION | A1 |
| 2 | T2 | OUTPUT CONTROL SECTION | SWITCH TO DISPLAY BUFFER MEMORY #1 |
| 3 | T3 | PROGRAM EXECUTING SECTION | A2 |
| 4 | T4 | OUTPUT CONTROL SECTION | SWITCH TO DISPLAY BUFFER MEMORY #2 |
| 5 | T5 | OUTPUT CONTROL SECTION | END OUTPUTTING |
| 5 | T6 | PROGRAM EXECUTING SECTION | A3 |

```
SYNCHRONIZATION TIMING INFORMATION {
    number_of_sync_info;
    for (i=0; i < number_of_sync_info; i++) {
        sync_info();
    }
}
```

FIG. 12(a)

```
sync_info() {
    timing;
    target;
    action_id;
    independent_flag;
    merged_flag;
}
```

FIG. 12(b)

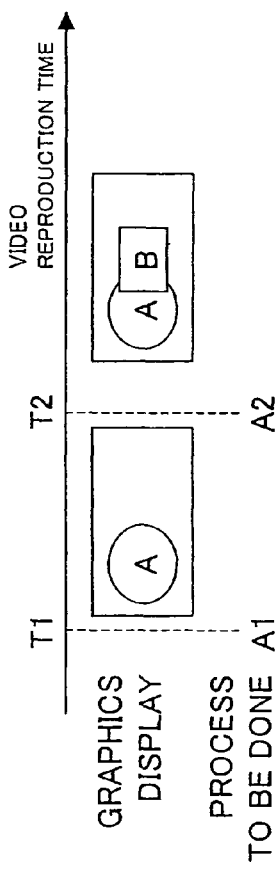
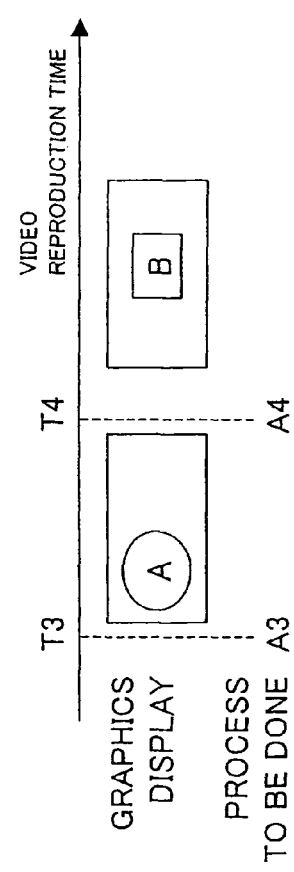
FIG. 13 (a)
FIG. 13 (b)
FIG. 13 (c)
FIG. 13 (d)

FIG. 17

| entry no | timing | action_id | independent_flag | merged_flag |
|---|---|---|---|---|
| 1 | T1 | A1 (DRAW GRAPHICS A AT COORDINATE x) | 1 | 0 |
| 2 | T2 | A2 (RELOCATE GRAPHICS A TO COORDINATE y) | 0 | 0 |
| 3 | T2 | A3 (DRAW GRAPHICS A TO COORDINATE y) | 0 | 1 |
| 4 | T3 | A4 (CANCEL DISPLAY AND DRAW GRAPHICS C AT COORDINATE z) | 1 | 0 |
| 5 | T4 | A5 (DRAW GRAPHICS D AT COORDINATE w) | 0 | 0 |

FIG. 18(a)

```
sync_info() {
        timing;
        target;
        action_id;
        condition();
}
```

FIG. 18(b)

```
condition() {
        normal;
        FF;
        FR;
        SF;
        SR;
}
```

FIG. 22 (a)

```
PROGRAM MANAGEMENT TABLE {
        number_of_pmi;
        for (i=0; I < number_of_pmi){
                PROGRAM MANAGEMENT INFORMATION ()
        }
}
```

FIG. 22 (b)

```
PROGRAM MANAGEMENT INFORMATION() {
        program_file_name;
        playback_control_mode;
        is_video_specified;
        if( is_video_specified == 1 ){
                video_file_name;
                start_mode;
        }
        menu_flag;
        resume_flag;
}
```

FIG. 30(a)
```
PROGRAM MANAGEMENT INFORMATION () {
    program_file_name;
    number_of_video_info;
    for (i=0; i < number_of_video_info; i++) {
        video_info();
    }
}
```

FIG. 30(b)
```
video_info() {
    video_file_name;
    certificate;
}
```

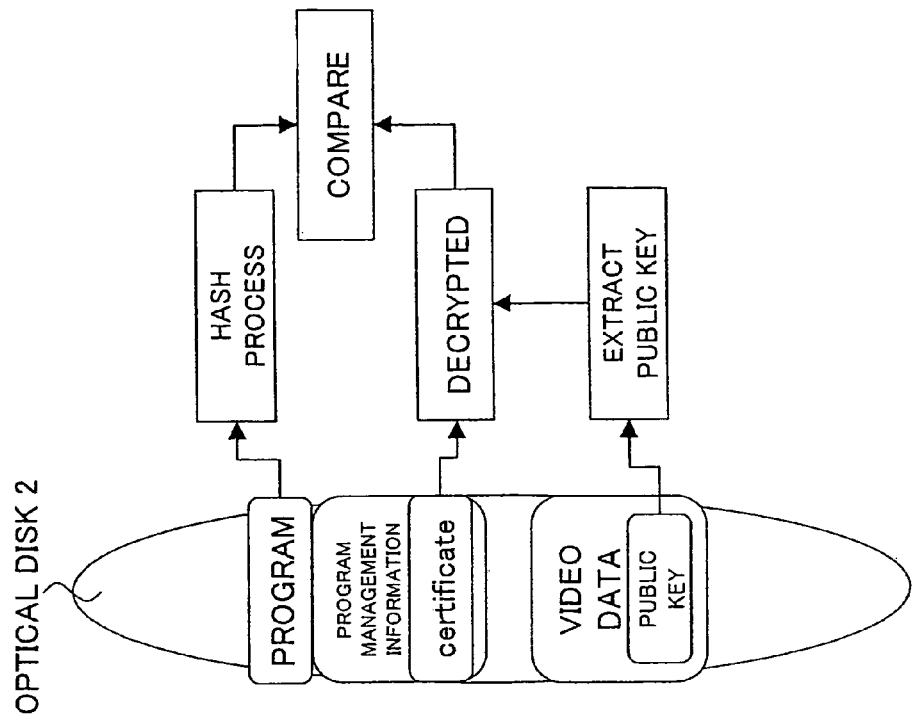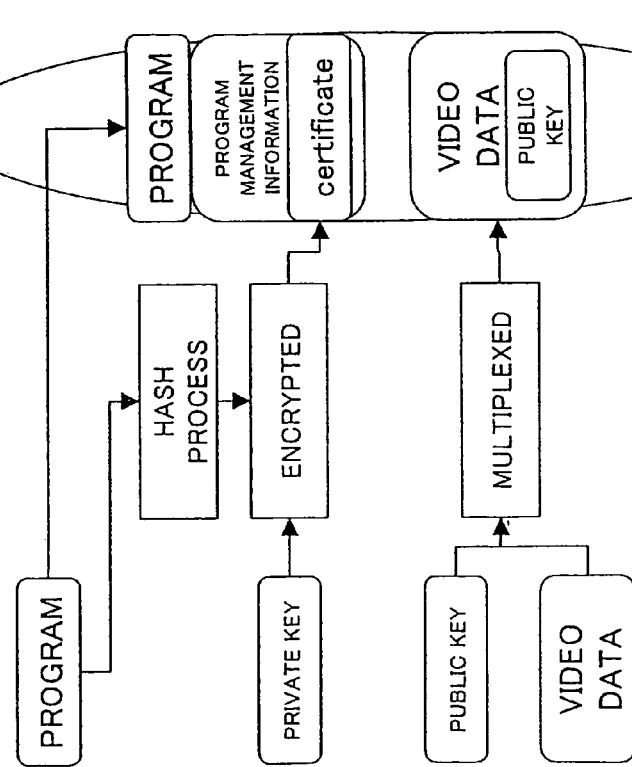
FIG. 31 (b)
FIG. 31 (a)

VIDEO DATA REPRODUCING APPARATUS AND METHOD UTILIZING ACQUIRED DATA STRUCTURE INCLUDING VIDEO DATA AND RELATED REPRODUCTION INFORMATION, AND NON-TRANSITORY RECORDING MEDIUM STORING CONTROL PROGRAM FOR CAUSING COMPUTER TO OPERATE AS REPRODUCING APPARATUS

This application is a continuation of copending U.S. patent application Ser. No. 10/575,431, entitled by Jiro Kiyama, Hideaki Kizuki, and Katsushi Ohizumi, the same inventors as the inventors of this continuation application filed on 10 Apr. 2006, which application claims the benefit of International Patent Application No. PCT/JP2004/014954, filed 8 Oct. 2004; Japanese Patent Applications Nos. JP 2003-352932, filed on 10 Oct. 2003; JP 2004/205234, filed 12 Jul. 2004; JP 2004/231734, filed 6 Aug. 2004; JP 2004/232677, filed 9 Aug. 2004; JP 2004/264721, filed 10 Sep. 2004; JP 2004/290771, filed 1 Oct. 2004 and JP 2004/296073, filed on 8 Oct. 2004.

TECHNICAL FIELD

The present invention relates to (i) a reproducing apparatus using computer software for controlling video reproduction (playback), (ii) a method for controlling the reproducing apparatus, (iii) a content recording medium, (iv) a data structure, (v) a control program, and (vi) a computer-readable recording medium storing the control program.

BACKGROUND ART

In recent years, for attainment of higher interactivity, AV (audio visual) devices have begun to adopt a platform in which a versatile program language can be executed. A typical example thereof is the MHP (Multimedia Home Platform) adopting Java® language. See Japanese Unexamined Patent Publication Tokukai 2001-103383 (published on Apr. 13, 2001; hereinafter, referred to as "Patent document 1"), for example.

Described in Patent document 1 is a television display apparatus that is so made as to have (i) various control functions, and (ii) an interface which is simple for a user. Specifically, the television display apparatus includes: (i) a memory for storing a plurality of control images, and for continuously storing major files; (ii) an event selector for correlating an event with selected one of the control images; (iii) an action selector for correlating an action with the selected control image; (iv) a display section for detecting the event and for displaying, in accordance with the detected event, the selected control image during a predetermined period such that the selected control image is overlaid with a currently viewed television service; (v) a command section for starting the action in response to a control command supplied by an input apparatus during the predetermined period. The command section causes display of a content of a major file corresponding to each major image displayed in response to the major command supplied by the input apparatus during the predetermined period. The content of the major file is so displayed as to be overlaid with the currently viewed television service.

The present invention and Patent document 1 are similar in that a computer program language such as Java® is used for the control of the video reproduction. However, Patent document 1 targets for broadcasting, whereas the present invention targets for a disk and the like. Moreover, Patent document 1 does not disclose the following major features (1) through (3) of the present invention:

(1) an apparatus structure and a data structure, each of which makes it possible to control, at a video frame precision, start and end of a process to be done by the program;

(2) an apparatus structure and a data structure, each of which allows for time specifying (designation) reproduction and a resuming process; and (3) an apparatus structure and a data structure, each of which makes it possible to avoid overhead occurring due to execution of the program.

FIG. 35 is a function block diagram schematically illustrating a structure of a conventional AV device having the versatile program language executing platform. In cases where such a versatile program language executing platform is adopted in the AV device as shown in FIG. 35, the AV device is made up of a program executing section 101, a video reproducing section 102 for decoding video data, and a combining section 103. The combining section 103 overlays respective outputs of the program executing section 101 and the video reproducing section 102 with each other. Generally, in view of cost and realtimeness, the video reproducing section 102 is hardware installed in the AV device.

However, it is difficult for such a conventional AV device to start displaying, from a specific video frame in time-sequential video reproduction, a graphics and an animation each generated by using the program, and to end the displaying at a specific video frame therein. This is because a program using an advanced computer language (high-level language) operates slowly in general. Especially, a program using Java® language is executed on a virtual machine. Moreover, a garbage collection process is carried out so as to free a used memory. This makes it difficult to secure real-time processing. Further, for synchronization of the graphics with the video at each frame, polling needs to be carried out at time shorter than the frame rate. Accordingly, the overhead due to the program becomes large. Further, software is required to check a clock value, for the sake of starting the display of the graphics from a specific timing and ending the display at a specific timing in the video reproduction. Accordingly, the overhead becomes large in the processing. This makes it difficult that each timing at which the display of the graphics is started and ended corresponds to the specific timing at each frame in the video reproduction. This is inefficient in terms of the processing.

Further, when starting the reproduction from an arbitrary time point of the video, it is difficult for the conventional AV device to display the graphics on a target time point such that the graphics are accurately overlaid with the video. A reason of this is as follows. That is, each of timings of appearance (display) and disappearance (non-display) of the graphics is controlled in accordance with a value found by polling the clock during the video reproduction. Therefore, when starting the reproduction from the target time point, a clock change having occurred in starting the reproduction needs to be produced again. In other words, the display of the graphics at the target time point requires time corresponding to a period of time from the beginning of the video to the target reproduction start time.

Further, the program executing section 101 controls the video reproducing section 102 of the conventional AV device in accordance with a specified program. Accordingly, the following problems (1) and (2) arise: (1) it takes longer time to start the video reproduction as compared with the time taken to reproduce conventional DVD Video with no use of Java® language; (2) a response to a user manipulation (such as "Jump to the next chapter") is slow. The problem (1) occurs as follows. That is, the program has a description for controlling the start of reproducing the video data. Therefore, until the program is launched and executed up to the description for controlling the start of reproducing the video data, no instruction for controlling the start of reproducing the video data is sent to the video reproducing section 102. In other words, the problem (1) occurs due to the overhead caused by the program executing section 101. On the other hand, the problem (2) occurs due to such an overhead that: the program executing section 101 receives the user manipulation, and then the program converts the user manipulation into a reproduction control instruction to be supplied to the video reproducing section 102, and then the reproduction is carried out. Further, in cases where the aforementioned garbage collection process is carried out during the reproduction start process and the user manipulation interpreting process, the response to the user manipulation is possibly further delayed.

Further, the conventional AV device does not allow for the "resuming" process currently realized in the DVD. The wording "resuming (resume)" refers to a function for resuming reproduction of a content from a point at which previous reproduction thereof was suspended due to menu readout carried out by the user. The reproduction of the content is resumed when the user carries out manipulation of returning from the menu to the previous reproduction condition.

Further, the conventional AV device does not take into consideration that contents respectively provided by a plurality of content providers are stored in the same recording medium. Consider an example in which providers A and B provide contents in one optical disk. In this case, video data of the provider B needs to be prevented from being intentionally reproduced without approval (authorization) by a program of the provider A, or from being reproduced without approval by a bug of the program thereof. However, the conventional AV device does not provide a structure for dealing with such a case.

The present invention is made in light of the problems, and its first object is to provide (i) a reproducing apparatus which can effectively execute a program in synchronism with reproduction of AV data or the like; (ii) a method for controlling the reproduction apparatus; (iii) a content recording medium; (iv) a data structure; (v) a control program; and (vi) a computer-readable recording medium storing the control program. Its second object is to provide a reproducing apparatus, a method for controlling the reproducing apparatus, a content recording medium, a data structure, a control program, and a computer-readable recording medium storing the control program, whereby unauthorized reproduction (playback) can be prevented.

DISCLOSURE OF INVENTION

To achieve the object, a reproducing apparatus according to the present invention includes: (a) data acquiring means for acquiring content data and synchronization timing information items; (b) clock generating means for generating a clock signal; (c) decoding means for converting, in accordance with the clock signal, the content data into reproduction data for reproduction output; (d) synchronization control means for transmitting synchronization control signals to synchronization processing means, in accordance with the clock signal, at timings specified by timing specifying information items included in the synchronization timing information items, respectively; and (e) the synchronization processing means for carrying out a process in accordance with each of the synchronization control signals received from the synchronization control means.

Further, a method, according to the present invention, for controlling a reproducing apparatus including data acquiring means, decoding means, and synchronization processing means, includes the steps of: (a) causing the data acquiring means to acquire content data and synchronization timing information; (b) causing the decoding means to (i) convert, in accordance with the clock signal, the content data into reproduction data for reproduction output, and (ii) send a synchronization control signal to the synchronization processing means in accordance with the clock signal at a timing specified by timing specifying information included in the synchronization timing information; and (c) causing the synchronization processing means to carry out a process in accordance with the synchronization control signal.

The above arrangements make it possible to supply, to the synchronization processing means, the synchronization control signal (trigger) that specifies the timing at which the process is carried out. The supply of the synchronization control signal is carried out in synchronization with the reproduction process that the decoding means carries out with respect to the content data. Here, examples of the "process" to be carried out by the synchronization processing means include: a process of controlling data outputting, a process of executing a program, and the like.

This makes it easier to (i) carry out a process to be carried out in synchronization with the reproduction process of the content data, and to be carried out concurrently with the supply of the content data; and (ii) add a process to be carried out in synchronization with the reproduction process of the content data, and to be carried out after the supply of the content data. Further, the stream synchronization processing means does not need to check the reproduction clock of the decoding means, so that no load is imposed for the synchronization on the synchronization processing means. This makes it possible to flexibly create a content.

Further, a reproducing apparatus according to the present invention includes: data acquiring means for acquiring content data and a synchronization executing program; program executing means for executing the synchronization executing program; clock generating means for generating a clock signal; decoding means for converting, in accordance with the clock signal, the content data into reproduction data for reproduction output; synchronization control means for transmitting a synchronization control signal to the program executing means at a predetermined timing in accordance with the clock signal; and input means for receiving reproduction control manipulation from outside, and for converting the reproduction control manipulation into reproduction control information, the decoding means being controlled in accordance with the reproduction control information sent from the input means, the program executing means executing the synchronization executing program in accordance with at least the synchronization control signal sent from the synchronization control means.

Further, a method, according to the present invention, for controlling a reproducing apparatus including data acquiring means, program executing means, clock generating means, decoding means, synchronization control means, and input means, includes the steps of: (A) causing the data acquiring means to acquire content data and a synchronization executing program; (B) causing the program executing means to execute the synchronization executing program; (C) causing the clock generating means to generate a clock signal; (D) causing the decoding means to convert, in accordance with the clock signal, the content data into reproduction data for reproduction output; (E) causing the synchronization control means to transmit a synchronization control signal to the program executing means at a predetermined timing in accordance with the clock signal; and (F) causing the input means to (i) receive reproduction control manipulation from outside, and (ii) convert the reproduction control manipulation into reproduction control information, in the step (D), the decoding means being controlled in accordance with the reproduction control information sent from the input means, in the step (B), the program executing means executing the synchronization executing program in accordance with at least the synchronization control signal sent from the synchronization control means.

The above arrangements make it possible to (i) execute the synchronization executing program in synchronization with the reproduction of the content data; and (ii) control the content reproduction, without using the synchronization executing program, in accordance with the reproduction control manipulation (user's manipulation) supplied from outside. This eliminates the overhead occurring when the synchronization executing program is used for the control of the content reproduction, with the result that responsiveness to the user's reproduction control manipulation can be improved. Here, the "predetermined timing" at which the synchronization control means sends the synchronization control signal to the program executing means corresponds to, e.g., either (i) a timing at which the reproduction of the content data is ended, or (ii) a timing specified by the synchronization timing information.

Further, a reproducing apparatus according to the present invention includes: data acquiring means for acquiring content data items, synchronization executing programs, and program management information items; decoding means for converting each of the content data items to reproduction data for reproduction output; program executing means for executing each of the synchronization executing programs, each of the program management information items including (i) a program specifying information item for specifying a program to be simultaneously used for the reproduction output together with a content data item, and (ii) a content data specifying information item for specifying the content data item to be simultaneously used for the reproduction output together with the program, the reproducing apparatus, further including: general control means for (i) instructing the program executing means to execute the synchronization executing program specified by the program specifying information item, and either (ii) instructing the decoding means to convert the content data item specified by the content specified information item, or (iii) instructing the data acquiring means to acquire the content data item specified by the content specifying information item.

Further, a method, according to the present invention, for controlling a reproducing apparatus including decoding means, program executing means, and data acquiring means, includes the steps of: causing the data acquiring means to acquire content data items, synchronization executing programs, and program management information items; causing decoding means to convert each of the content data items to reproduction data for reproduction output; causing the program executing means to execute each of the synchronization executing programs, each of the program management information items including (i) a program specifying information item for specifying a program to be simultaneously used for the reproduction output together with a content data item, and (ii) a content data specifying information item for specifying the content data item to be simultaneously used for the reproduction output together with the program, the method, further including the step of: instructing the program executing means to execute the synchronization executing program specified by the program specifying information item, and either (ii) instructing the decoding means to convert the content data item specified by the content specified information item, or (iii) instructing the data acquiring means to acquire the content data item specified by the content specifying information item.

The above arrangements make it possible that the readout of the content data item from the medium, the decoding thereof, the reproduction thereof are carried out independently from the execution of the synchronization executing program, with the result that time required in starting the reproduction of the content data item can be shortened. Especially, the content data item can be read out prior to the completion of the interpretation of the synchronization executing program by instructing the data acquiring means to acquire the content data item. Note that, in the above arrangements, the synchronization executing program is not limited to a program for generating the output data.

Further, a reproducing apparatus according to the present invention includes: data acquiring means for acquiring content data items, a synchronization executing program, and program management information; decoding means for converting each of the content data items into reproduction data for reproduction output; and program executing means for executing the synchronization executing program, the program management information including at least content data specifying information for specifying a content data item which is simultaneously used for the reproduction output together with the synchronization executing program, the reproducing apparatus, further including: verifying means for verifying whether or not the content data item which the synchronization executing program instructs the decoding means to decode is the content data item specified by the program management information.

Further, a method, according to the present invention, for controlling a reproducing apparatus including decoding means, program executing means, data acquiring means, and verifying means, includes the steps of: causing the data acquiring means to acquire content data items, a synchronization executing program, and program management information; causing the decoding means to convert each of the content data items into reproduction data for reproduction output; and causing the program executing means to execute the synchronization executing program, the program management information including at least content data specifying information for specifying a content data item which is simultaneously used for the reproduction output together with the synchronization executing program, the method, further including the step of: causing the verifying means to verify whether or not the content data item which the synchronization executing program instructs the decoding means to decode is the content data item specified by the program management information.

The above arrangements make it possible to verify whether or not the content data item to be reproduced by using the synchronization executing program is the content data item specified by the content data specifying information. This makes it possible to detect a reproduction operation carried out by a program that is not approved to reproduce the content data, with the result that the content data can be prevented from being reproduced without authorization. Note that, in the above arrangements, the synchronization executing program is not limited to a program for generating the output data.

Further, the following can be attained by arranging the reproducing apparatus such that the synchronization executing program can reproduce only the content data item specified (declared) by the content data specifying information of the content management information. That is, the copyright holder of the content data item does not need to execute the synchronization executing program so as to check unauthorized use of the content data. In other words, the copyright holder of the content data item can check the unauthorized use of the content data by merely checking the static information, i.e., the content data specifying information provided outside the synchronization executing program.

Further, a reproducing apparatus according to the present invention includes: data acquiring means for acquiring content data items, a synchronization executing program, program management information, and verification-use information; decoding means for converting each of the content data items into reproduction data for reproduction output; and program executing means for executing the synchronization executing program, the program management information including at least authorization information which approves use of a content data item that is simultaneously used for the reproduction output together with the synchronization executing program, the reproducing apparatus, further including: verifying means for verifying, by using the verification-use information, authorization information of the content data item which the synchronization executing program instructs the decoding means to decode.

Further, a method, according to the present invention, for controlling a reproducing apparatus including decoding means, program executing means, data acquiring means, and verifying means, includes the steps of: causing the data acquiring means to acquire content data items, a synchronization executing program, program management information, and verification-use information; causing the decoding means to convert each of the content data items into reproduction data for reproduction output; and causing the program executing means to execute the synchronization executing program, the program management information including at least authorization information which approves use of a content data item that is simultaneously used for the reproduction output together with the synchronization executing program, the reproducing apparatus, further including: verifying means for verifying, by using the verification-use information, authorization information of the content data item which the synchronization executing program instructs the decoding means to decode.

The above arrangements make it possible to verify, by using the verification-use information, whether or not the reproduction is carried out by using a synchronization executing program having program management information onto which appropriate authorization information is recorded. This makes it possible to verify whether or not the reproduction of the content data item is approved by the copyright holder of the content data item, which reproduction is carried out with the use of the currently executed synchronization executing program. This makes it possible to detect a reproduction operation carried out by a program that is not approved to reproduce the content data item, with the result that the content data item can be prevented from being reproduced without authorization. Note that the synchronization executing program is not limited to a program for generating the output data for use in the reproduction output.

Additional objects, features, and strengths of the present invention will be made clear by the description below. Further, the advantages of the present invention will be evident from the following explanation in reference to the drawings.

BRIEF DESCRIPTION OF DRAWINGS

FIG. 5(a) is an explanatory diagram illustrating a data structure of synchronization timing information.

FIG. 5(b) is an explanatory diagram illustrating a data structure of synchronization timing information.

FIG. 6 is an explanatory diagram illustrating data allocation in an optical disk reproduced by the video disk player shown in FIG. 1.

FIG. 12(a) is an explanatory diagram illustrating a data structure of the synchronization timing information.

FIG. 12(b) is an explanatory diagram illustrating a data structure of the synchronization timing information.

FIG. 13(a) is an explanatory diagram illustrating (i) an example of setting a field independent_flag, and (ii) an example of display in this case.

FIG. 13(b) is an explanatory diagram illustrating the example of setting the field independent_flag, i.e., illustrating entries sync_info( ) corresponding to FIG. 13(a).

FIG. 13(c) is an explanatory diagram illustrating (i) an example of setting a field independent_flag, and (ii) an example of display in this case.

FIG. 13(d) is an explanatory diagram illustrating the example of setting the field independent_flag, i.e., illustrating entries sync_info( ) corresponding to FIG. 13(c).

FIG. 17 is an explanatory diagram illustrating a specific example of the synchronization timing information.

FIG. 18(a) is an explanatory diagram illustrating a data structure of synchronization timing information.

FIG. 18(*b*) is an explanatory diagram illustrating a data structure of synchronization timing information.

FIG. 22(*a*) is an explanatory diagram illustrating a data structure of program management information.

FIG. 22(*b*) is an explanatory diagram illustrating the data structure of program management information.

FIG. 30(*a*) is an explanatory diagram illustrating a data structure of program management information.

FIG. 30(*b*) is an explanatory diagram illustrating the data structure of the program management information.

FIG. 31(*a*) is an explanatory diagram schematically illustrating (i) preparation of a field certificate contained in the entry video_info( ) shown in FIG. 30(*b*), and (ii) verification of a program.

FIG. 31(*b*) is an explanatory diagram schematically illustrating (i) the preparation of the field certificate contained in the entry video_info( ) shown in FIG. 30(*b*), and (ii) the verification of the program.

BEST MODE FOR CARRYING OUT THE INVENTION

[Embodiment 1]

One embodiment of the present invention will be explained below with reference to FIG. 1 through FIG. 11. Note that the present embodiment assumes a video disk player; however, the present invention is not limited to this, and is applicable to a PC (personal computer) having a hardware decoder.

<System Structure>

Figure 1:
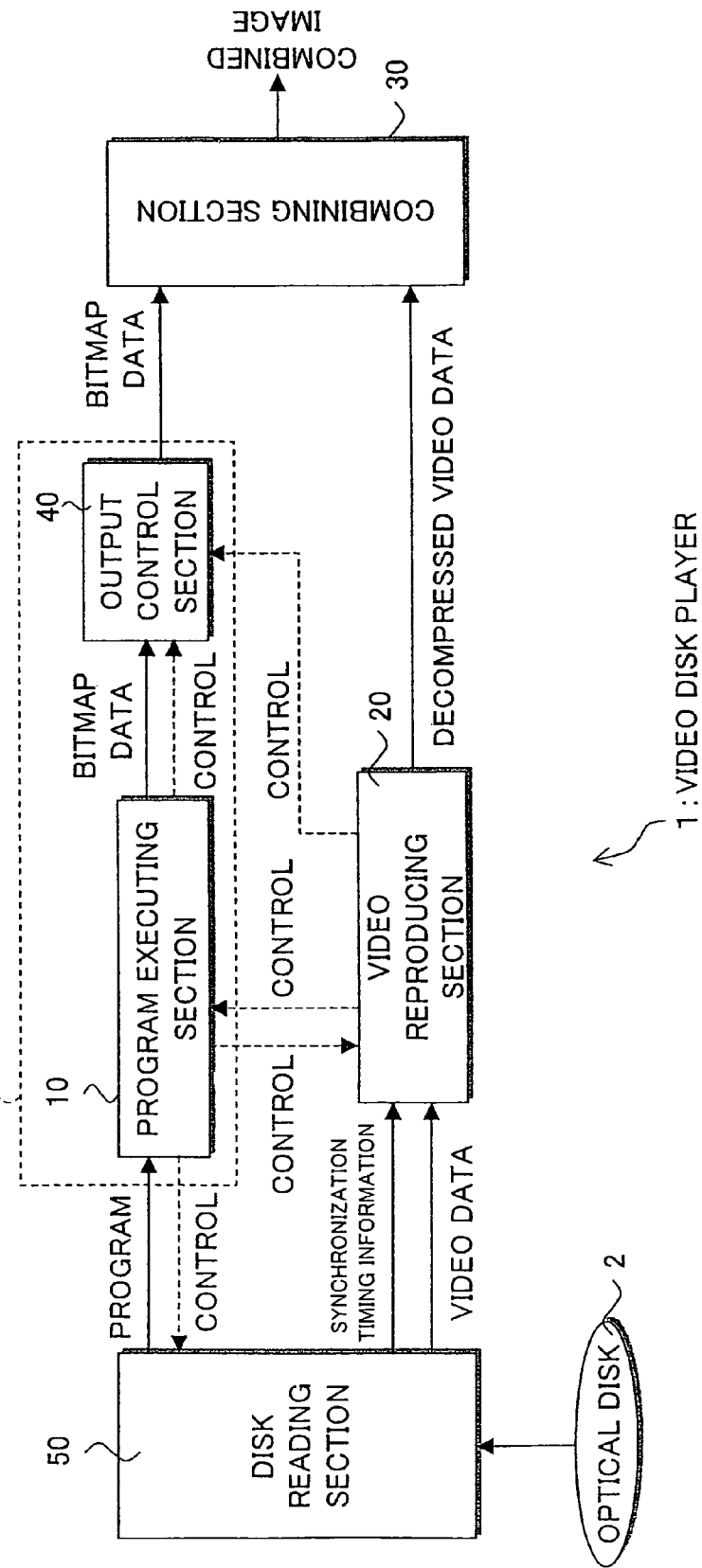
FIG. 1 is a block diagram schematically illustrating a structure of a video disk player according to an embodiment of the present invention.

FIG. 1 is a functional block diagram schematically illustrating a structure of a video disk player 1 according to the present embodiment.

The video disk player 1 (reproducing apparatus) is an apparatus for reproducing AV data stored in an optical disk 2. As shown in FIG. 1, the video disk player 1 includes a program executing section 10, a video reproducing section 20, a combining section 30, an output control section 40, and disk reading section 50.

The disk reading section 50 (data acquiring means; reading means) reads out video data (content data), programs (synchronization executing programs), and synchronization timing information from the optical disk 2 (content recording medium). Then, the disk reading section 50 sends each of the programs to the program executing section 10, and sends the video data and the below-described synchronization timing information to the video reproducing section 20.

The program executing section 10 executes the program. Specifically, the program executing section 10 executes the program so as to control the video reproducing section 20, the disk reading section 50, and the output control section 40. Moreover, the program executing section 10 sends, to the output control section 40, bitmap data generated by executing the program.

The video reproducing section 20 decodes the video data supplied from the disk reading section 50, and sends the decompressed video data to the combining section 30. Further, the video reproducing section 20 controls the program executing section 10 and the output control section 40 in accordance with the synchronization timing information supplied from the disk reading section 50.

The output control section 40 retains the bitmap data sent from the program executing section 10, and sends the bitmap data to the combining section 30 in accordance with the control carried out by each of the video reproducing section 20 and the program executing section 10.

The combining section 30 combines (i) the bitmap data sent from the output control section 40, with (ii) the decompressed video data sent from the video reproducing section 20. Then, the combine section 30 outputs an image (combined image) obtained by the combining.

The program executing section 10 and the output control section 40 constitute a synchronization processing section (synchronization processing means) 60. That is, the synchronization processing section 60 is arranged such that: the program executing section 10 executes the program so as to generate the bitmap data (output data; second output data) in accordance with a synchronization control signal received from the video reproducing section 20, and the output control section 40 outputs the bitmap data in accordance with the synchronization control signal received from the video reproducing section 20.

<Program Executing Section>

Figure 2:
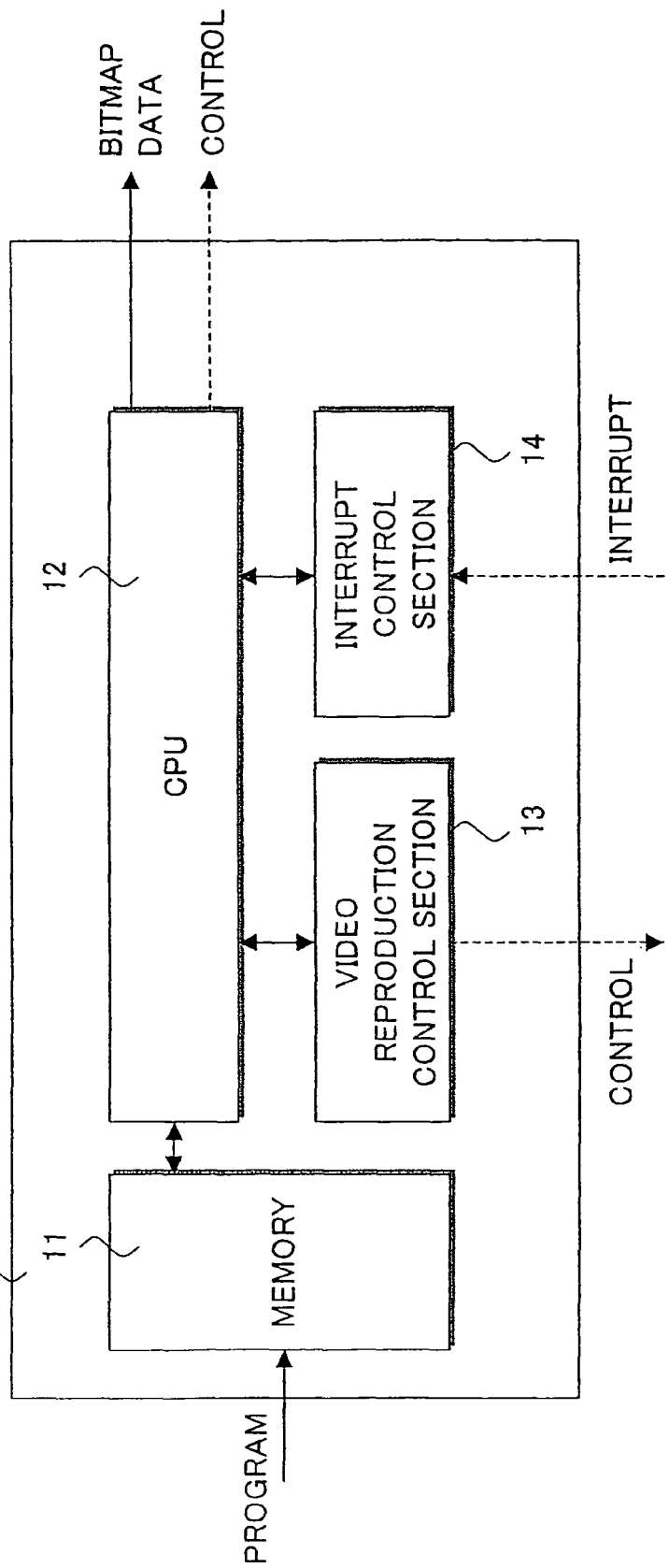
FIG. 2 is a function block diagram fully illustrating a structure of a program executing section of the video disk player shown in FIG. 1.

FIG. 2 is a functional block diagram fully illustrating a structure of the program executing section 10.

As described above, the program executing section executes a program in accordance with the synchronization control signal received from a synchronization control section 22 of the video reproducing section 20. The program executing section 10 executes a program specified by a field action_id contained in the synchronization control signal received from the synchronization control section 22. Particularly in the present embodiment, the program executing section 10 executes a program for generating image data to be overlaid with a video image.

As shown in FIG. 2, the program executing section 10 is made up of a memory 11, a CPU 12, and a video reproduction control section 13, and an interrupt control section 14.

The memory 11 temporarily stores the program sent from the disk reading section 50. The CPU 12 reads out the program thus stored in the memory 11, and executes the program. In accordance with how the problem runs, the CPU 12 sends an instruction to the video reproduction control section 13, or sends the bitmap data to the output control section 40. The video reproduction control section 13 sends a control signal to the video reproducing section 20 in accordance with the program thus executed. Specific examples of the control signal include: (i) a control signal for controlling the reproduction such as reproduction start and reproduction suspending, and (ii) a control signal, for acquiring a state such as a current reproduction time point. The interrupt control section 14 receives an interrupt from outside of the program executing section 10, and sends the interrupt to the CPU 12. The CPU 12 launches an interrupt handler upon the reception of the interrupt from the interrupt control section 14. Note that various types of information supplied from the member having sent the interrupt are stored in a register (not shown) of the interrupt control section 14.

Here, the wording "interrupt handler" corresponds to method, which is an object registered as EventLisner in Java®, and corresponds to a callback function in the other program languages.

<Output Control Section>

Figure 3:
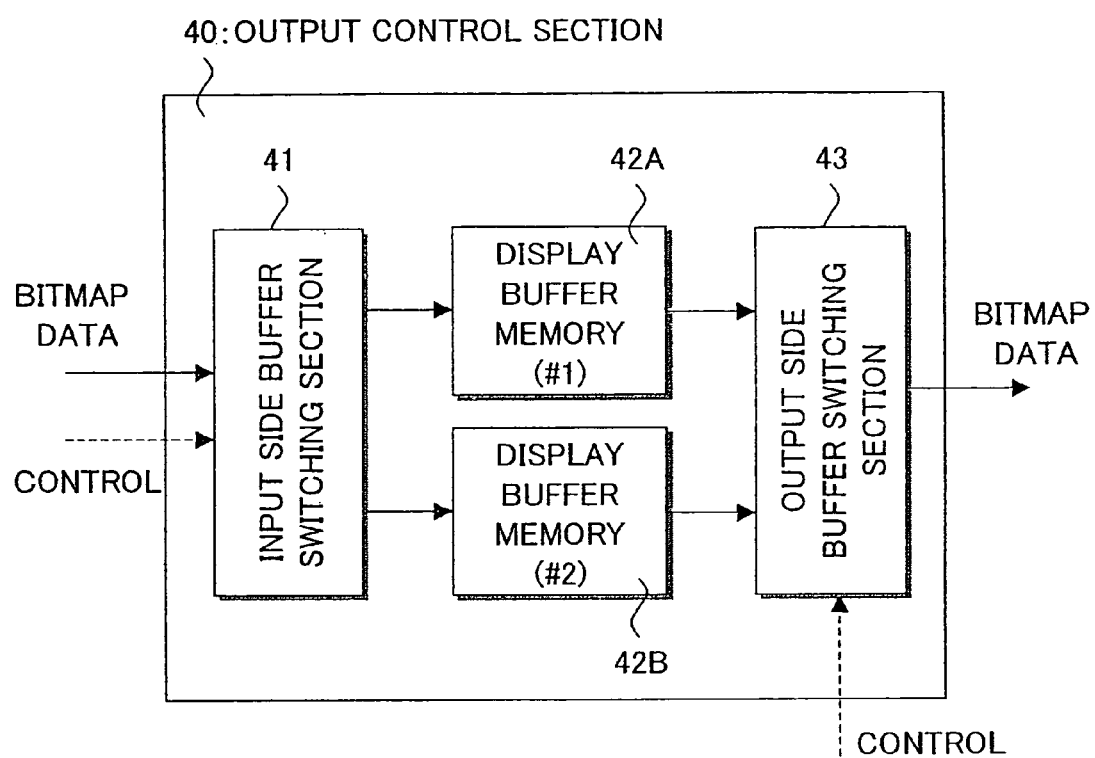
FIG. 3 is a function block diagram fully illustrating a structure of an output control section of the video disk player shown in FIG. 1.

FIG. 3 is a function block diagram fully illustrating a structure of the output control section 40.

As shown in FIG. 3, the output control section 40 is made up of an input side buffer switching section 41, a display buffer memories 42A(#1) and 42B(#2), and an output side buffer switching section 43.

The input side buffer switching section 41 receives the bitmap data from the program executing section 10, and sends the bitmap data to either one of the display buffer memories 42A and 42B in accordance with the control of the program executing section 10. The output side buffer switching section 43 sends, to the combining section 30 in accordance with the control carried out by the video reproducing section 20, the data stored in either one of the display buffer memories 42A and 42B.

Each of the display buffer memories 42A and 42B is a buffer memory for storing the bitmap data, and is controlled via the input side buffer switching section 41 and the output side buffer switching section 43 as described above.

<Video Reproducing Section>

Figure 4:
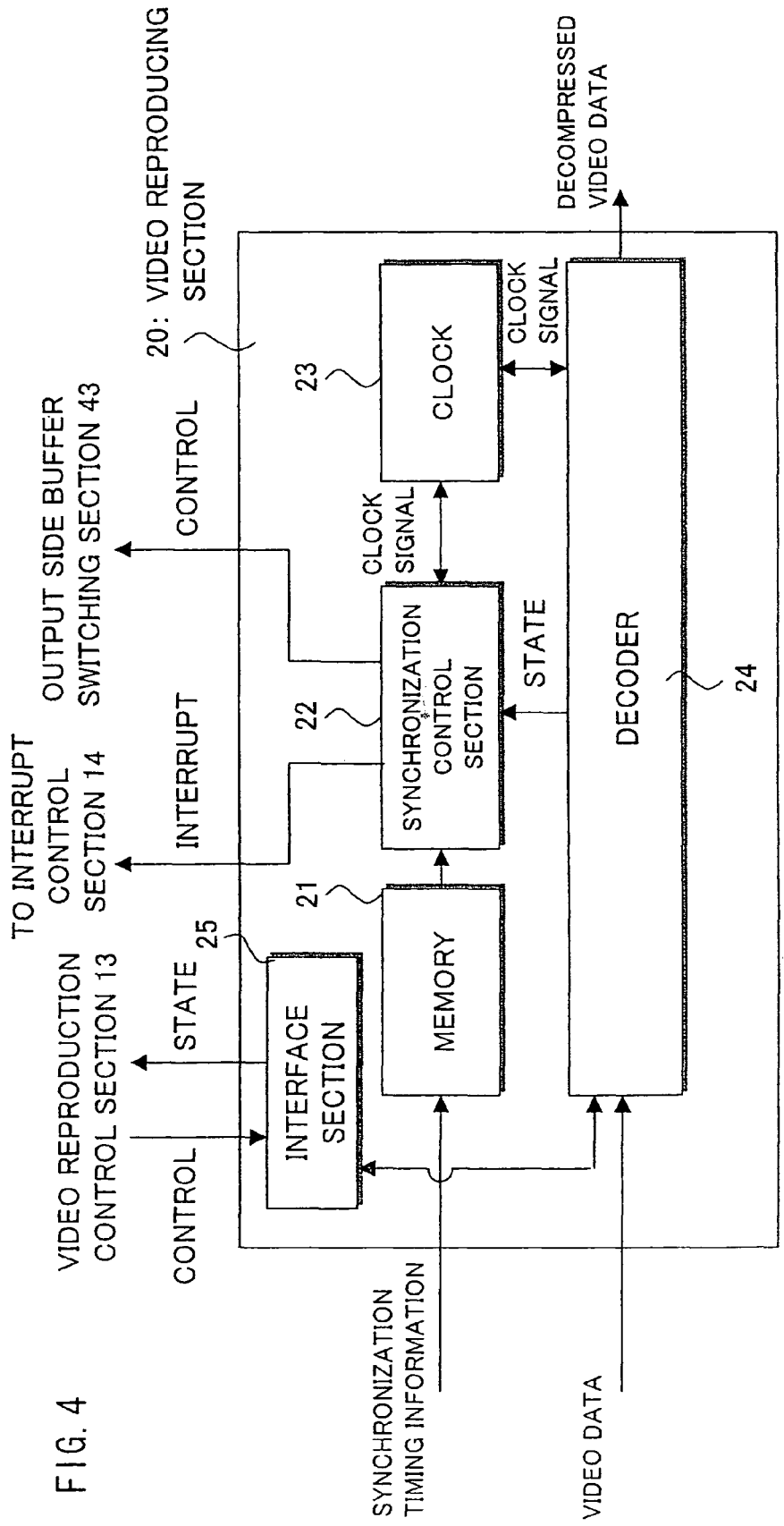
FIG. 4 is a function block diagram fully illustrating a structure of a video reproducing section of the video disk player shown in FIG. 1.

FIG. 4 is a function block diagram fully illustrating a structure of the video reproducing section 20.

As shown in FIG. 4, the video reproducing section 20 is made up of a memory 21, a synchronization control section 22, a clock 23, a decoder 24, and an interface section 25.

The decoder 24 (decoding means) converts, in accordance with a clock signal, the video data into the decompressed video data. Specifically, the decoder 24 decodes, into the decompressed video data (video image), the video data which is specified by an instruction sent from the interface section 25 and which is read out from the optical disk 2 by the disk reading section 50. Then, the decoder 24 outputs the decompressed video data thus obtained.

The clock (clock generating means) 23 produces timings at which the decoding and the output of the decompressed video data are carried out. That is, the clock 23 generates the clock signal. Note that: the present embodiment assumes that the video data is stored in the optical disk 2 in compliance with the ISO/IEC 13818-1 Program Stream format. In this case, the clock 23 has a value corresponding to an STC (System Time Clock) of the ISO/IEC 13818-1 Program Stream format.

The memory 21 stores the synchronization timing information sent from the disk reading section 50.

The synchronization control section (synchronization controlling means) 22 always compares (i) a value indicated by the synchronization timing information stored in the memory 21, with (ii) the value of the clock 23. In cases where the value indicated by the synchronization timing information coincides with the value of the clock 23, the synchronization control section 22 carries out specified control with respect to a process block (program executing section 10 or the output control section 40) specified by the synchronization timing information. Specifically, the synchronization control section 22 transmits the synchronization control signal to the program executing section 10 (program executing means; output generating means) in accordance with the clock signal, at a timing specified by a field timing (timing specifying information) contained in the synchronization timing information. When transmitting the synchronization control signal to the program executing section 10 at the timing specified by the field timing, the synchronization control section 22 adds, to the synchronization control signal, the field action_id corresponding to the field timing. Note that it is not essential in the present embodiment that the synchronization control section 22 monitors the state of the decoder 24.

In cases where the process block specified by the synchronization timing information is the program executing section 10, the synchronization control section 22 interrupts the interrupt control section 14 such that the information is set in the register of the interrupt control section 14.

On this account, no load is imposed in executing the program, with the result that the processing can be carried out at an arbitrary timing in the video reproduction time period. A reason of this is as follows. That is, the interrupt mechanism is made up of the hardware, so that no polling processing for making a reference to the clock of the video reproducing section 20 is required by the program unlike the conventional technique. Accordingly, overhead due to the polling processing never occurs.

On the other hand, in cases where the process block specified by the synchronization timing information is the output control section 40, the synchronization control section 22 sends an instruction to the output side buffer switching section 43 such that switching is carried out between the display buffer memories 42A and 42B. This makes it possible to switch, at a frame precision, image outputs generated by using the program. A reason of this is as follows. That is, the switching is carried out between the hardware, i.e., between the display buffer memories 42A and 42B, so that the overhead due to the execution of the program is less likely to occur as compared with the conventional technique in which the switching between display and non-display is controlled by using a program. Examples of such an overhead include the function calling, the garbage collection, and the like.

Further, the interface section 25 of the video reproducing section 20 receives the control signal from the video reproduction control section 13 of the program executing section 10. In accordance with the control signal, the interface section 25 controls the decoder 24 and sends, to the video reproduction control section 13, information indicative of the current state of the video reproducing section 20.

<Synchronization Timing Information>

Explained here is a data structure of the data stored in the optical disk 2, with reference to FIG. 5 and FIG. 6.

The optical disk 2 stores the video data, the program, and the synchronization timing information such that the video data, the program, and the synchronization timing information can be supplied to the video disk player 1.

Each of FIG. 5(a) and FIG. 5(b) is an explanatory diagram illustrating a data structure of the synchronization timing information. As shown in FIG. 5(a), the synchronization timing information is made up of (i) number_of_sync_info indicating the number of entries, and (ii) zero or more entries sync_info( ). See FIG. 5(b). Each of the entries sync_info( ) is made up of three fields: timing, target, and action_id. That is, the synchronization timing information at least include (i) the field timing (timing specifying information) and (ii) the field action_id (action specifying information).

The field timing indicates timing at which an instruction is supplied to either the program executing section 10 or the output control section 40. The field timing is used, by the synchronization control section 22, for the comparison with the value of the clock 23.

The field target indicates a target to which the instruction is given. The field target specifies either one of the program executing section 10 and the output control section 40.

The field action_id represents the instruction. Note that details about the field action_id will be described later.

As such, the synchronization timing information includes the field target indicating the target to which the instruction is given. This makes it possible to deal with a case where the instruction is supplied to a plurality of process blocks. Further, the field action_id representing the instruction is included in the synchronization timing information, with the result that a plurality of instructions can be given to one process block.

<Data Allocation and File Structure>

FIG. 6 is an explanatory diagram illustrating data allocation in the optical disk 2.

As shown in FIG. 6, the optical disk 2 is made up of a management information region 61 and a video data region (content data storing region) 62. The management information region 61 is made up of (i) a program storing region (synchronization program storing region) 61A storing the programs, and (ii) a synchronization timing information storing region 61B storing the synchronization timing information. On the other hand, the video data region 62 stores the video data. Note that the synchronization timing information, the programs, and the video data are managed as files, individually.

Particularly in the present embodiment, the synchronization timing information is stored separately from the video data. Moreover, the synchronization timing information is stored in the vicinity of the programs. Further, the synchronization timing information and each of the programs are stored in the same file.

As such, the video data and the synchronization timing information are separately managed. This makes it easier to share one video data with a plurality of programs. Further, the synchronization timing information and each of the programs are managed as different files, so that the program does not need to be rewritten even in cases where the video data is edited after creating the program.

Note that the supply of the video data, the program, and the synchronization timing information to the video disk player 1 can be carried out in various manners. For example, the video disk player 1 may read out the video data, the program, and the synchronization timing information from the optical disk 2. Alternatively, any one of the video data, the program, and the synchronization timing information may be acquired via a network by using a communication section (communication means; not shown), and may be combined with the other data read out from the optical disk 2, with the result that the reproduction is carried out. Further, a part or all of the programs stored in the optical disk 2 may be replaced with programs acquired via the network for the sake of the reproduction. Further, a part or all of the video data stored in the optical disk 2 may be replaced with video data acquired via the network for the sake of the reproduction. Further, a part or all of the synchronization timing information stored in the optical disk 2 may be replaced with synchronization timing information acquired via the network for the sake of the reproduction.

For example, the video disk player 1 shown in FIG. 1 may be arranged such that the program and the synchronization timing information are acquired via the network. Such a structure allows a manufacturer of the optical disk 2 to render, via the network, an additional value to the video data provided for the user by way of the optical disk 2. Each of the program and the synchronization timing information has a data amount much smaller than that of the video data. Therefore, such a way of rendering the additional value after providing the optical disk 2 for the user is beneficial in terms of communication cost such as time and a charge.

<Reproducing Process>

Figure 7:
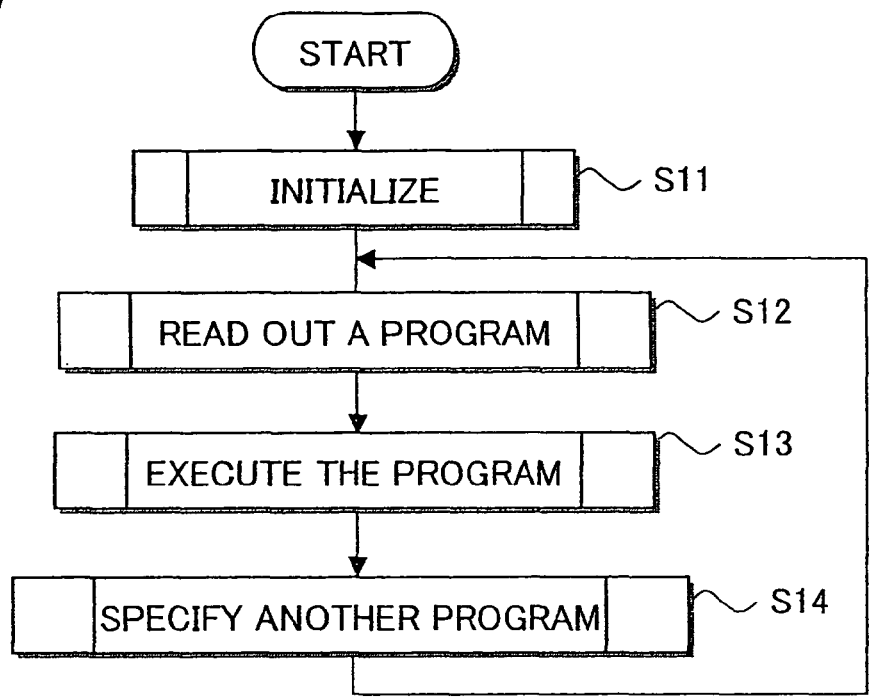
FIG. 7 is a flowchart illustrating a reproducing process carried out by the video disk player shown in FIG. 1.

The following explains a reproducing process carried out by the video disk player 1, with reference to FIG. 7.

FIG. 7 is a flowchart illustrating an entire flow of the reproducing process carried out by the video disk player 1.

After being powered ON, the video disk player 1 reads out file system information (not shown) and the like from the optical disk 2, and initializes respective processing sections. In accordance with the file system information thus read out, the disk reading section 50 acquires information indicative of a position, which stores an automatic launch program, of the optical disk 2 (S11). Note that the automatic launch program can be identified in accordance with a filename.

The automatic launch program is a program firstly launched from the optical disk 2 in response to either (i) insertion of the optical disk 2 to the video disk player 1, or (ii) the powering-ON of the video disk player 1. The automatic launch program may be any program which the manufacturer of the optical disk 2 would like to launch. However, normally used as the automatic launch program is a menu display program for use in selection of a plurality of contents stored in the optical disk 2. Information indicative of the position storing the automatic launch program can be acquired by the disk reading section 50 in accordance with the specific filename beforehand given to the file storing the automatic launch program.

Next, the disk reading section 50 reads out a program in accordance with information indicative of the position storing the program, and sends the readout program to the program executing section 10 (S12). The program executing section 10 receives and executes the program (S13). On this occasion, the disk reading section 50 acquires information indicative of a position, which stores a program to be executed next, in the optical disk 2 (S14).

Figure 8:
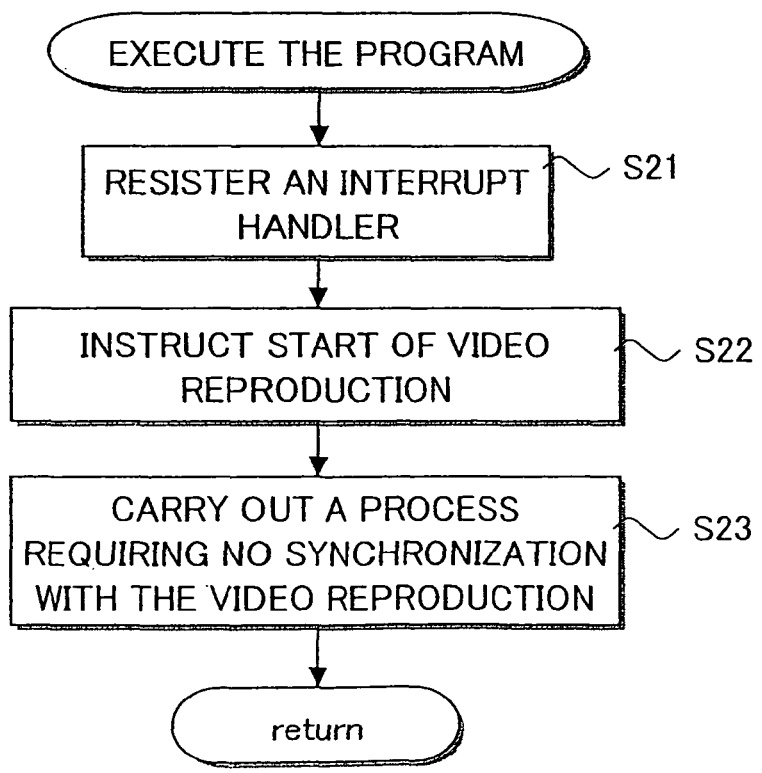
FIG. 8 is a flowchart illustrating a program executing process carried out by a program executing section of the video disk player shown in FIG. 1.

Explained next is a step S13 in which the program executing section 10 executes the program, with reference to FIG. 8.

Firstly, the program executing section 10 registers the interrupt handler for dealing with the interrupt sent from the video reproducing section 20 (S21). Note that explanation about the interrupt handler will be made later. Next, the program executing section 10 specifies a video data file to be reproduced, and instructs the video reproducing section 2 to start the reproduction thereof (S22). Finally, a process requiring no synchronization with the video reproduction is executed (S23).

Here, in Java®, the registering of the interrupt handler can be realized by registering EventLisner in an object corresponding to an event concerning the video reproduction.

<Example of Executing a Program>

Figure 11:
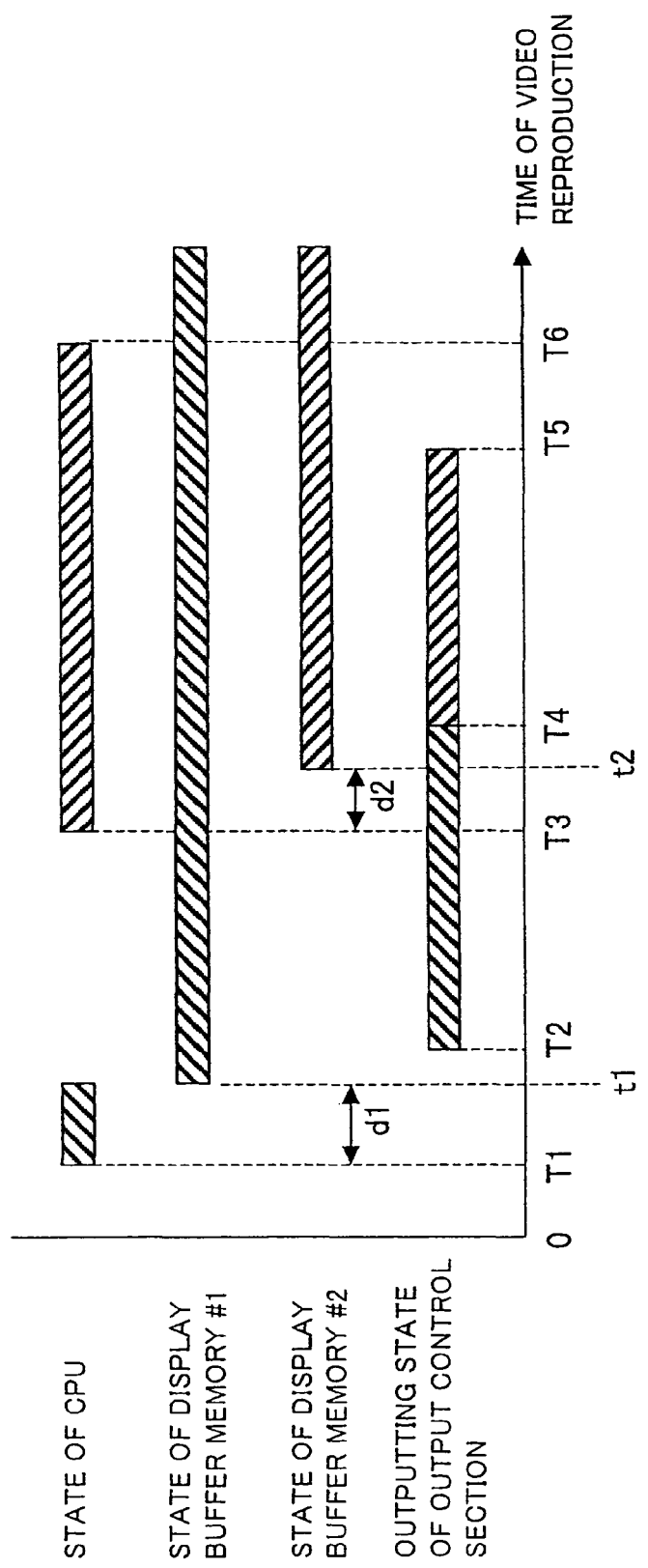
FIG. 11 is a timing chart corresponding to the specific example of the synchronization timing information shown in FIG. 10.
Figure 14:
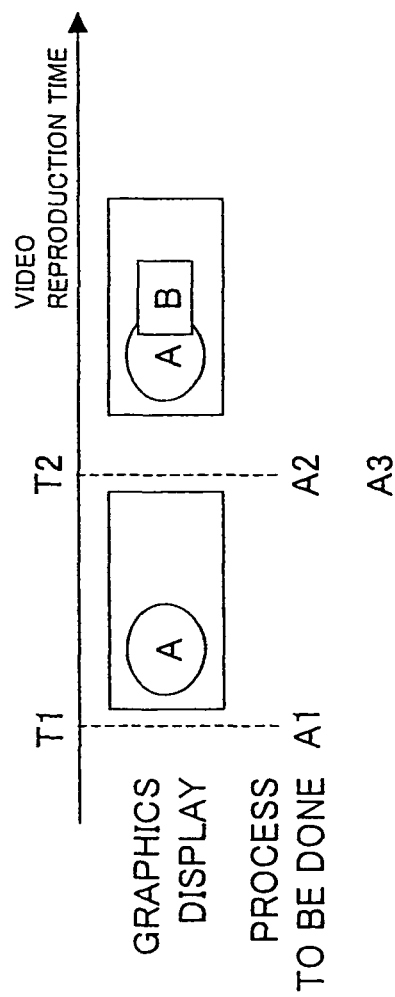
FIG. 14(a) is an explanatory diagram illustrating (i) an example of setting a field merger_flag, and (ii) an example of display in this case.
FIG. 14(b) is an explanatory diagram illustrating the example of setting the field merger_flag, i.e., illustrating entries sync_info( ) corresponding to FIG. 14(a).

Explained next is a specific example how the video disk player 1 executes the program, with reference to FIG. 9 through FIG. 11. Exemplified here is a program which causes a still image to be displayed during a period of time from time point T2 to time point T4 in the video data reproduction, and which causes an animation to be displayed during a period of time from a time point T4 to a time point T5.

Now, a setting of the interrupt handler of the present specific example will be explained with reference to the flowchart shown in FIG. 9.

Firstly, the CPU 12 launches the interrupt handler. Then, in reference to the register of the interrupt control section 14, the CPU 12 acquires a value of the field action_id, which value is set by the video reproducing section 20 (S31). Thereafter, the CPU 12 carries out judgment on the field action_id (S32).

In cases where the field action_id is indicative of "A1" in the step S32, the CPU 12 causes the still image to be generated and written in the display memory buffer 42A (S33). On the other hand, in cases where the field action_id is indicative of "A2", the CPU 12 causes the animation to be generated, and causes bitmap of the animation to be written in the memory buffer 42B (S34). In the meanwhile, in cases where the field action_id is indicative of "A3", the CPU 12 causes the generation of the animation to be ended (S35).

Figures 9, 10:
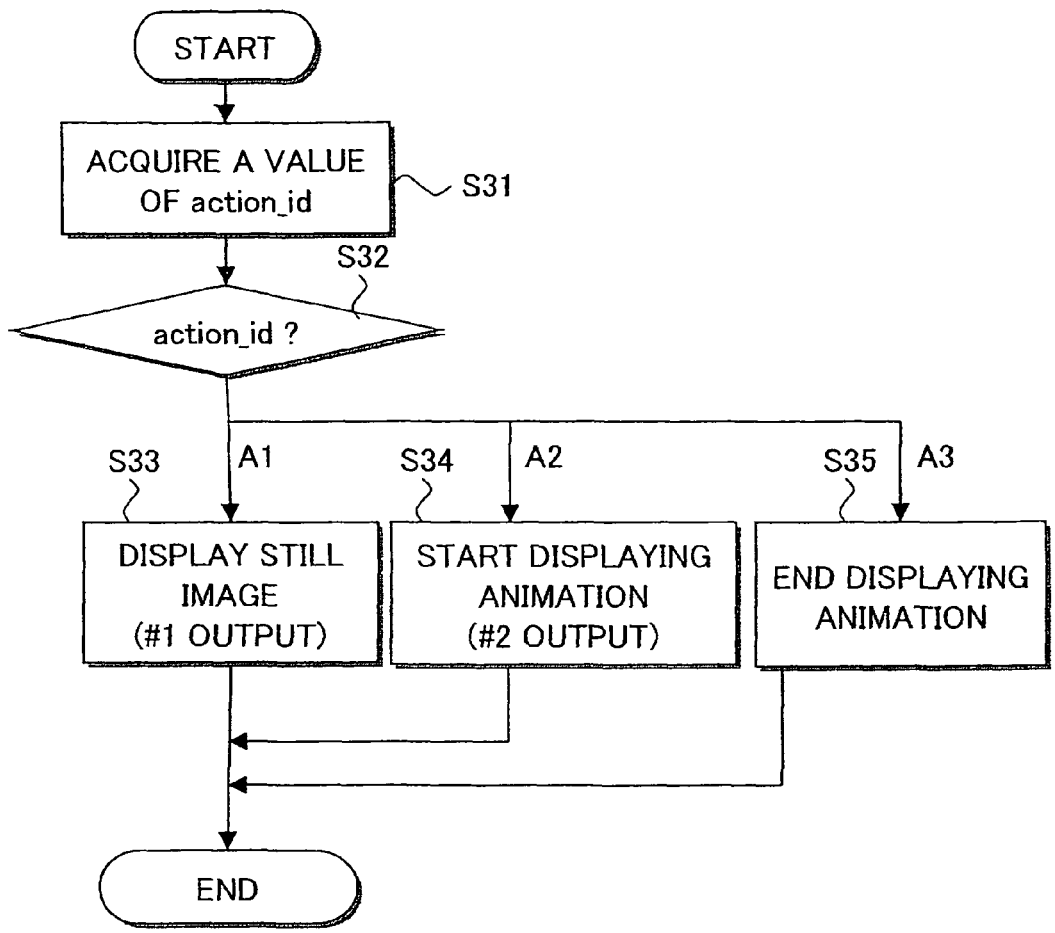
FIG. 9 is a flowchart illustrating a process which the program executing section of the video disk player shown in FIG. 1 causes an interrupt handler to carry out.
FIG. 10 is an explanatory diagram illustrating an specific example of the synchronization timing information.

FIG. 10 illustrates the synchronization timing information used in the present specific example. Note that "A1", "A2", and "A3" in the column indicating the field action_id correspond to the processes shown in FIG. 9, respectively. Further, FIG. 11 is a timing chart of the present specific example. The timing chart has a horizontal axis representing a time period during which the video data is reproduced.

The process for displaying the still image starts at time point T1. At a time point t1, the writing of the still image in the display buffer memory 42A is finished, with the result that preparation for the display is completed. Next, at time point T2, the image to be supplied to the combining section 30 is switched to the image written in the display buffer memory 42A(#1), with the result that the still image is displayed.

Important here is that time T2-T1 is so set as to be longer than time d1 (=t1-T1) required for the writing of the still image in the display buffer memory 42A. This allows the still image to be displayed at the specified time point T2.

In the meanwhile, the process for starting the display of the animation starts at a time point T3. At a time point t2, the writing of first bitmap data of the animation in the display buffer memory is completed. Next, at a time point T4, the image to be supplied to the combining section 30 is switched to the image written in the display buffer memory 42B(#2), with the result that the animation is displayed.

Important here is that time T4-T3 is so set as to be longer than time d2 (=t2-T3) required for the writing of the first bitmap data of the animation in the display buffer memory 42B. This makes it possible to switch the image display from the still image to the animation at a time point T4.

Explained next are timings at which the various types of data of the present embodiment are read out from the optical disk 2, respectively. The video data has a large data amount. Therefore, in view of a memory amount and readout time, it is not realistic to read out the video data all at once before the decoding. For this reason, the readout of the video data is carried out concurrently with the decoding of the video data.

On the other hand, each of the program and the synchronization timing information has a small data amount. Therefore, even when the program and the synchronization timing information are respectively read out to the memories 11 and 21 at the same time, no problem occurs in terms of the memory amount and the readout time. Therefore, the program and the synchronization timing information are read out at the same time before the start of the readout of the video data. This makes it possible to avoid (i) discontinuity of the video reproduction due to movement made by a pickup (not shown) of the disk reading section 50 that is reading out the video data, (ii) increase of power consumption, and (iii) occurrence of noise. In the present embodiment, the program and the synchronization timing information are positioned adjacent to each other in the optical disk 2, so that the pickup travels in a short distance so as to read out the program and the synchronization timing information. This makes it possible to (i) shorten latency time (waiting time) required for the start of the reproduction, and (ii) prevent the interruption of the video reproduction, and (iii) restrain the power consumption, and (iv) restrain the noise.

Explained next is a structure of the program of the present specific example. In the present specific example, the program deals with (i) the video reproducing process that is a main process, and (ii) the still image displaying process and the animation displaying process which are sub processes. The video reproducing process, the still image displaying process, and the animation displaying process may be handled by one program. Alternatively, the video reproducing process, the still image displaying process, and the animation displaying process may be handled by one main program and two sub programs.

In cases where the processes are handled by the plural programs, the programs are possibly handled as different files. In this case, it is preferable that the programs be handled as one file for the purpose of reducing load to be imposed on the disk reading section 50. A file format termed "JAR (Java ARchive) file defined in Java® language is a specific example for use in reducing the load.

As described above, the video disk player 1 of the present embodiment includes the program executing section 10, the video reproducing section 20, and the combining section 30 for combining (i) the output (bitmap data) of the program executing section 10 with (ii) the output (decompressed video data) of the video reproducing section 20. Moreover, the video disk player 1 controls the output of the program executing section 10 in accordance with the clock of the video reproducing section 20. On this account, no load is imposed during the process carried out by the program executing section 10, so that the outputting of the video data, i.e., the output generated by the video reproducing section 20, can be started and ended at a specified timing with a frame precision. This makes it possible that: in cases where the computer program execution and the video reproduction are simultaneously carried out, the display of the graphics, the animation, and the like each generated by the program is started from a specific video frame in the video reproduction time period, and is ended at a specific video frame therein.

Further, in the video disk player 1, the synchronization timing information is separated from the information (video data) for use in generating the output of the video reproducing section 20. This makes it possible that different items of synchronization timing information are given to the information for use in generating the output of the video reproducing section 20.

Further, in the video disk player 1, the synchronization timing information includes (i) the information indicative of a time point in the time period during which the video reproduction is carried out by the video reproducing section 20; and (ii) at least either one of (a) the information indicative of the control target, and (b) the information indicative of the control to be carried out. This makes it possible to handle (i) a case where an instruction is given to a plurality of process blocks, and (ii) a case where a plurality of instructions are switchably given to one process block.

[Embodiment 2]

Another embodiment of the present invention will be explained below with reference to FIG. 12 through FIG. 17. For ease of explanation, materials having the equivalent functions as those shown in the drawings pertaining to the foregoing Embodiment 1 will be given the same reference symbols, and explanation thereof will be omitted here. Further, the wordings defined in Embodiment 1 are used in the present embodiment in accordance with the definition made in Embodiment 1, unless otherwise noted.

The present embodiment is a modified example of Embodiment 1, and allows for reproduction starting from an arbitrary position of the video data. For this reason, the present embodiment and Embodiment 1 have a lot in common, so that the following description only deals with differences from Embodiment 1.

<System Structure>

The present embodiment has the same system structure as that of Embodiment 1, so that explanation thereof is omitted.

<Program Executing Section>

The present embodiment has the same program executing section as that of Embodiment 1, so that explanation thereof is omitted.

<Output Control Section>

The present embodiment has the same output control section as that of Embodiment 1, so that explanation thereof is omitted.

<Video Reproducing Section>

The present embodiment has substantially the same program executing section as that of Embodiment 1; however, the present embodiment and Embodiment 1 are different from each other in that: the present embodiment disregards an entry sync_info( ) which is contained in the synchronization timing information, and which has the below-mentioned field merged_flag whose value is set at "1".

Further, in cases where the reproduction is started from a certain point of the content data, the synchronization control section 22 transmits synchronization control signals to the program executing section 10 in order from (i) a synchronization control signal corresponding to the earliest time point, to (ii) a synchronization control signal corresponding to the latest time point of the time points respectively indicated by the timing specifying information. The synchronization control signals are respectively transmitted in accordance with synchronization timing information respectively containing fields timing (timing specifying information) each indicating a time point preceding to the time from which the reproduction is started.

Further, in the case where the reproduction is started from the certain point of the content data, the synchronization control section 22 transmits the synchronization control signals to the program executing section 10 in accordance with the following synchronization timing information items (1) and (2) each containing dependency information (below-mentioned field independent_flag) indicating that the synchronization timing information is independent from the other synchronization timing information: (1) a synchronization timing information item containing timing specifying information indicating a time point that comes before but is the closest to the time point from which the reproduction is started; and (2) a synchronization timing information item containing timing specifying information indicating a time point coming after the time point indicated by the synchronization timing information item (1). The synchronization control signals are transmitted in order from (i) a synchronization control signal corresponding to the earliest time point, to (ii) a synchronization control signal corresponding to the latest time point of the time points respectively indicated by the timing specifying information. For attainment of this, each of the synchronization timing information items contains such dependency information indicating a dependency relation with the other synchronization timing information.

Further, in the case where the reproduction is started from the certain point of the content data, the synchronization control section 22 transmits the synchronization control signals to the program executing section 10 in accordance with the following synchronization timing information items each containing merged synchronization executing program identifying information (field merged_flag) indicating that the program is a merged synchronization executing program allowing the same result as a result obtained by executing a plurality of synchronization executing programs: (1) a synchronization timing information item containing timing specifying information indicating a time point that comes before but is the closest to the time point from which the reproduction is started; and (2) a synchronization timing information item containing timing specifying information indicating a time point coming after the time point indicated by the synchronization timing information (1). The synchronization control signals are transmitted in order from (i) a synchronization control signal corresponding to the earliest time point, to (ii) a synchronization control signal corresponding to the latest time point of the time points respectively indicated by the timing specifying information items. For attainment of this, the disk reading section 50 acquires the merged synchronization executing program allowing the same result as the result obtained by executing the plurality of synchronization executing programs. It is preferable that the merged synchronization executing program be stored in the optical disk 2 together with the synchronization executing programs corresponding to the merged synchronization executing program. As such, the synchronization timing information contains (i) the timing specifying information; (ii) the field action_id (action specifying information) for indicating a synchronization executing program to be executed; and (iii) the merged synchronization executing program identifying information indicating whether or not the synchronization executing program is the merged synchronization executing program identifying information (field merged_flag).

<Synchronization Timing Information>

Explained here is a data structure of the synchronization timing information of the present embodiment, with reference to FIG. 12. Each of FIG. 12(*a*) and FIG. 12(*b*) is an explanatory diagram illustrating the data structure of the synchronization timing information.

As shown in FIG. 12(*a*), the synchronization timing information is made up of (i) number_of_sync_info indicating the number of entries, and (ii) zero or more entries sync_info( ).

As shown in FIG. 12(b), each of the entries sync_info( ) is made up of five fields: timing, target, action_id, independent_flag, and merged_flag. The fields timing (timing specifying information), target, and action_id (action specifying information) are identical to those of Embodiment 1, respectively. Therefore, explanation thereof is omitted here. Note that, it is preferable that the entries sync_info( ) of the synchronization timing information are arranged in order of the values indicated by the respective fields timing of the entries sync_info( ).

The field independent_flag is a flag indicating whether or not each of (i) a process corresponding to an entry sync_info( ) including the flag, and (ii) a result of the process (hereinafter, referred to as "processing result") depend on each of the results of the processes corresponding to the fields action_id of entries sync_info( ) coming before the entry sync_info( ). In cases where the process and the processing result depend thereon, the field independent_flag is indicative of "0". On the other hand, in cases where the process and the processing result do not depend thereon, the independent_flag is indicative of "1".

Here, each of FIG. 13(a) through FIG. 13(d) is an explanatory diagram illustrating an example of setting the field independent_flag.

For example, consider a case where: a process corresponding to an field action_id of an entry sync_info(1) coming first is a process of drawing graphics A, and a process corresponding to a field action_id of an entry sync_info(2) coming second is a process of drawing graphics B in addition to the graphics A (see FIG. 13(a)). In this case, a result of the process corresponding to the field action_id of the entry sync_info(2) depends on a result of the process corresponding to the field action_id of the entry sync_info(1). Therefore, the field independent_flag of the entry sync_info(2) is set at "0" (see FIG. 13(b)).

On the other hand, in cases where the process corresponding to the field action_id of the entry sync_info(2) is a process of drawing the graphics B after erasing (canceling) the graphics A, the result of the process corresponding to the field action_id of the entry sync_info(2) is independent from the result of the process corresponding to the field action_id of the entry sync_info(1). Therefore, the field independent_flag of the entry sync_info(2) is set at "1" (see FIG. 13(d)). Note that the i-th entry sync_info( ) (an entry sync_info( ) coming i-th) is referred to as entry "sync_info(i)".

Next, the field merged_flag is a flag indicating whether or not a processing result of an entry sync_info( ) including the flag reflects respective processing results of all the entries sync_info( ) coming before the entry sync_info( ). In cases where the processing result of the entry sync_info( ) reflects the respective processing results, the field merged_flag is set at "1". Otherwise, the field merged_flag is set at "0".

Here, each of FIG. 14(a) and FIG. 14(b) is an explanatory diagram illustrating an example of setting the field merged_flag.

For example, assume that: the process corresponding to the field action_id of the entry sync_info(1) is a process of drawing the graphics A, and the process corresponding to the field action_id of the entry sync_info(2) is a process of drawing graphics B in addition to the graphics A as shown in FIG. 14(a). Under such conditions, consider a case where a result of a process corresponding to a field action_id of an entry sync_info(3) coincides with the results of the processes respectively corresponding to the fields action_id of the entries sync_info(1) and sync_info(2). In other words, consider a case where the process corresponding to the field action_id of the entry sync_info(3) is a process of simultaneously drawing the graphics A and B. In this case, the field merged_flag is set at "1" (see FIG. 14(b). Here, a program for carrying out the process corresponding to the field action_id of the entry sync_info(3) is referred to as the merged synchronization executing program.

The field dependent flag and the field merged_flag are used so as to reduce the graphics overlaying display processing in cases where the reproduction is started from the certain point of the video data. This will be explained later.

<Data Allocation and File Structure>

Data allocation and a file structure of the present embodiment is the same as those of Embodiment 1, so that explanation thereof is omitted.

<Reproducing Process>

Figure 15:
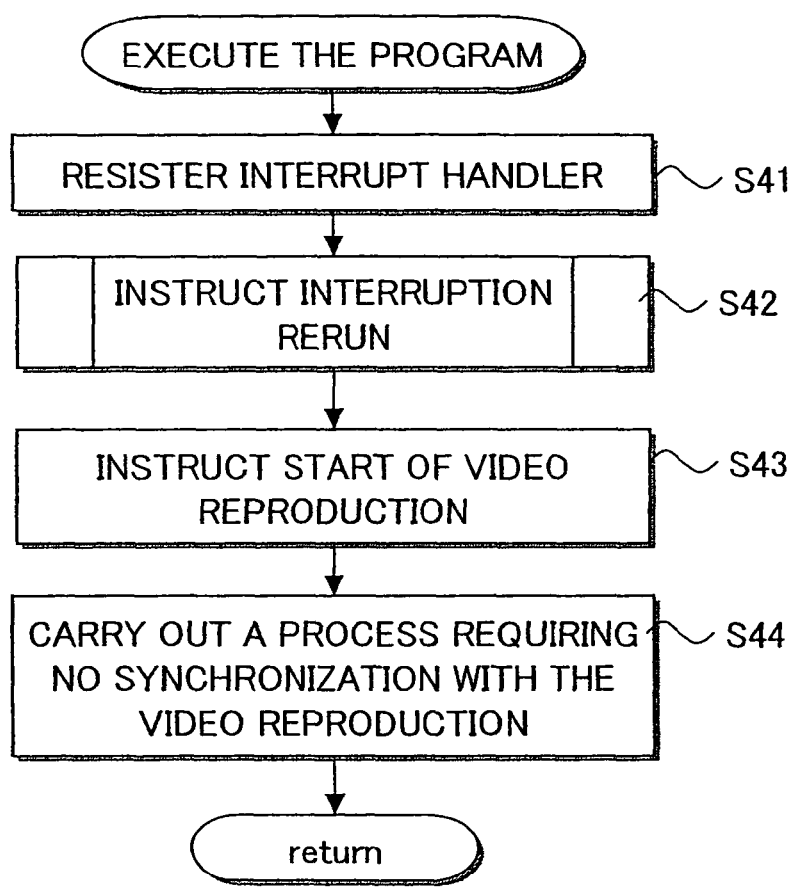
FIG. 15 is a flowchart illustrating a program executing process carried out by the program executing section of the video disk player shown in FIG. 1.

A difference between the present embodiment and Embodiment 1 lies in the program executing process, so that the program executing process is explained with reference to FIG. 15. Note that, the explanation here assumes that the reproduction is started from time point T of the time period during which the video data is reproduced. FIG. 15 is a flowchart illustrating the program executing process carried out by the program executing section 10 of the video disk player 1 shown in FIG. 1.

Firstly, the program executing section 10 registers the interrupt handler for dealing with the interrupt sent from the video reproducing section 20 (S41). Next, the program executing section 10 issues an interruption rerun instruction to the video reproducing section 20, and waits for completion of the interruption rerun (S42). Then, the program executing section 10 specifies a video data file to be reproduced, and instructs start of reproducing the video data file (S43). Finally, a process requiring no synchronization with the video reproduction is executed (S44).

Figure 16:
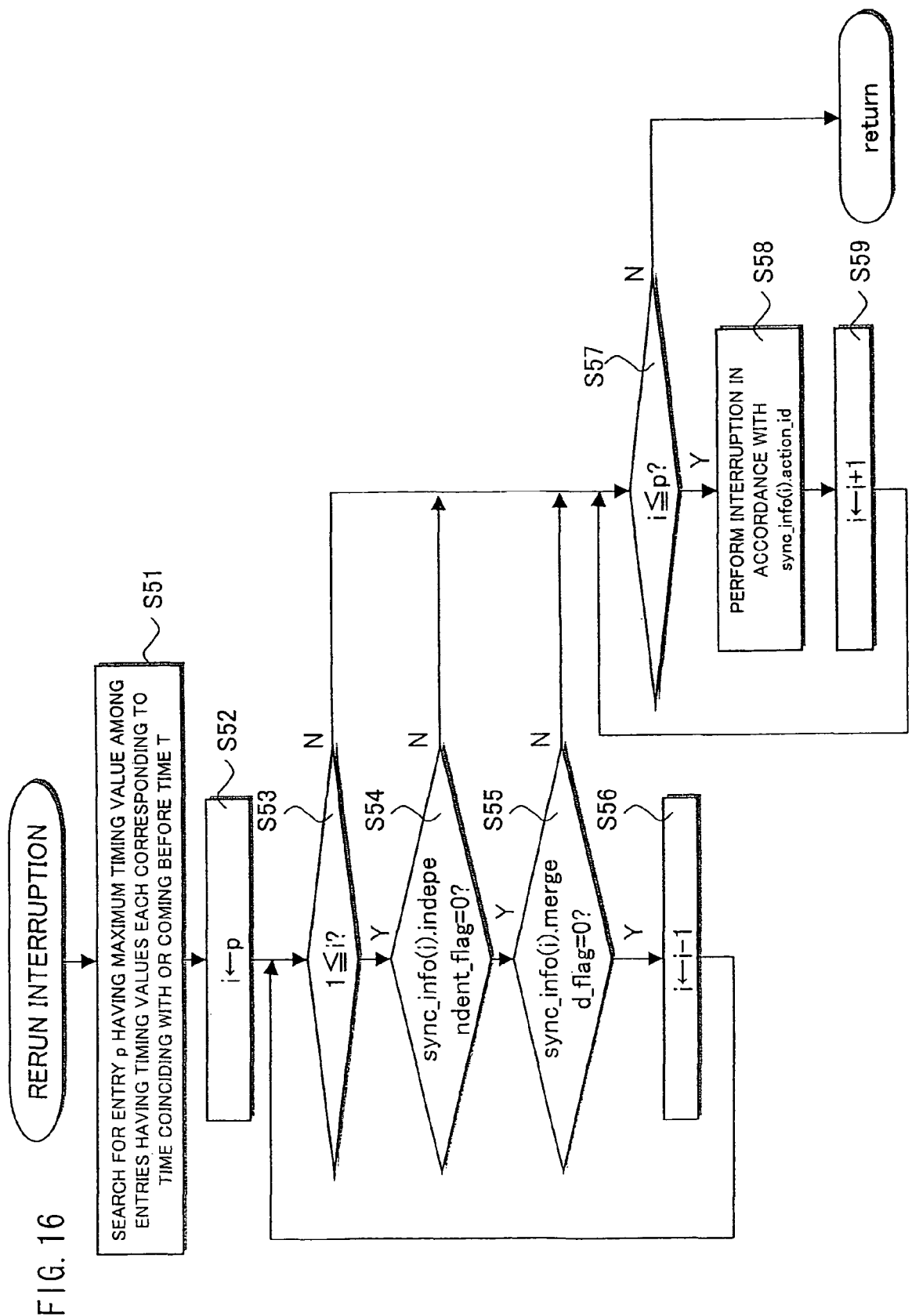
FIG. 16 is a flowchart illustrating an interruption rerun process carried out by the video reproducing section of the video disk player shown in FIG. 1.

Explained next is the interruption rerun process with reference to FIG. 16. FIG. 16 is a flowchart illustrating the interruption rerun process carried out by the video reproducing section 20.

Firstly, the video reproducing section 20 searches for an entry, which has an entry number p and which is contained in the synchronization timing information (S51). The entry having the entry number p is such an entry that has the maximum timing value among entries having timing values each corresponding to a time point coinciding with or coming before the reproduction start time point T. Next, the video reproducing section 20 decrements the entry number by 1 so as to search for either (i) an entry whose field independent_flag is indicative of "1" (an entry depending on a result of a process corresponding to a field action_id of each of entries sync_info( ) coming before the entry), or (ii) an entry whose field merged_flag is indicative of "1" (an entry reflecting a processing result of each of entries sync_info( ) coming before the entry). In cases where such an entry is found by the search, the video reproducing section 20 carries out interruption in order from (i) interruption corresponding to the found entry, to (ii) interruption corresponding to the entry having entry number p (S57 through S59). On the other hand, in cases where such an entry is not found by the search, the video reproducing section 20 carries out interruption in order from (i) interruption corresponding to the entry having the entry number 1, to (ii) the interruption corresponding to the entry having the entry number p (S57 through S59).

<Specific Example>

The following explains a specific example of executing the program in the video disk player 1 of the present embodiment, with reference to FIG. 17. FIG. 17 is an explanatory diagram illustrating a specific example of the synchronization timing information.

First, consider a case where the time point (reproduction start time point) T from which the video data starts to be reproduced comes before time point T1. In this case, no interruption rerun needs to be carried out in the step S42. Therefore, while carrying out the video reproduction, the video reproducing section 20 interrupts the program executing section 10 at such a timing that each of values respectively indicated by fields timing of the entries whose entry numbers are 1 through 5 coincide with a value of the clock 23. The interruption is carried out in order from (i) interruption corresponding to the entry having the entry number 1, to (ii) interruption corresponding to the entry having entry number 5. However, the entry whose entry number is 3 has a field merged_flag indicative of "1", so that no interruption corresponding to the entry number 3 is carried out.

Next, consider a case where the time point T from which the video data starts to be reproduced coincides with or comes after the time point T1, and where the time point T comes before time point T2. The entry sync_info(1) has a field timing indicating a value corresponding to time coming before the time point T1, and has a field independent_flag indicative of "1". The entry sync_info(2) has a field independent_flag indicative of "0", and has a field merged_flag indicative of "0". Therefore, in the interruption rerun process, interruption corresponding to the entry sync_info(1) and interruption corresponding to the entry sync_info(2) are carried out in this order.

Next, consider a case where the time point T from which the video data starts to be reproduced coincides with or comes after the time point T2, and where the time point T comes before time point T3. The entry sync_info(3) has a field merged_flag indicative of "1", so that interruption corresponding to the entry sync_info(3) is carried out in the interruption rerun process. The entry sync_info(3) does not require a process of relocating the graphics A, which process is required by the entry sync_info(2). Accordingly, the interruption corresponding to the entry sync_info(3) is executed with throughput lower than that in the case where the interruption corresponding to the entry sync_info(1) and the interruption corresponding to the entry sync_info(2) are carried out in this order. This makes it possible to shorten time required in actually starting the reproduction from the time point T.

Next, consider a case where the time point T from which the video data starts to be reproduced coincides with or comes after the time point T3, and where the time point T comes before time point T4. The entry sync_info(4) has an field independent_flag indicative of "1". Therefore, interruption corresponding to the entry sync_info(1), and interruption corresponding to the entry sync_info(2) do not need to be carried out in the interruption rerun process, but only interruption corresponding to the entry sync_info(4) is carried out therein.

Next, consider a case where the time point T from which the video data starts to be reproduced coincides with or comes after time point T4. In this case, interruption corresponding to the entry sync_info(4), and interruption corresponding to the entry sync_info(5) are carried out in the interruption rerun process.

As explained above, the synchronization timing information is contained in the optical disk 2, so that a video clock change occurring until such an arbitrary time in the video data does not need to be produced again for generation of graphics corresponding to the arbitrary time point. This shortens time required in starting the reproduction. Moreover, the field independent_flag is contained in the synchronization timing information, so that time taken for the display of the graphics can be further shortened. Further, the time taken for the display of the graphics can be further shortened by preparing a process allowing acquirement of the result obtained by merging the results of the individual processes.

As described above, a reproducing apparatus of the present invention may be arranged such that: before starting reproduction from a specific time point of content data, synchronization control means respectively transmits regulation control signals in accordance with timing information items respectively including timing specifying information items each indicating a time point coming before the specific time point, in order from a regulation control signal corresponding to a timing specifying information item having a smallest number.

On this account, a clock change occurring until an arbitrary time does not need to be produced again when reproducing the content data from the arbitrary time. This makes it possible to shorten time required in starting the reproduction.

Further, the reproducing apparatus of the present invention may be arranged such that: each timing information item includes dependency information indicating a dependency relation with other timing information items of a timing information aggregation made up of timing information items; and before starting the reproduction form the specific time point of the content data, the synchronization control means checks the dependency information, and respectively transmits synchronization control signals in accordance with timing information items each of which does not depend on the other timing information items, and each of which includes a timing specifying information indicating a time point that comes before the specific time point and that is the closest to the specific time point, the synchronization control signals being sent in order from a regulation control signal corresponding to a timing specifying information item having a smallest number.

On this account, unnecessary processes do not need to be carried out. This makes it possible to shorten time required in displaying a graphics and starting the reproduction.

Further, the reproducing apparatus according to the present invention may be arranged such that: a plurality of synchronization executing programs constitute a synchronization executing program aggregation; and the synchronization executing program aggregation includes a synchronization executing program (merged synchronization executing program) which allows an identical result to a result obtained through processes carried out by other synchronization executing programs; and the synchronization executing program aggregation includes merged synchronization executing program identifying information for identifying whether or not a synchronization executing program specified by action specifying information is the merged synchronization executing program; and before starting the reproduction from the specific time, the synchronization control means checks the merged synchronization executing program identifying information, and makes a reference to the merged synchronization executing program so as to respectively transmit synchronization control signals in accordance with timing information items respectively including timing specifying information items each indicating a time point coming before the specific time point, in order from a synchronization control signal corresponding to timing specifying information having a smallest number.

On this account, unnecessary processes do not need to be carried out. This makes it possible to shorten time required in displaying a graphics and starting the reproduction.

[Embodiment 3]

Another embodiment of the present invention will be explained below with reference to FIG. 18. For ease of explanation, materials having the equivalent functions as those shown in the drawings pertaining to Embodiments 1 and 2 will be given the same reference symbols, and explanation thereof will be omitted here. Further, the wordings defined in Embodiments 1 and 2 are used in the present embodiment in accordance with the definition made in Embodiments 1 and 2, unless otherwise noted. The present embodiment is a modified example of Embodiment 1, and allows for "special reproduction" such as high speed reproduction. For this reason, the present embodiment and Embodiment 1 have a lot in common, so that the following description only deals with differences from Embodiment 1.

<System Structure>

The present embodiment has the same system structure as that of Embodiment 1, so that explanation thereof is omitted.

<Program Executing Section>

The present embodiment has the same program executing section as that of Embodiment 1, so that explanation thereof is omitted.

<Output Control Section>

The present embodiment has the same output control section as that of Embodiment 1, so that explanation thereof is omitted.

<Video Reproducing Section>

The video reproducing section of Embodiment 1 and that of the present embodiment are substantially the same, but are different from each other in that: in the present embodiment, the synchronization control section 22 monitors a condition of the decoder 24, and transmits the synchronization control signal in accordance with (i) the condition of the decoder 24 and (ii) execution condition information (below-mentioned field condition( ). For attainment of this, the synchronization timing information contains the execution condition information indicating the condition in which the decoder 24 is when the synchronization executing program should be executed.

Specifically, the synchronization control section 22 always monitors the reproduction condition (e.g., normal reproduction, high speed reproduction, reverse reproduction, and slow reproduction) of the decoder 24, and determines in accordance with the reproduction condition whether or not interruption corresponding to each of entries contained in the synchronization timing information is carried out. Specifically, in cases where, e.g., a field normal of the entry is indicative of "1", the synchronization control section 22 determines, in reference to below-mentioned fields normal, FF, FR, SF, and SR of the entry, that interruption is carried out during the normal reproduction. Meanwhile, in cases where the field FF is indicative of "1", the synchronization control section 22 determines, in reference to the fields, that interruption is carried out during the high speed reproduction.

<Synchronization Timing Information>

Explained here is a data structure of the synchronization timing information of the present embodiment, with reference to FIG. 18. Each of FIG. 18(a) and FIG. 18(b) is an explanatory diagram illustrating the data structure of the synchronization timing information.

As shown in FIG. 18(a), each of the entries sync_info( ) is made up of four fields: timing, target, action_id, and condition( ). The fields timing, target, and action_id are the same as those of Embodiment 1, so that explanation thereof is omitted. Note that, it is preferable that the entries sync_info( ) contained in the synchronization timing information be arranged in order of values of respective fields timing of the entries.

As shown in FIG. 18(b), the field condition( ) (execution condition information) is made up of the sub fields: normal, FF, FR, SF, and SR. The sub field normal indicates whether or not interruption corresponding to the entry sync_info( ) including the sub field normal is carried out. Specifically, in cases where the sub field normal is indicative of "1", the interruption is carried out. On the other hand, in cases where the sub field normal is indicative of "2", no interruption is carried out. Similarly, the sub field FF indicates whether or not interruption is carried out during forward high speed reproduction. The sub field FR indicates whether or not interruption is carried out during reverse high speed reproduction. The sub field SF indicates whether or not interruption is carried out during forward slow speed reproduction. The sub field SR indicates whether or not interruption is carried out during reverse slow speed reproduction.

As such, the interruption process can be selected in accordance with the reproduction condition. This makes it possible to carry out a process in accordance with the reproduction condition. For example, a special graphics is displayed only during the fast forwarding. This allows the user to enjoy the content repeatedly, with the result that an additional value of the content is improved.

As described above, the reproducing apparatus of the present invention may be arranged such that: the timing information contains the execution condition information indicating the condition, in which the synchronization executing program should be executed, of the decoding means. Moreover, the reproducing apparatus of the present invention may be arranged such that: the synchronization control means monitors the condition of the decoding means, and transmits the synchronization control signal in accordance with the condition of the decoding means and the execution condition information.

This makes it possible to select an interruption process in accordance with the reproduction condition, with the result that a process can be carried out in accordance with the reproduction condition. For example, special graphics is displayed only during the fast forwarding. This allows the user to enjoy the content repeatedly, with the result that an additional value of the content is improved.

[Embodiment 4]

Another embodiment of the present invention will be explained below with reference to FIG. 19 through FIG. 27. For ease of explanation, materials having the equivalent functions as those shown in the drawings pertaining to Embodiments 1, 2, and 3 will be given the same reference symbols, and explanation thereof will be omitted here. Further, the wordings defined in Embodiments 1, 2, and 3 are used in the present embodiment in accordance with the definition made in Embodiments 1, 2, and 3, unless otherwise noted.

<System Structure>

Figure 19:
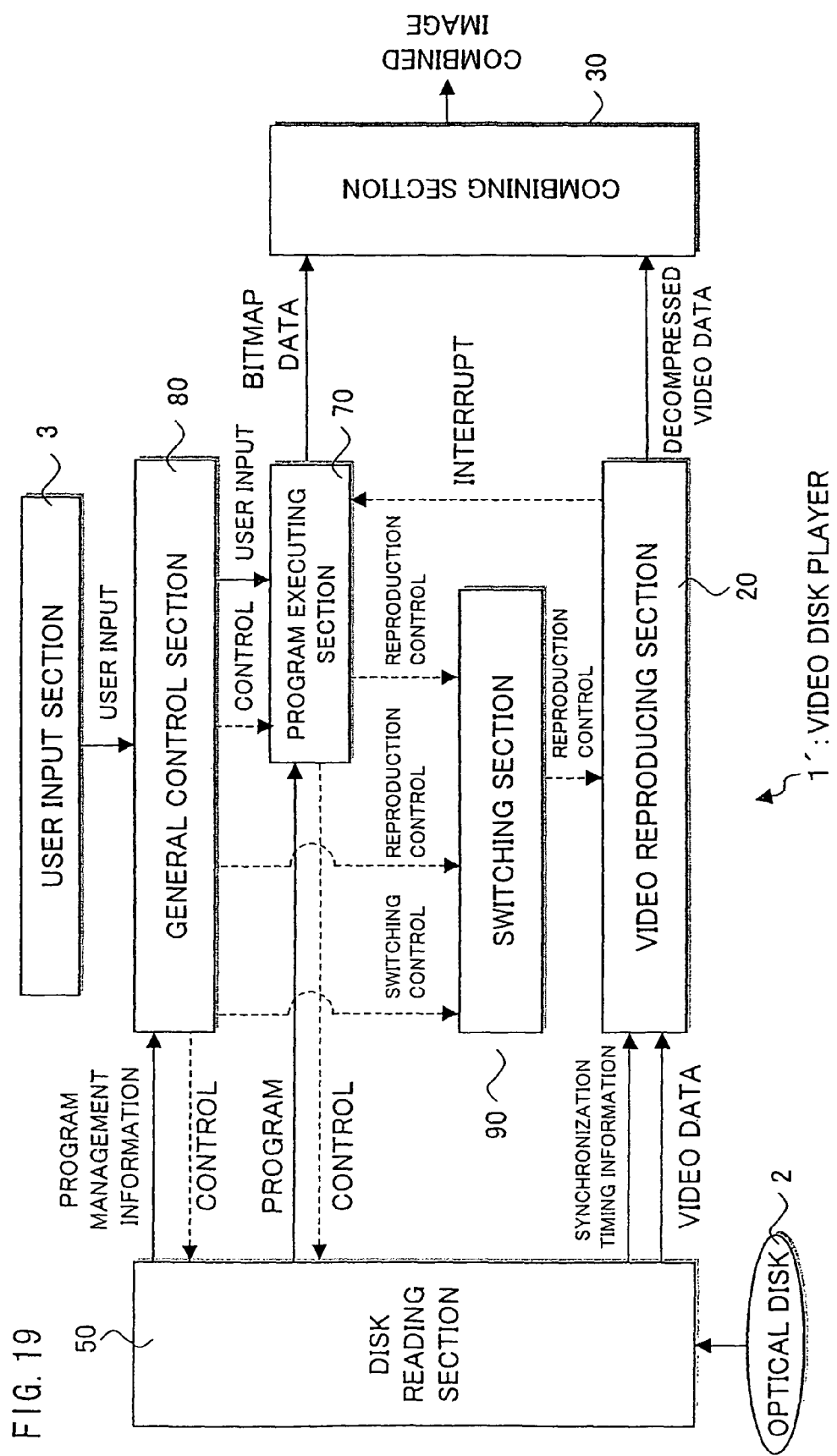
FIG. 19 is a function block diagram fully illustrating a structure of a video disk player according to another embodiment of the present invention.

FIG. 19 is a functional block diagram schematically illustrating a structure of a video disk player 1' according to the present embodiment.

The video disk player 1' (reproducing apparatus) is an apparatus for reproducing AV data stored in an optical disk 2. As shown in FIG. 19, the video disk player 1' includes a user input section 3, a video reproducing section 20, a combining section 30, a disk reading section 50, a program executing section 70, a general control section (general control means; notifying means) 80, and a switching section (switching means) 90.

The disk reading section 50 reads out video data (content data), programs (synchronization executing programs), synchronization timing information, and program management information from the optical disk 2 (content recording medium). The disk reading section 50 sends each of the programs to the program executing section 70, and sends the video data and the below-mentioned synchronization timing information to the video reproducing section 20, and sends the program management information to the general control section 80.

The user input section 3 is a section via which the user manipulates the video disk player 1'. Specifically, the user input section 3 corresponds to a remote controller, and a button provided in a front panel of the device. The user input section 3 generates manipulation information (user input manipulation information; reproduction control information), and sends the manipulation information to the general control section 80. Examples of the user manipulation include: (i) reproduction control manipulation such as reproduction start manipulation and suspending manipulation; (ii) menu manipulation such as menu calling-up manipulation, manipulation of returning from the menu to the content; and (iii) GUI manipulation such as manipulation of moving a cursor in all the directions, and determining manipulation.

The general control section 80 carries out general control over the video disk player 1'. Specifically, the general control section 80 controls the program executing section 70 and the switching section 90 in accordance with the program management information read out by the disk reading section 50. Further, the general control section 80 transfers, to the program executing section 70 and the switching section 90, a user input sent from the user input section 3.

The program executing section 70 executes the program. Specifically, the program executing section 70 executes the program so as to control the video reproducing section 20 via the disk reading section 50 and the switching section 90. Moreover, the program executing section 70 executes the program so as to generate bitmap data, and sends the generated bitmap data to the combining section 30. Note that, in the present embodiment, the program executed by the program executing section 70 is not limited to such a program for generating the output data.

The switching section 90 carries out switching between targets from which reproduction control information to be sent to the video reproducing section 20 is supplied. Specifically, the switching section 90 selects, in accordance with the control (reproduction control switching information) carried out by the general control section 80, either one of (i) reproduction control information sent from the general control section 80 and (ii) reproduction control information sent from the program executing section 70. Then, the switching section 90 sends the selected reproduction control information to the video reproducing section 20.

The video reproducing section 20 decodes the video data sent from the disk reading section 50, and sends the decompressed video data to the combining section 30. Further, the video reproducing section 20 controls the program executing section 70 in accordance with the synchronization timing information sent from the disk reading section 50.

The combining section 30 combines (i) the bitmap data sent from the program executing section 70, with (ii) the decompressed video data sent from the video reproducing section 20. Then, the combining section 30 outputs an image (combined image) obtained by the combining.

For simplicity of explanation, no output control section 40 described in each of the foregoing embodiments is not provided in the present embodiment; however, it is easy to provide such an output control section 40 in the video disk player 1' of the present embodiment.

<Program Executing Section>

Figure 20:
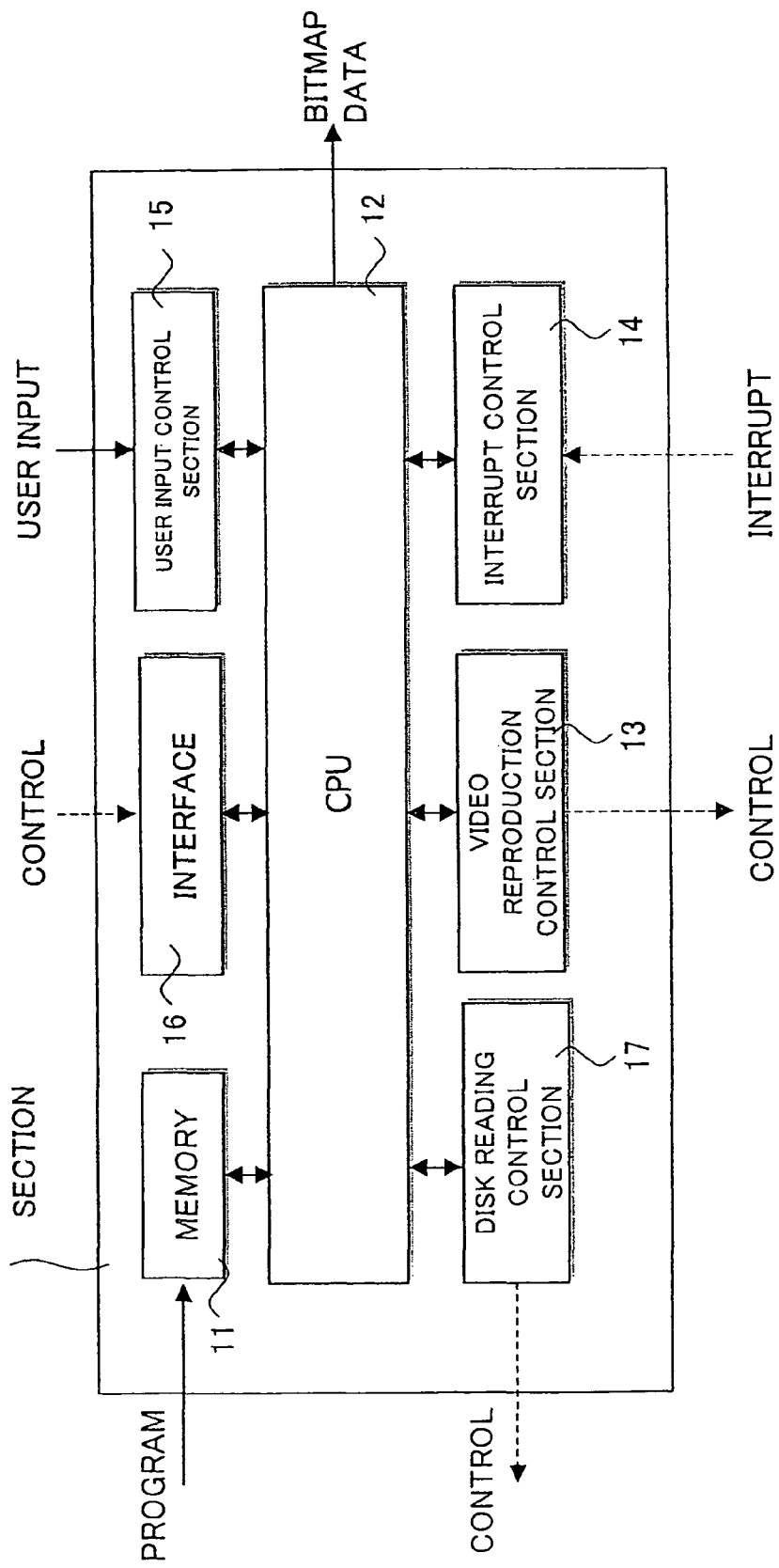
FIG. 20 is a function block diagram fully illustrating a structure of a program executing section of the video disk player shown in FIG. 19.

FIG. 20 is a function block diagram fully illustrating a structure of the program executing section 70.

As described above, the program executing section 70 executes the program in accordance with the synchronization control signal received from the synchronization control section 22. Specifically, the program executing section 70 executes the program specified by a field action_id contained in the synchronization control signal received from the synchronization control section 22. Particularly in the present embodiment, the program executing section 70 executes the program for generating the image data to be overlaid with the video image.

As shown in FIG. 20, the program executing section 70 is made up of a memory 11, a CPU 12, a video reproduction control section 13, an interrupt control section 14, a user input control section 15, an interface 16, and a disk reading control section 17.

The memory 11 temporarily stores the program sent from the disk reading section 50. The CPU 12 reads out the program stored in the memory 11, and executes the program. In accordance with how the program runs, the CPU 12 sends an instruction to the video reproduction control section 13, or sends the bitmap data to the combining section 30.

The video reproduction control section 13 sends a control signal to the video reproducing section 20 in accordance with the program thus executed. Specific examples of the control signal include: (i) a control signal for controlling the reproduction such as reproduction start and reproduction suspending, and (ii) a control signal for acquiring a state such as current reproduction time. The interrupt control section 14 receives an interrupt from outside of the program executing section 70, and sends the interrupt to the CPU 12. The CPU 12 launches an interrupt handler upon the reception of the interrupt from the interrupt control section 14. Note that various types of information supplied from the member having sent the interrupt are stored in a register (not shown) of the interrupt control section 14.

The user input control section 15 receives, as the interrupt, the user input information transferred from the general control section 80, and sends the interrupt to the CPU 12. The CPU 12 launches the interrupt handler upon the reception of the interrupt from the user input control section 15. Note that various types of information supplied by way of the interruption are stored in a register (not shown) of the user input control section 15.

The interface 16 serves as an interface between the general control section 80 and the program executing section 70. Via the interface 16, the general control section 80 instructs the program executing section 70 to read out and execute the program. In the meanwhile, when the execution of the program is finished, the program executing section 70 notifies the general control section 80 that the execution of the program is finished.

The disk reading control section 17 controls the disk reading section 50 in accordance with an instruction sent from the CPU 12.

<General Control Section>

Figure 21:
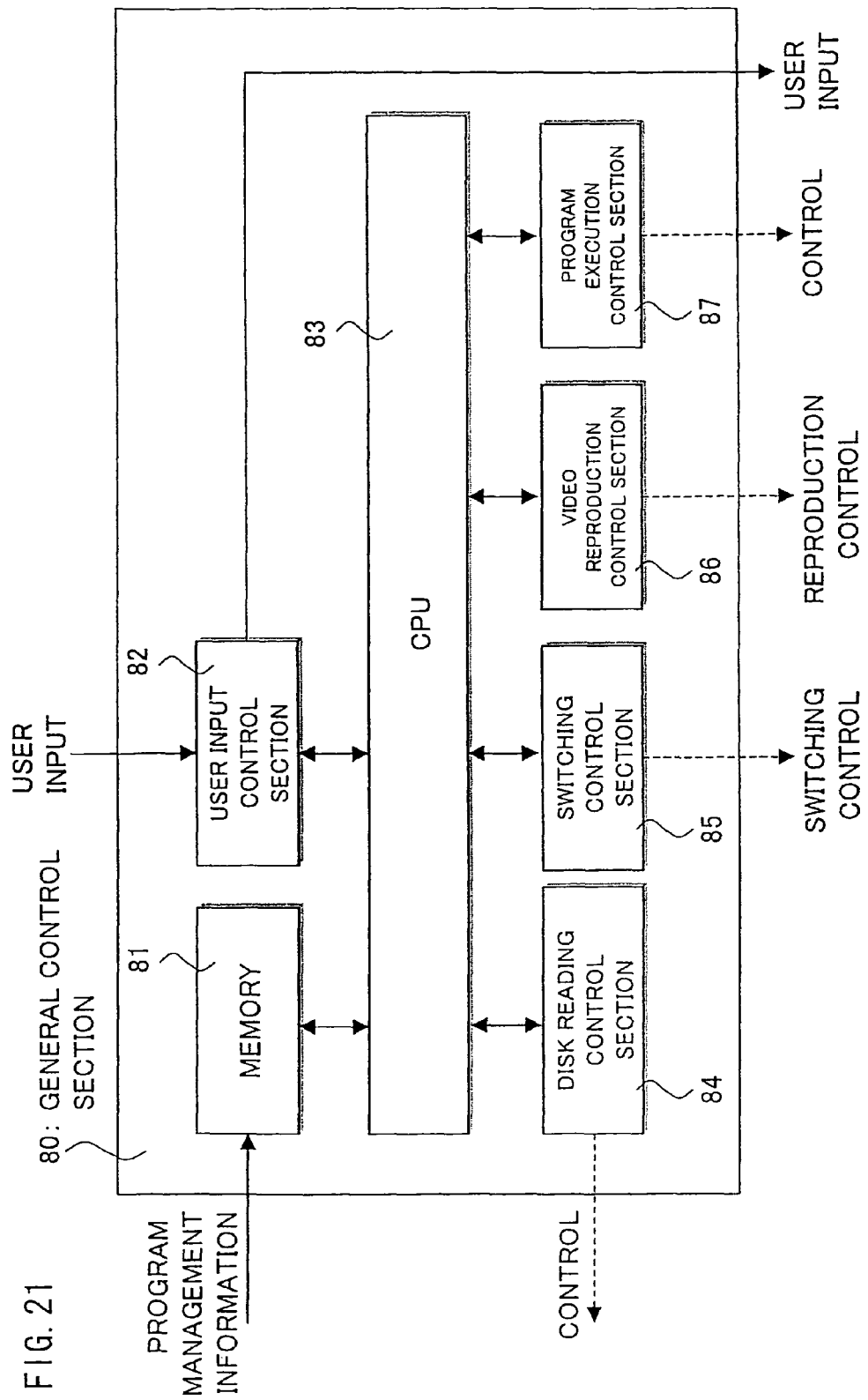
FIG. 21 is a function block diagram fully illustrating a structure of a general control section of the video disk player shown in FIG. 19.

FIG. 21 is a functional block diagram fully illustrating a structure of the general control section 80.

As described above, the general control section 80 carries out general control over the video disk player 1' in accordance with the program management information read out by the disk reading section 50.

As shown in FIG. 21, the general control section 80 is made up of a memory 81, a user input control section 82, a CPU 83, a disk reading control section 84, a switching control section 85, a video reproduction control section 86, and a program execution control section 87.

The memory 81 temporarily stores the program management information sent from the disk reading section 50. The CPU 83 reads out the program management information stored in the memory 81. In accordance with the program management information thus read out, the CPU 83 sends an instruction to each of the user input control section 82, the disk reading control section 84, the switching control section 85, the video reproduction control section 86, and the program execution control section 87.

The user input control section 82 simultaneously sends, to the program executing section 70 and the CPU 83, the user input sent from the user input section 3. The CPU 83 interprets the user input in accordance with the program management information so as to control the program execution control section 87 and the video reproduction control section 86.

The disk reading control section 84 controls the disk reading section 50 in accordance with the instruction sent from the CPU 83.

The switching control section 85 controls the switching section 90 in accordance with the instruction sent from the CPU 83.

The video reproduction control section 86 sends an control signal to the video reproducing section 20. Examples of the control signal includes: (i) a control signal for specifying video data to be reproduced; (ii) a control signal for starting the readout; (iii) a control signal for starting the decoding; (iv) a control signal for ending the decoding; (v) a control signal for jumping to either a preceding chapter or a subsequent chapter; and (vi) a control signal for starting high speed reproduction.

The program execution control section 87 sends control information to the program executing section 70 in accordance with the instruction sent from the CPU 83.

<Video Reproducing Section>

The video reproducing section 20 of the present embodiment is substantially the same as that of Embodiment 1; however, they are different in that the video reproducing section 20 of the present embodiment includes no output control section 40. Therefore, the video reproducing section 20 of the present embodiment does not control the output side buffer switching section 43 via the synchronization control section 22, unlike the one shown in FIG. 4.

<Program Management Information>

Explained here is a data structure of the program management information stored in the optical disk 2, with reference to FIG. 22(a) and FIG. 22(b).

The program management information is made up of various types of information required by the general control section 80 for the purpose of controlling the program execution. One program management information item is prepared for one program.

All the program information items stored in the optical disk 2 are stored in a program management table shown in FIG. 22(a). Indicated by number_of_pmi is the number of the program management information items stored in the program management table. Note that a first entry of the program management table indicates a program to be automatically executed in response to insertion of the optical disk 2.

FIG. 22(b) is an explanatory diagram illustrating a data structure of the program management information. As shown in FIG. 22(b), the program management information is made up of fields program_file_name, playback_control_mode, is_video_specified, video_file_name, start_mode, resume_flag, and menu_flag.

The field program_file_name (program specifying information) is a field for specifying the filename of a file storing the program.

The field playback_control_mode is a flag indicating whether or not a user input corresponding to the reproduction control manipulation is sent from the general control section 80 to the video reproducing section 20. In cases where the reproduction control manipulation is not sent thereto, the playback_control_mode is set at "0". On the other hand, in cases where the reproduction control manipulation is sent thereto, the playback_control_mode is set at "1". Such a flag allows a content creator to select whether (i) responsiveness to the reproduction control manipulation carried out by the user is taken into great consideration, or (ii) freedom in the program takes priority over the responsiveness. This will be described later.

The field is_video_specified is a flag indicating whether or not video data to be reproduced concurrently with the execution of the program is specified. In cases where the video data is not specified, the field is_video_specified is set at "0". On the other hand, in cases where the video data is specified, the field is_video_specified is set at "1". In cases where the flag is indicative of "1", the field video_file_name and the field start_mode come after the field is_video_specified.

The field video_file_name (content data specifying information) is a field for specifying the filename of the video data file to be reproduced concurrently with the execution of the program. As described above, the field video_file_name exists only when the field is_video_specified is indicative of "1". In reference to the field video_file_name, the video data and the synchronization timing information can be read out from the optical disk 2 prior to the execution of the program. Accordingly, time required in starting the reproduction of the video data can be shortened. This will be explained later.

The field start_mode (reproduction start instruction necessity information) is a flag indicating whether (i) display of the video data specified by the field video_file_name will be started by an instruction contained in the program specified by the field program_file_name, or (ii) the display of the video data will be started irrespective of the program. In cases where the display of the video data specified by the field video_file_name will be started by the instruction contained in the program, the field start_mode is set at "0". On the other hand, in cases where the display of the video data will be started irrespective of the program, the field start_mode is set at "1". As described above, the field start_mode exists only when the field is_video_specified is indicative of "1". In reference to the field is_video_specified, it is possible to judge whether or not the start of the reproduction of the video data depends on synchronization with the execution of the program. In cases where the start of the reproduction of the video data does not depend on the synchronization, the time required in starting the video reproduction can be further shortened. This will be explained later.

The field menu_flag is a flag indicating whether or not the program specified by the program management information containing the field menu_flag is a "menu content". The menu content refers to a content obtained by executing the program in response to the menu calling-up manipulation carried out by the user. In cases where the program is such a program that corresponds to the menu content, the field menu_flag is indicative of "1". Otherwise, the field menu_flag is indicative of "0".

The field resume_flag (resuming capability information) is a flag indicating whether or not the program specified by the program management information containing the field resume_flag corresponds to a target content to be resumed. The wording "resuming (resume)" refers to a function for resuming reproduction of a content from a point at which previous reproduction thereof was suspended due to the menu readout carried out by the user. The reproduction of the content is resumed when the user carries out manipulation of returning from the menu to the previous reproduction condition. In cases where the program corresponds to the target content to be resumed, the field resume_flag is indicative of "1". Otherwise, the field resume_flag is indicative of "0". A reason why such a flag is required is explained as follows. That is, contents are classified into the following two types (1) and (2): (1) a content in which the program is executed in synchronization with the video reproduction, and (2) a content in which the program is executed not in synchronization with the video reproduction. A specific example of the content (2) (latter one) is a content in which video is reproduced as a part of a game program. The content (1) (former one) can be resumed with ease; however, it is difficult to resume the content (2). In light of this, the flag resume_flag is provided so as to allow the general control section 80 to easily distinguish the contents (1) and (2). This makes it possible that: a content which cannot be resumed by using the resuming function never becomes a target to be resumed, and the user is notified that the content cannot be resumed.

<Data Allocation and File Structure>

Figure 23:
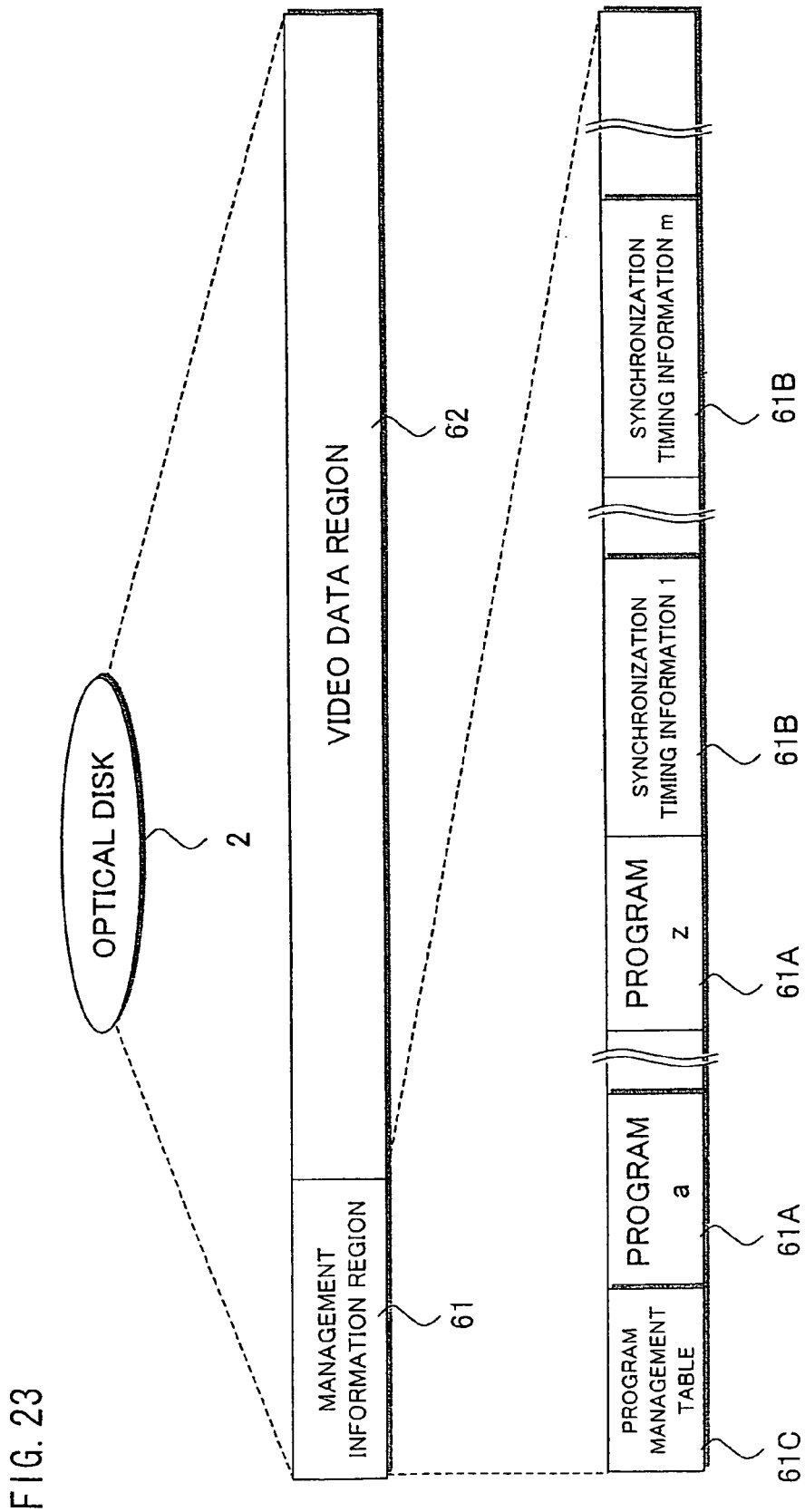
FIG. 23 is an explanatory diagram illustrating data allocation in an optical disk to be reproduced by the video disk player shown in FIG. 19.

FIG. 23 is an explanatory diagram illustrating data allocation in the optical disk 2.

As shown in FIG. 23, the optical disk 2 is made up of a management information region 61 and a video data region (content data storing region) 62. The management information region 61 is made up of (i) a program management information storing region 61c storing the program management table, (ii) a program storing region (synchronization program storing region) 61A storing the programs, and (iii) a synchronization timing information storing region 61B storing the synchronization timing information. The video data region 62 stores the video data. Note that the program management table, the synchronization timing information, the programs, and the video data are managed as files, individually.

The program management information is collectively stored in the program management information storing region 61C of the optical disk 2, in the form of the program management table. All the program management information is firstly read out in response to the insertion of the optical disk 2, so that seeking time, etc., required for the readout of the program management information can be shortened.

<Reproducing Process>

Explained next is a reproducing process carried out by the video disk player 1', with reference to FIG. 24.

Figure 24:
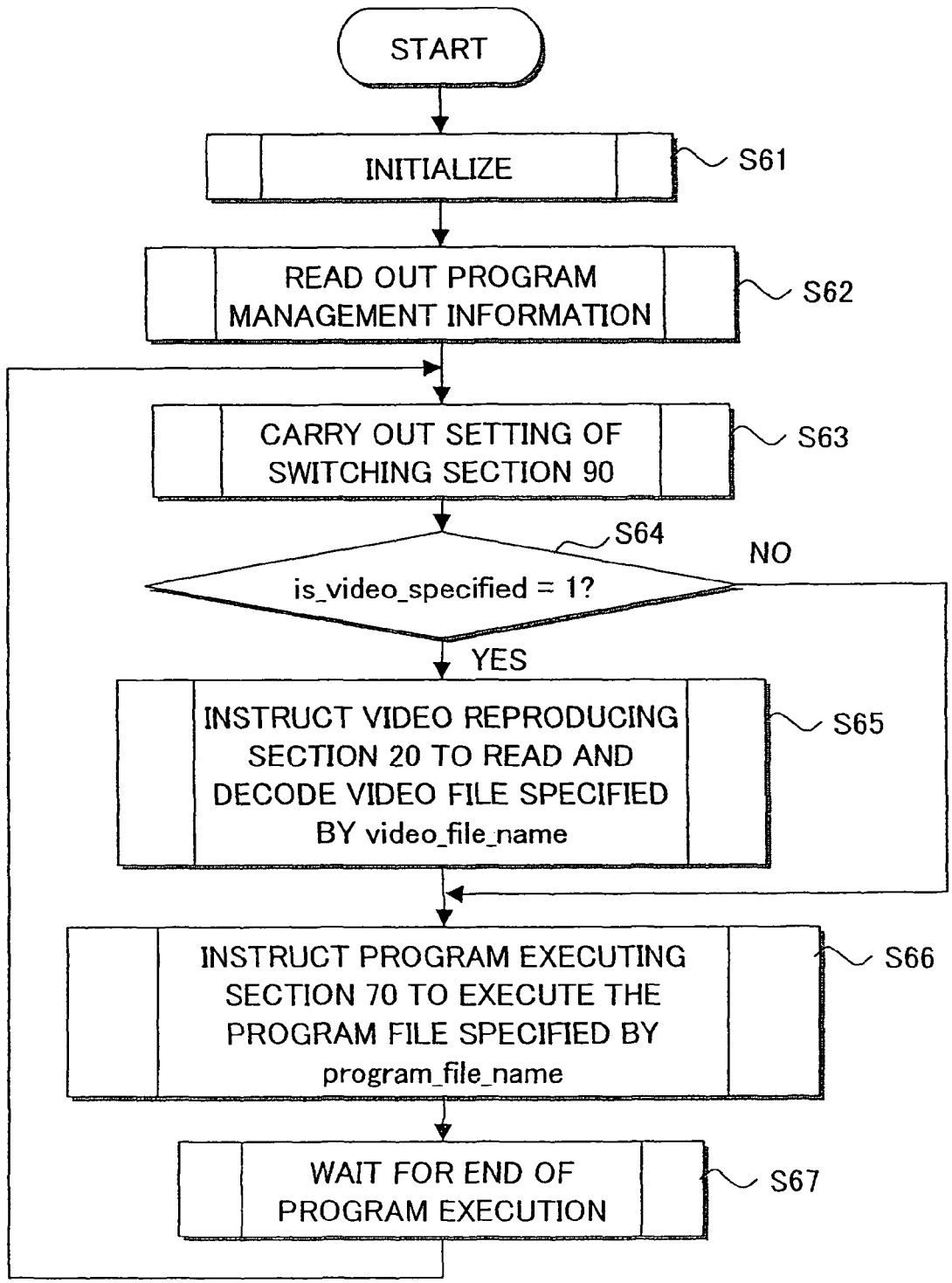
FIG. 24 is a flowchart illustrating processes carried out by the general control section of the video disk player shown in FIG. 19.

FIG. 24 is a flowchart illustrating an entire flow of the reproducing process carried out by the general control section 80 of the video disk player 1'.

Firstly, the video disk player 1' is powered ON, and then file system information (not shown) is read out from the optical disk 2, and initialization of the respective processing sections is carried out (S61).

Next, the program management table is read out from the program management information storing region 61C, and the program management table thus read out is stored in the memory 81 (S62). The first one of the program management information in the program management table stored in the memory 81 is selected as "current program management information".

Carried out next is a setting of the switching section 90 (S63). Specifically, in cases where the field playnback_control_mode of the current program management information is indicative of "1", the switching section 90 is so set as to transfer, to the video reproducing section 20, (i) the reproduction control information supplied from the general control section 80, and (ii) the reproduction control information supplied from the program executing section 70. On the other hand, in cases where the field playnback_control_mode of the current program management information is indicative of "0", the switching section 90 is so set as to transfer, to the video reproducing section 20, only the reproduction control information supplied from the program executing section 70.

Carried out next is check of the field is_video_specified contained in the current program management information (S64). In cases where the field is_video_specified is indicative of "1", the general control section 80 issues, to the video reproducing section 20, an instruction for starting the readout and the decoding of the video file (S65). Carried out in addition to this is setting for an operation to be carried out upon the completion of the display preparation. Specifically, the setting is carried out as follows. That is, in cases where the field start_mode is indicative of "0", the setting is carried out such that no display is carried out until the program gives an instruction. On the other hand, in cases where the field start_mode is indicative of "1", the setting is carried out such that the display is carried out upon the completion of the preparation irrespective of the instruction given from the program.

Next, the general control section 80 issues, to the program executing section 70 via the program executing control section 87, an instruction for executing the program file specified by the field program_file_name (S66).

Next, the general control section 80 waits for completion of the execution of the program (S67). When the completion of the execution of the program is notified by the program executing section 70, the program management information corresponding to the menu content is set as the current program management information, and then the sequence jumps to the step S63. A search for the program management information corresponding to the menu content is carried out by searching for the program management information which has the field menu_flag indicating "1", and which is stored in the program management table of the memory 81.

<Menu Calling-Up Process and Resuming Process>

Explained next is the menu calling-up process and the resuming process each carried out by the video disk player 1', with reference to FIG. 25 and FIG. 26.

Figure 25:
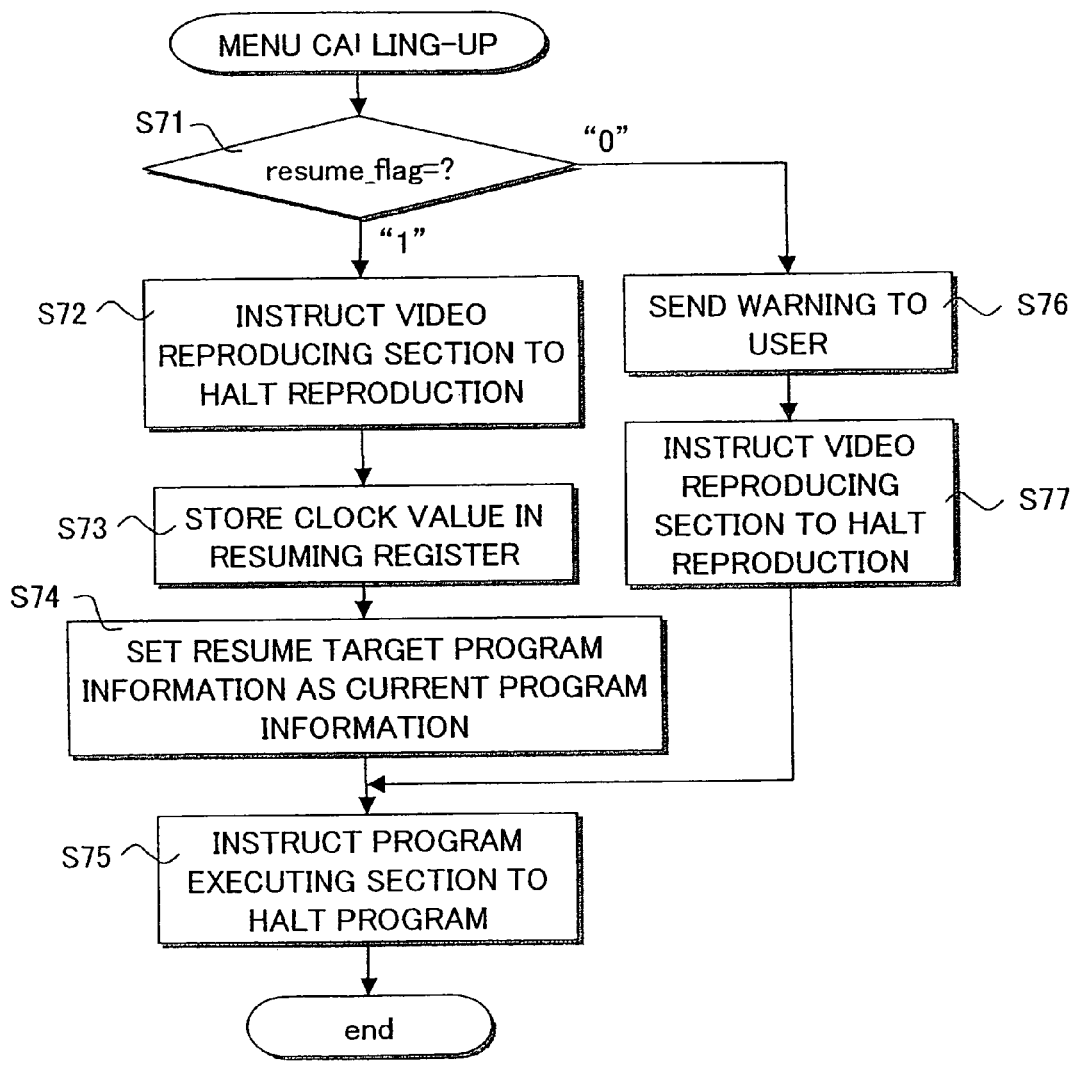
FIG. 25 is a flowchart illustrating a menu calling-up process carried out by the general control section of the video disk player shown in FIG. 19.
Figure 26:
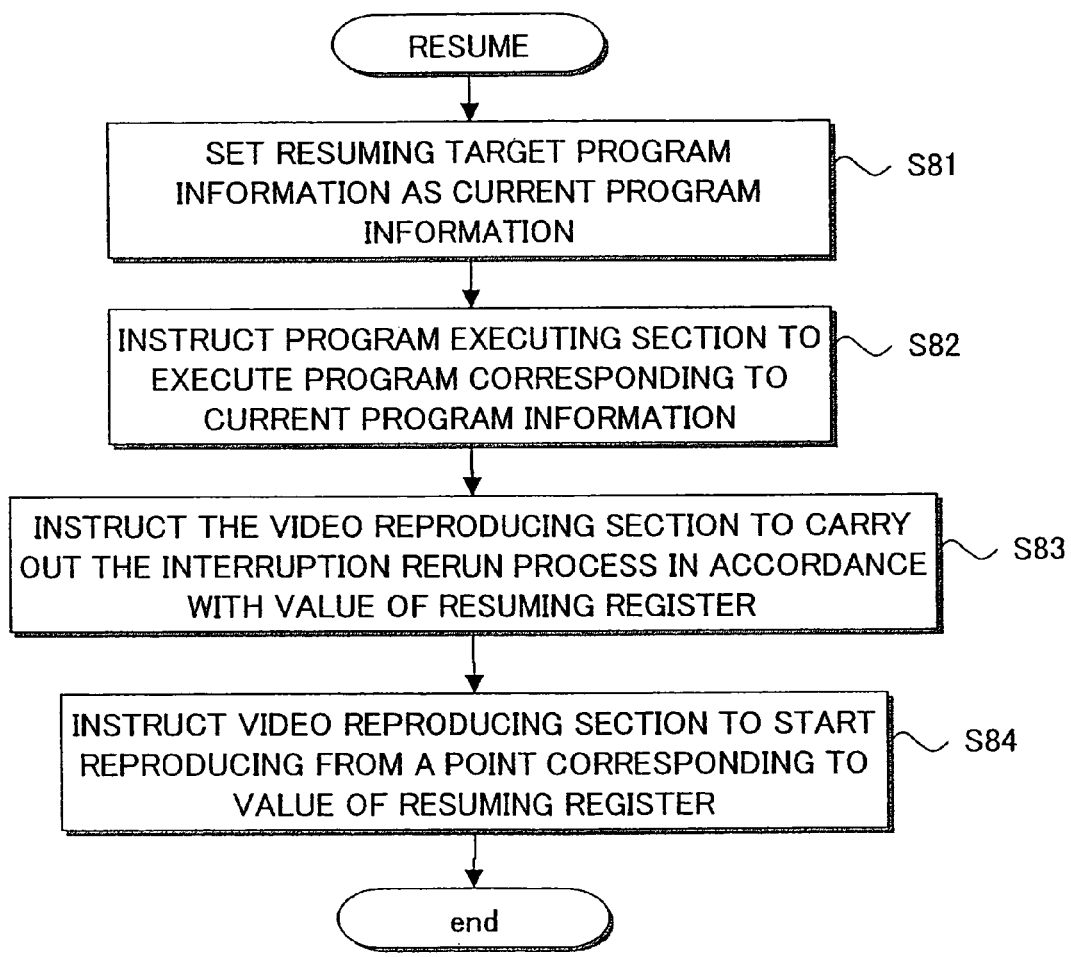
FIG. 26 is a flowchart illustrating a resuming process carried out by the general control section of the video disk player shown in FIG. 19.

Firstly explained is the menu calling-up process with reference to FIG. 25.

When the user carries out the menu calling-up manipulation during the reproduction of the content, a menu calling-up instruction is sent from the user input section 3 to the general control section 80. The general control section 80 thus having received the menu calling-up instruction checks the field resume_flag of the program management information corresponding to the content currently being reproduced (S71). In cases where the field resume_flag is indicative of "0", the user is notified that the resuming cannot be carried out (S76). Then, the general control section 80 issues a reproduction halt instruction to the video reproducing section 20 (S77).

On the other hand, in cases where the field resume_flag is indicative of "1" in the step S71, a halt instruction is issued to the video reproducing section 20 (S72). Further, an instruction is issued so that a current value of the clock 23 (see FIG. 4) of the video reproducing section 20 is stored in a register (resuming register; not shown) (S73). Further, the general control section 80 sets "resuming target program management information" as the current program management information (S74).

Next, the general control section 80 issues a halt instruction to the program executing section 70 (S75).

Thereafter, the general control section 80 sets, as the current program management information, the program management information corresponding to the menu content. Then, the menu content is executed in accordance with the processes of the steps S63 through S66 shown in FIG. 24.

Explained next is the resuming process with reference to FIG. 26.

In cases where the user carries out the returning manipulation (resuming manipulation) during the execution of the menu content, the general control section 80 sets, as the current program management information, the program management information set as the resuming target program management information (S81). Next, the general control section 80 instructs the program executing section 70 to specify the field program_file_name contained in the current program management information, and to execute the program specified by the field program_file_name (S82). Next, the general control section 80 instructs the video reproducing section 20 to (i) set, as the reproduction start time point T, the value stored in the resuming register, and (ii) execute the interruption rerun process explained in Embodiment 2 with reference to FIG. 16 (S83). Further, the general control section 80 instructs the video reproducing section 20 to start the reproduction from the point corresponding to the value stored in the resuming register (S84). This allows realization of the resuming process.

On the other hand, consider a case where the user does not carry out the resuming manipulation and selects another content from displayed menu of the menu content. In this case, the general control section 80 issues, to the video reproducing section 20, an instruction for (i) deleting the value stored in the resuming register, and (ii) canceling the setting in the resuming target program management information.

Note that the above processes can be carried out by using the apparatus structure and the data structure together, each of which makes it possible to reproduce the video data from an arbitrary point, and each of which is explained in Embodiment 2.

<Specific Examples of the Program Management Information and the Processes>

Figure 27:
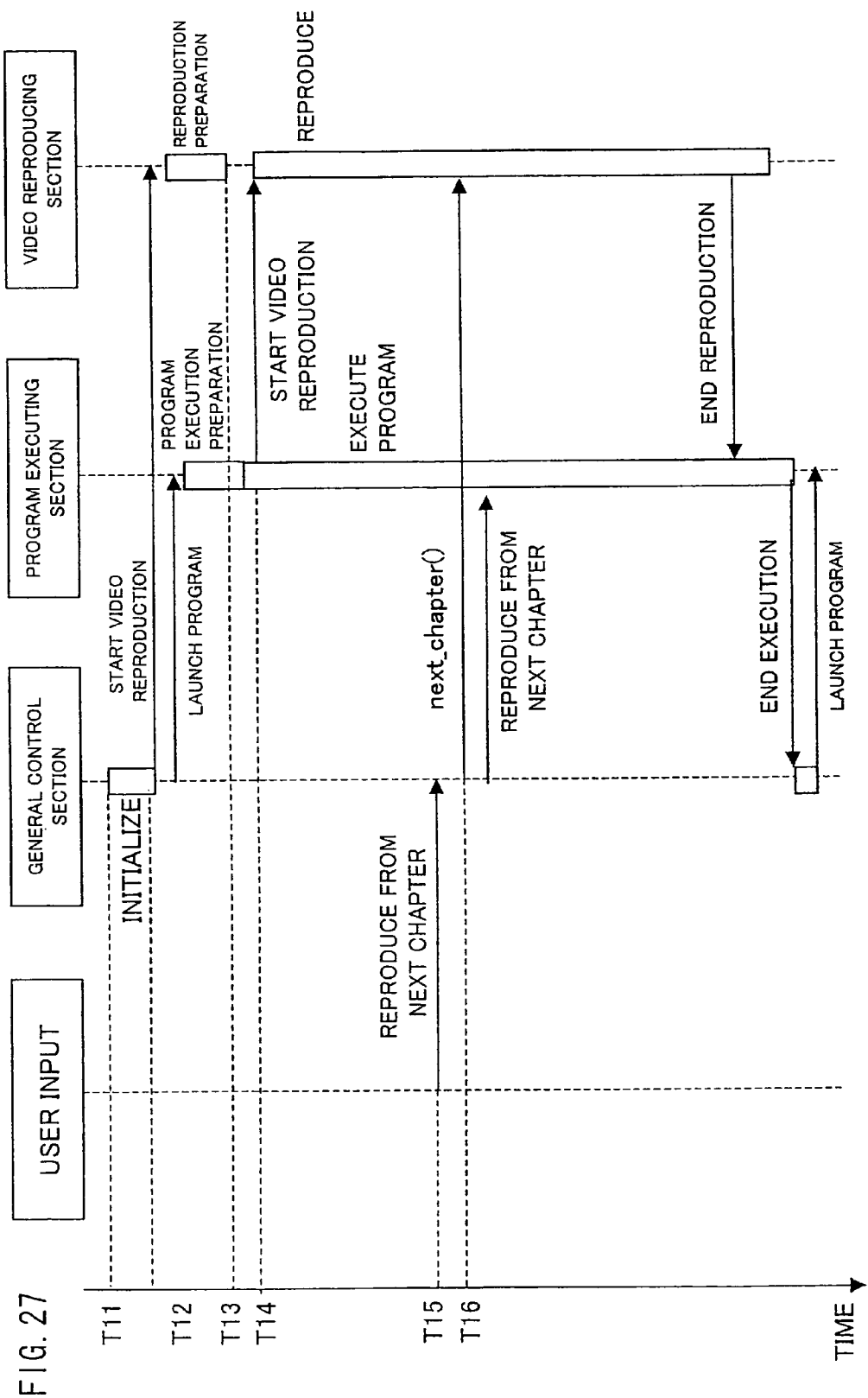
FIG. 27 is a sequence diagram illustrating (i) correlations among respective blocks of the video disk player shown in FIG. 19, and (ii) a case where a field is_video_specified is indicative of 1 and a field playback_control_mode is indicative of 1 and a field start_mode is indicative of 0.

The following explains specific examples of (i) the program management information and (ii) the processes of the present embodiment, with reference to FIG. 27.

EXAMPLE 1

Video-Based Content

See the following example of a setting of the program management information corresponding to the content, whereby video is reproduced when the content is selected, and the user can control the reproduction, and the program is executed in synchronization with the video reproduction:
  playback_control_mode=1
  is_video_specified=1
  start_mode=0

The following explains this setting. The user can control the reproduction. Therefore, the field playback_control_mode is set at "1", for attainment of faster responsiveness to the reproduction control manipulation. Further, the video data to be reproduced is determined in advance, so that the field is_video_specified is set at "1". Further, there is the program to be executed in synchronization with the video reproduction, so that the video reproduction needs to be started after the execution of the program starts. For this reason, the field start_mode is set at "0".

Explained next is a specific example of the process carried out on this occasion, with reference to FIG. 27.

Firstly, the general control section 80 carries out the initializing during a period of time from time point T11 to time point T12. Then, the general control section 80 instructs the video reproducing section 20 to start the video reproduction, and instructs the program executing section 70 to start the program execution. From the time point T12, the video reproducing section 20 starts to read out and decode the video data. At time point T13, the preparation for the video display is completed.

Concurrently with the above processing carried out by the video reproducing section 20, the program executing section 70 reads out the program, and prepares for the execution of the program, and starts executing the program. At time point T14 from which the video reproduction starts, the program executing section 70 that is executing the program issues a video reproduction start instruction to the video reproducing section 20.

When the video data is reproduced to the end, the video reproducing section 20 sends, to the program executing section 70, an interrupt for indicating the end of the video reproduction. In response to the interrupt, the interrupt handler in the program causes a program ending process to be carried out, with the result that the end of the execution of the program is notified to the general control section 80.

As such, the structure of the present embodiment makes it possible that the program executing section 70 and the video reproducing section 20 carry out concurrently the program execution preparation and the video data reproduction preparation, respectively. Accordingly, time required in starting the video reproduction is shortened as compared with that in the conventional technique.

In cases where the synchronization timing for the program does not come in the vicinity of the beginning of the video reproduction, the video reproduction can be started before the completion of the program execution preparation. Therefore, by setting the start_mode at 1, latency time between the time point T13 and T14 can be eliminated. Accordingly, the video reproduction can be started more quickly.

Further, at time point T15, the user carries out reproduction control manipulation "Reproduce from the next chapter". The reproduction control manipulation is sent to the general control section 80, and then is sent directly from the general control section 80 to the video reproducing section 20, i.e., is not sent thereto via the program executing section 60. This makes it possible that the overhead due to the execution of the program becomes small, with the result that the responsiveness to the user's manipulation is improved.

EXAMPLE 2

Program-Based Content

A specific example of a program-based content in which video to be reproduced is just a part of the content is a game. See the following example of a setting of the program management information of such a program-based content:
  playback_control_mode=0
  is_video_specified=0

The following explains this setting. The field playback_control_mode is set at "0" such that the program freely controls the video reproduction. The video data to be reproduced depends on how the program runs, so that the video data to be reproduced is not determined in advance. For this reason, the field is_video_specified is set at "1".

With such a setting, time is required in starting the video reproduction, as compared with that of Example 1; however, such a setting makes it possible to create a program having a high degree of freedom.

<Variation>

The data structure in the present embodiment is a data structure in which the field video_file_name of the program management information can specify only one filename; however, the data structure may be a data structure in which the field video_file_name thereof can specify a plurality of filenames. Consider a case where the order of the filenames specified by the field video_file_name corresponds to the order of data to be reproduced. In this case, at an instant at which reproduction of certain video data is finished, the video reproducing section 20 can start to read out, decode, and reproduce the next video data. This allows such an additional effect that an interlude is short between the reproduction of the video data and the reproduction of the next video data of the content having such a plurality of video data to be reproduced continuously.

In the present embodiment, when the menu calling-up is carried out during the reproduction of the content corresponding to the field resume_flag indicating "0", a warning is given so as to notify that the reproduction of the content cannot be resumed. In addition, a warning may be given in response to a manipulation other than the menu calling-up, such as an attempt of the resuming.

In the present embodiment, the general control section 80 simultaneously issues (i) the reproduction preparation start instruction to the video reproducing section 20, and (ii) the program execution start instruction to the program executing section 70. However, the issuing is not necessarily carried out simultaneously. For example, consider a case where the video reproducing section 20 is not used during reproduction of a content which consists of a program and which does not have any video data to be reproduced. In this case, the video reproduction preparation for the content coming just after the content is caused to start during the reproduction of the content consisting of the program. Accordingly, the latency time required in starting the video reproduction can be further shortened. In this case, a flag indicating whether or not the program specified by the field program_file_name of the program management information causes the video reproduction to be carried out may be added such that the general control section 80 can easily judge whether or not the program causes the video reproduction to be carried out.

Further, in the present embodiment, in cases where a filename of a video data file is specified by the field video_file_name of the program management information, the video reproducing section 20 is instructed to start reading out and decoding the video data file; however, the disk reading section 50 may be instructed to start reading out the video data file, instead. In this case, the readout of the video data from the optical disk 2 can be carried out concurrently with the program execution preparation, with the result that the video reproduction can be started more quickly.

Further, in the present embodiment, the general control section 80 interprets and transmits the various types of information contained in the program management information; however, another function block such as the program executing section 70 may interpret and transmit the various types of information. In cases where the program executing section 70 carries out the interpretation, the program management information corresponding to a program a is stored in another program b. Therefore, just before executing the program a, the program executing section 70 interprets and transmits the program management information which corresponds to the program a, and which is contained in the program b This makes it possible to realize the same function as that in the case where the general control section 80 carries out the interpretation and the transmission. In other words, the feature of the present invention lies in that program management information relevant to a program is stored in a place irrelevant to the program.

In the above case, the program management information corresponding to the program is stored in the different program. On the other hand, in the present embodiment, the program management information is allocated to a place other than any programs. Such allocation allows the following additional effect: no works such as rewriting of an existing program and re-compiling are required even when changing the order in which the programs are executed.

Further, the present embodiment assumes that an entire part of one video data is reproduced by executing a program; however, a part of the video program can be reproduced. In this case, a field indicating reproduction start time and reproduction end time of the video data is added to the program management information. This makes it possible to reproduce various parts of one video data.

Further, the switching control section 85 and the switching section 90 are provided in the present embodiment; however, the switching control section 85 and the switching section 90 are not required when handling only the video-based content. Even in this case, the program can be executed in synchronization with the video reproduction. Moreover, in this case, overhead is never caused by the program in response to the reproduction control manipulation. This attains the effect of the present invention, i.e., the responsiveness to the user's reproduction control manipulation is improved.

Further, when the video data is reproduced to the end, the video reproducing section 20 send, to the program executing section 70, the interrupt indicating the end of the video reproduction; however, the video reproducing section 20 may directly notify the general control section 80 that the video reproduction is finished. In this case, the following procedures are carried out upon the end of the video reproduction: the end of the video reproduction is notified to the general control section 80, and the general control section 80 issues a program execution ending instruction to the program executing section 70 in response to the notification. This makes it possible to avoid such a trouble that the execution of the program is not terminated, due to a defect in the interrupt handler of the program, upon the reception of the interrupt indicating the end of the video reproduction. Accordingly, the following additional effect is obtained: the execution of the program is securely terminated.

Further, the notification may be given to either the program executing section 70 or the general control section 80, depending on whether the content is the video-based content or the program-based content.

[Embodiment 5]

Another embodiment of the present invention will be explained below with reference to FIG. 28 through FIG. 33. For ease of explanation, materials having the equivalent functions as those shown in the drawings pertaining to Embodiments 1, 2, 3, and 4 will be given the same reference symbols, and explanation thereof will be omitted here. Further, the wordings defined in Embodiments 1, 2, 3, and 4 are used in the present embodiment in accordance with the definition made in Embodiments 1, 2, 3, and 4, unless otherwise noted.

<System Structure>

Figure 28:
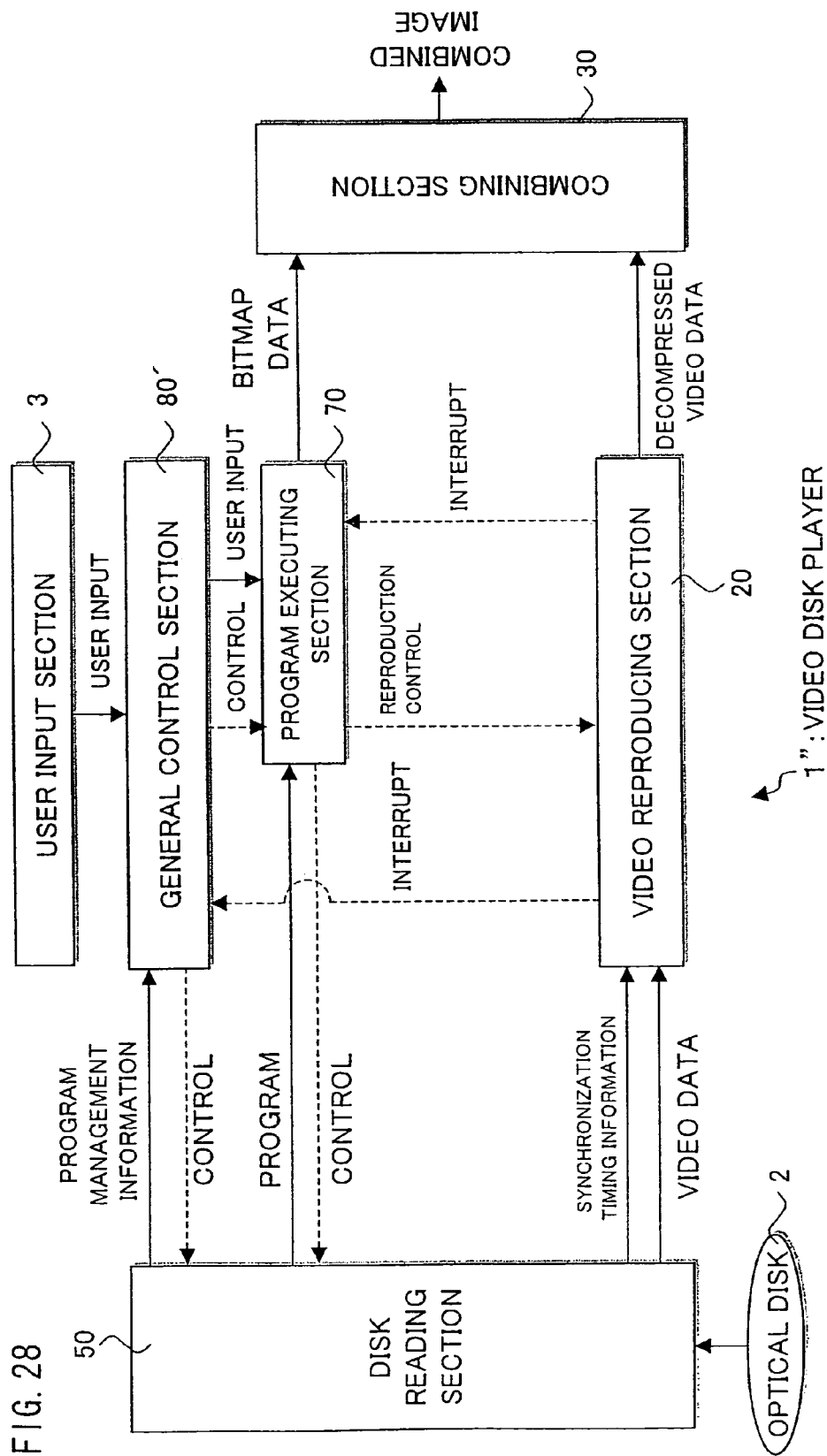
FIG. 28 is a functional block diagram schematically illustrating a structure of a video disk player according to another embodiment of the present invention.

FIG. 28 is a function block diagram schematically illustrating a structure of a video disk player 1" according to the present embodiment.

The video disk player 1" (reproducing apparatus) is an apparatus for reproducing AV data stored in an optical disk 2. As shown in FIG. 28, the video disk player 1" includes a user input section 3, a video reproducing section 20, a combining section 30, a disk reading section 50, a program executing section 70, and a general control section 80'.

The general control section 80' carries out general control over the video disk player 1". Specifically, the general control section 80 controls the program executing section 70 in accordance with program management information read out by the disk reading section 50. Further, the general control section 80 transfers, to the program executing section 70, a user input sent from the user input section 3. Further, the general control section 80' verifies, in accordance with information supplied from the video reproducing section 20 by way of the interruption, whether or not the video data reproduction carried out by the currently executed program is approved by the copyright holder of the video data.

The program executing section 70 executes programs. Specifically, the program executing section 70 executes each of the programs so as to control the disk reading section 50 and the video reproducing section 20. Moreover, the program executing section 70 executes the program so as to generate bitmap data, and sends the generated bitmap data to the combining section 30. Note that, in the present embodiment, the program executed by the program executing section 70 is not limited to such a program for generating the output data.

The video reproducing section 20 decodes video data (content data) sent from the disk reading section 50, and sends the decompressed video data to the combining section 30. Further, the video reproducing section 20 controls the program executing section 70 in accordance with synchronization timing information sent from the disk reading section 50. Further, the video reproducing section 20 uses an interrupt concerning the video data so as to supply, to the general control section 80', information for verifying whether or not the reproduction of the video data corresponding to the program currently being executed is approved by the copyright holder of the video data.

The disk reading section 50, the combining section 30, and the user input section 3 are the same as those of Embodiment 4, respectively. For this reason, explanation thereof is omitted here.

For simplicity of explanation, the output control section 40 and the switching section 90 described in the foregoing embodiments are not provided in the present embodiment; however, it is easy to provide the output control section 40 and/or the switching section 90 in the video disk player 1" of the present embodiment.

<Program Executing Section>

The program executing section 70 of the present embodiment is the same as that of Embodiment 4, so that explanation thereof is omitted.

<General Control Section>

Figure 29:
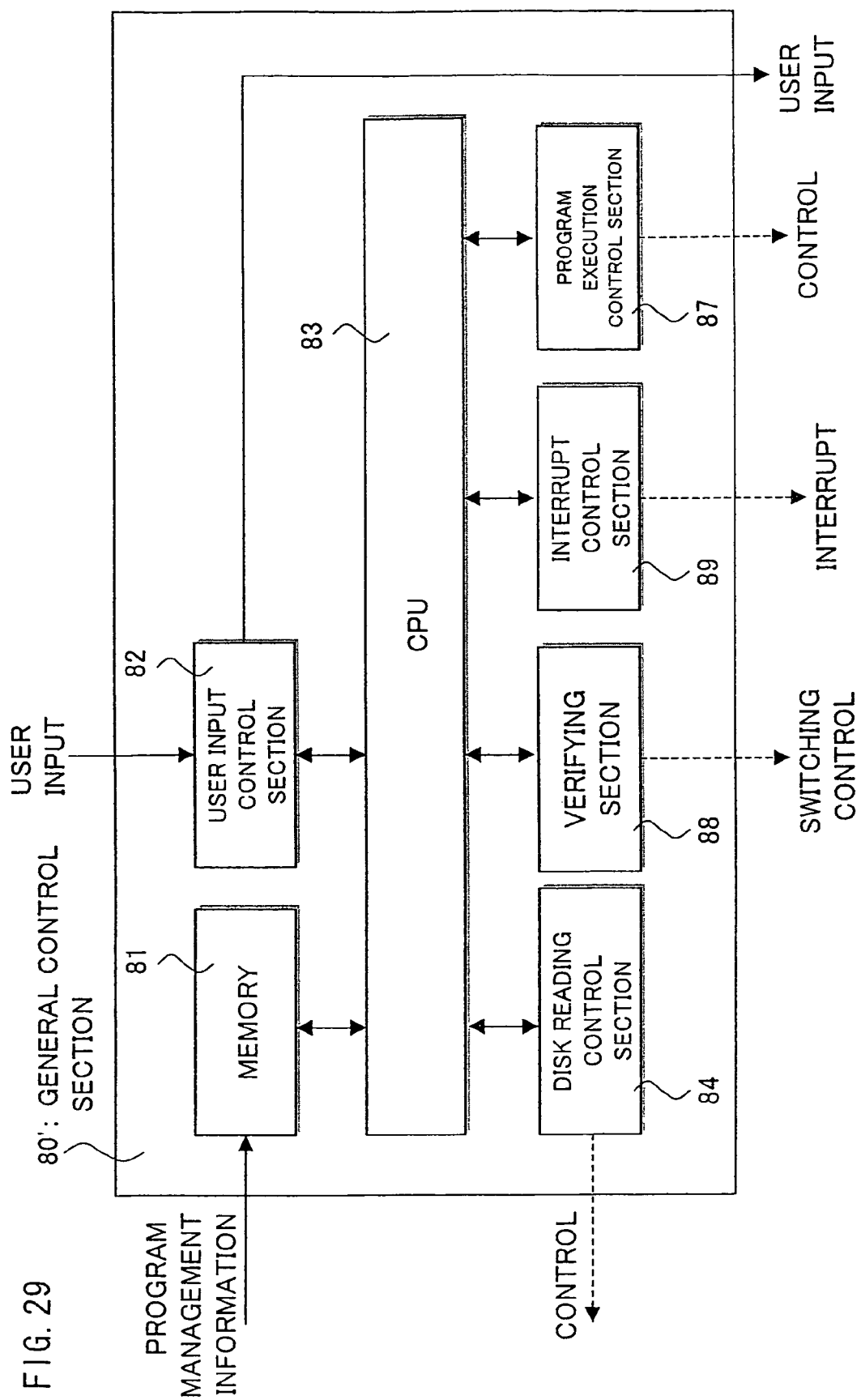
FIG. 29 is a function block diagram fully illustrating a structure of the general control section of the video disk player shown in FIG. 28.

FIG. 29 is a function block diagram fully illustrating a structure of the general control section 80'.

As described above, the general control section 80' carries out the general control over the video disk player 1" in accordance with the program management information read out by the disk reading section 50.

As shown in FIG. 29, the general control section 80' is made up of a memory 81, a user input control section 82, a CPU 83, a disk reading control section 84, a verifying section 88, an interrupt control section 89, and a program execution control section 87.

The memory 81 temporarily stores the program management information sent from the disk reading section 50. The CPU 83 reads out the program management information stored in the memory 81. In accordance with the program management information thus read out, the CPU 83 sends an instruction to each of the user input control section 82, the disk reading control section 84, the verifying section 88, the interrupt control section 89, and the program execution control section 87.

The user input control section 82 simultaneously sends, to the program executing section 70 and the CPU 83, the user input sent from the user input section 3. The CPU 83 interprets the user input in accordance with the program management information so as to control the program execution control section 87.

The disk reading control section 84 controls the disk reading section 50 in accordance with the instruction sent from the CPU 83.

The interrupt control section 89 handles an interrupt sent from the video reproducing section 20. In response to the interrupt, the interrupt control section 89 acquires information for verifying whether or not the copyright holder of the video data approves reproduction of video data that corresponds to the currently executed program and that is set in a register (not shown) of the interrupt control section 89 by the video reproducing section 20. Specifically, the interrupt control section 89 acquires (i) a video data filename for specifying the video data stored in the optical disk 2, and (ii) public key data attached to the video data.

In accordance with (i) the video data filename, (ii) the public key data, and (iii) certificate data contained in the program management information, the verifying section (verifying means) 88 verifies whether or not the reproduction of the video data corresponding to the currently executed program is approved by the copyright holder of the video data. A method for the verification will be described later.

<Video Reproducing Section>

The video reproducing section 20 of the present embodiment is substantially the same as that of Embodiment 1; however, they are different from each other in the following points.

Firstly, no output section 40 is provided in the present embodiment. Therefore, the video reproducing section 20 of the present embodiment does not control the output side buffer switching section 43 via the synchronization control section 22, unlike the one shown in FIG. 4.

Secondly, when starting the reproduction of the video data, the video reproducing section 20 of the present embodiment extracts, from the video data, the public key data attached to the video data. Then, the video reproducing section 20 notifies, by way of an interrupt, the general control section 80' of (i) the extracted public key data, and (ii) the filename of the target video data to be reproduced.

<Program Management Information>

Explained here is a data structure of the program management information stored in the optical disk 2, with reference to FIG. 30(a) and FIG. 30(b).

The program management information is made up of various types of information required by the general control section 80' for the purpose of controlling the program execution. One program management information item is prepared for one program. All the program management information items contained in the optical disk 2 are stored in a program management table shown in FIG. 22(a).

FIG. 30(a) is an explanatory diagram illustrating the data structure of each of the program management information items. As shown in FIG. 30(a), the program management information is made up of fields program_file_name, number_of_video_info, and video_info( ).

The field program_file_name (program specifying information) is a field for specifying a filename of a file storing a program.

The field number_of_video_info is a field for specifying the number of the below-mentioned fields video_info( ).

The field video_info( ) is a data block for storing information concerning the video data to be used by the program corresponding to the program management information containing the field video_info( ). The field video_info( ) is made up of two fields video_file_name and certificate, each of which is shown in FIG. 30(*b*).

The field video_file_name (content data specifying information) is a field for storing the filename of the video data.

The field certificate (authorization information; approval information) is a field for storing certificate data representing approval (authorization) of the reproduction of the video file specified by the field video_file_name contained in the field video_info( ) containing the field certificate.

The following explains (i) a procedure of creating the certificate data, and (ii) a procedure of verifying the certificate, with reference to FIG. 31(*a*) and FIG. 31(*b*).

Explained first is the procedure of creating the certificate data, with reference to FIG. 31(*a*).

Firstly, the copyright holder of the video data creates public keys (verification-use information) and a private key (secret key) in accordance with a public key encryption method. Each of the public keys, and the private key constitute a pair. Note that, in the present embodiment, the RSA method is used as the public key encryption method; however, the present invention is not limited to this. A program creator subjects the program to a hash process, and submits a hash value to the copyright holder of the video data. The copyright holder of the video data encrypts the hash value by using the private key, and then submits, to the program creator, a result obtained through the encryption. The result serves as the certificate.

The certificate is stored in the field certificate of the aforementioned data block video_info( ), so that the certificate is recorded onto the optical disk 2. Meanwhile, the public keys are multiplexed in the target video data with predetermined intervals therebetween, so that the public keys are recorded onto the optical disk 2.

Explained next is the procedure of verifying the certificate data, with reference to FIG. 31(*b*).

Firstly, each of the public keys is extracted from the video data. Then, the field certificate corresponding to the video data is extracted from the program management information so as to be decrypted (decoded) by the aforementioned public key. A result obtained through the decryption is compared with the result obtained by carrying out the hash process with respect to the program. In cases where the field certificate is not encrypted with the private key corresponding to the public key, the field certificate cannot be decrypted accurately. This is a characteristic of the public key encryption. Therefore, in cases where the results coincide with each other, the program is judged as a program approved to use the video data. On the other hand, in cases where the results do not coincide with each other, the program is judged as a program using the video data wrongly.

Because the public keys are multiplexed in the video data with predetermined intervals therebetween as described above, the pickup never travels for the readout of the public keys. On this account, when starting the video reproduction, no latency time is caused due to the readout of the public keys. This makes it possible to shorten a response time in starting the reproduction.

<Data Allocation and File Structure>

A data allocation and a file structure of the present embodiment are the same as those of Embodiment 4, so that explanation thereof is omitted.

<Reproducing Process>

Explained next is a reproducing process carried out by the video disk player 1", with reference to FIG. 32.

Figure 32:
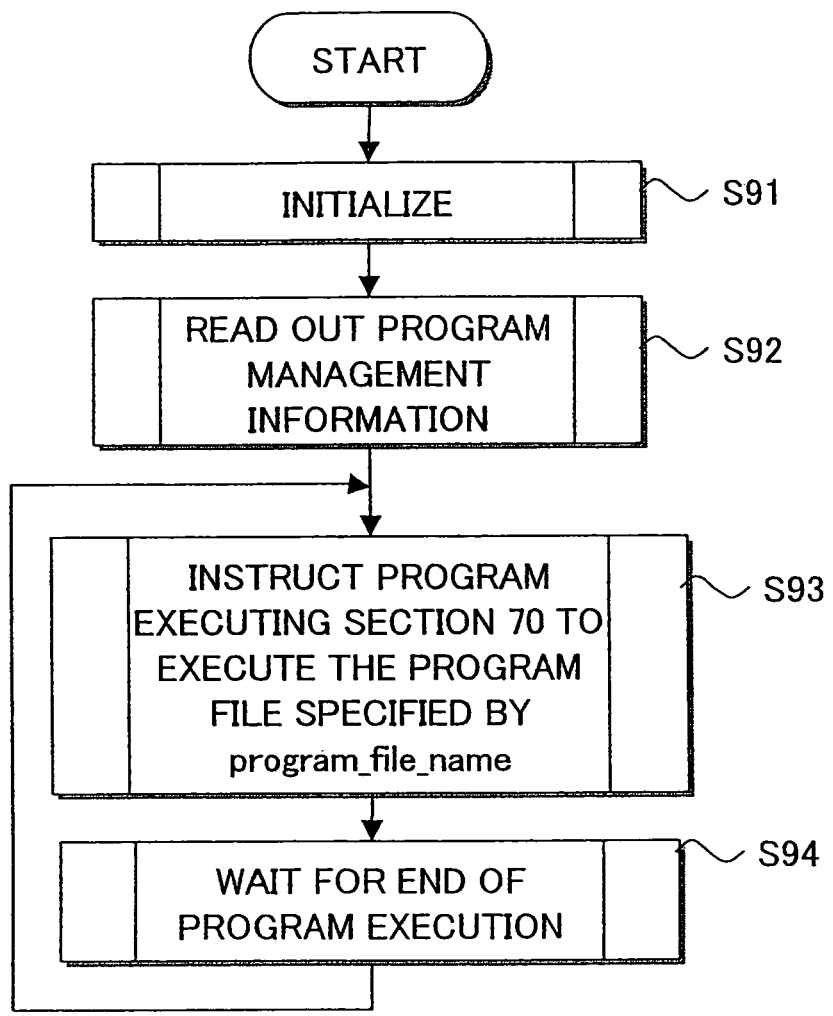
FIG. 32 is a flowchart schematically illustrating processes carried out by the general control section of the video disk player shown in FIG. 28.

FIG. 32 is a flowchart illustrating an entire flow of the reproducing process carried out by the general control section 80' of the video disk player 1".

Firstly, the video disk player 1" is powered ON, and then file system information (not shown) is read out from the optical disk 2, and initialization of the respective processing sections is carried out (S91).

Next, the program management table is read out from the program management information storing region 61C (see FIG. 23), and the program management table thus read out is stored in the memory 81 (S92).

Next, the general control section 80' issues, to the program executing section 70 via the program execution control section 87, an instruction of executing the program file specified by the field program_file_name (S93). On this occasion, the hash value of the program file specified by the field program_file_name is calculated, and is stored in the memory 81 for the sake of the below-mentioned verifying process.

Next, the general control section 80 waits for completion of the execution of the program (S94). When the general control section 80 receives, from the program executing section 70, an interrupt indicating the completion of the execution of the program, the program management information corresponding to the menu content is set as current program management information. Then, the sequence jumps to the step S93.

<Verifying Process>

Explained next is the verifying process carried out by the video disk player 1", with reference to FIG. 33. As described above, the verifying process refers to the process for checking whether or not the reproduction of the video data corresponding to the program currently being executed is approved by the copyright holder of the video data.

Figure 33:
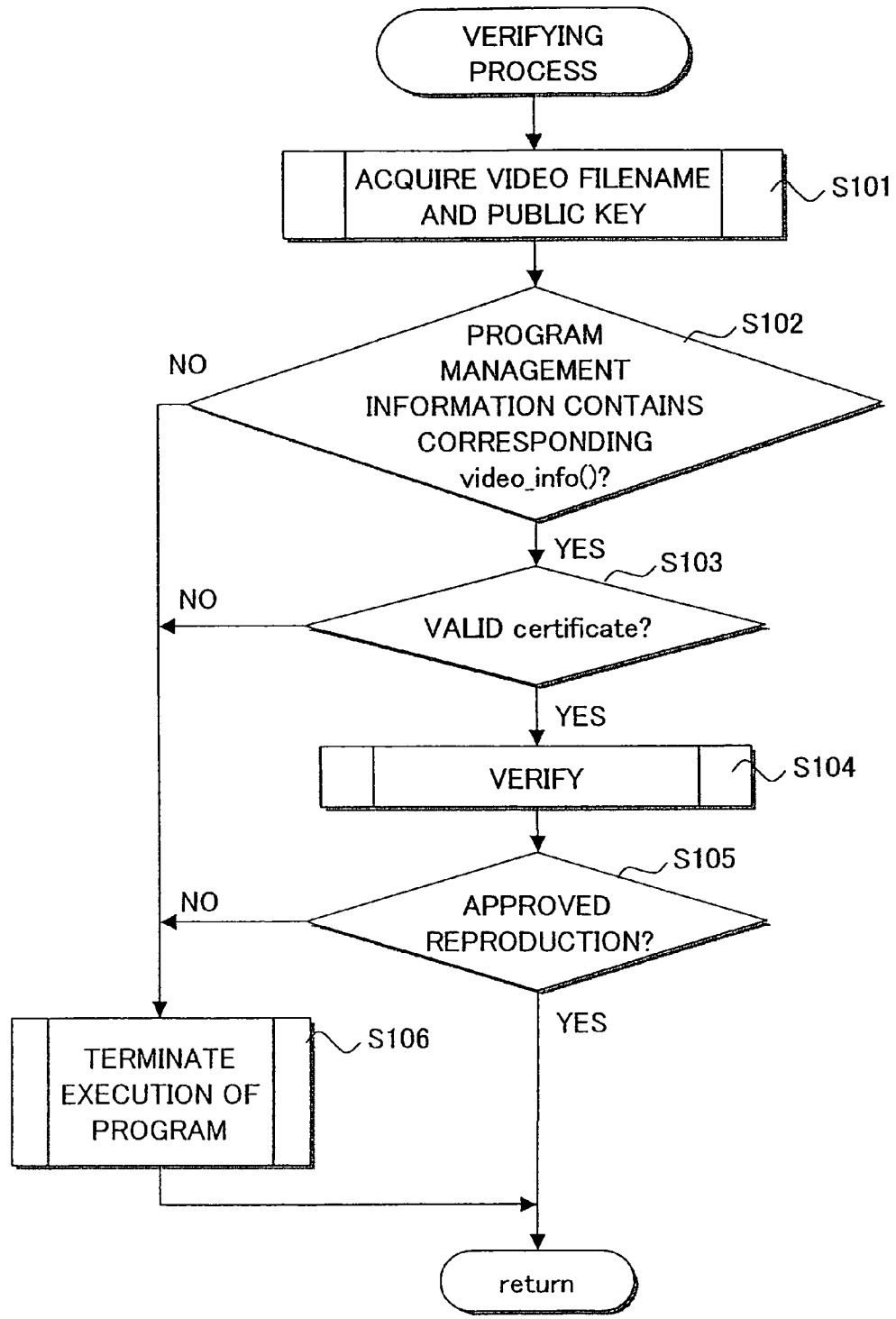
FIG. 33 is a flowchart illustrating a verifying process carried out by the general control section of the video disk player shown in FIG. 28.

FIG. 33 is a flowchart illustrating a flow of the verifying process carried out by the general control section 80'. Note that each of the following processes is carried out in response to the interruption carried out by the video reproducing section 20.

The CPU 83 acquires (i) the filename of the target video data set, by the video reproducing section 20, in the register (not shown) of the interrupt control section 89; and (ii) the public key extracted from the video data (S101).

Next, by using the filename of the video data as a key, the CPU 83 searches for a relevant entry video_info( ) in the program management information stored in the memory 81 (S102). In cases where such an entry video_info( ) is contained in the program management information (YES in S102), the field certificate contained therein is sent to the verifying section 88. In cases where no relevant entry is not contained in the entry video_info( ) (NO in S103) on this occasion, the CPU 83 judges that the video reproduction is not approved, and terminates the execution of the program (S106).

In the meanwhile, in cases where the relevant entry video_info( ) is not contained in the program management information (NO in S102), the CPU 83 terminates the execution of the program (S106).

On the other hand, in cases where the field certificate is contained in the entry video_info( ) (YES in S103), the following process is carried out.

The CPU 83 extracts the field certificate from the entry video_info corresponding to the filename of the video data. Next, the CPU 83 extracts, from the memory 81, (i) the previously found hash value of the currently executed program and (ii) the public key, and sends the hash value, the public key, and the field certificate to the verifying section 88, and instructs the verifying section 88 to start the verification (S104).

The verifying section 88 carries out the verification in accordance with the procedures shown in FIG. 31(*b*). Specifically, the verifying section 88 compares (i) the value obtained by decrypting the field certificate with the public key, with (ii) the hash value. In cases where the values do not coincide with each other, the verifying section 88 notifies the CPU 83 that the values do not coincide with each other. When the CPU 83 is notified that the values do not coincide with each other, the CPU 83 judges that the video reproduction is not approved (NO in S105), and terminates the execution of the program (S106). In contrast, when the verifying section 88 notifies the CPU 83 that the values coincide with each other, the CPU 83 judges that the video reproduction is approved (YES in S105), and continues the execution of the program.

The aforementioned data structure, the apparatus structure, and the process procedures make it possible to restrain the reproduction that is not approved by the copyright holder of the video data.

<Variation>

The public key encryption method is used in the present embodiment; however, it is easy for the copyright holder of the video data to check the disapproved use of the video data by using only the field video_file_name, i.e., without using the public key encryption method. The following explains a reason of this.

In cases where such information as the public key is not contained, the disapproved use of the video data by a program cannot be found until the program is executed. In cases where the program is large, it takes a long time to track back entire processing thereof. Further, in cases where the program creator intentionally made the program such that it is difficult to find a program part causing the disapproved reproduction, it is ineffective to use a method for detecting such a program part in accordance with the binary data of the program file.

However, the copyright holder of the video data can check the disapproved use of the video data, even when the program is not executed. In other words, the disapproved use of the video data can be checked by merely checking the static information video_file_name that is not contained in the program. This can be achieved by arranging the video disk player 1" such that only video data whose use is declared in the field video_file_name can be reproduced.

Further, in the present embodiment, the verification is started after the video reproducing section 20 starts reading out the video data; however, video data whose use is not declared in the field video_file_name may be prohibited from being reproduced. Further, in the present embodiment, the program executing section 70 and the video reproducing section 20 make direct access to files; however, the access to the files may be carried out via a file system provided between (i) each of the program executing section 70 and the video reproducing section 20, and (ii) the disk reading section 50. In this case, the file system section may be arranged such that the video data whose use is not declared in the field video_file_name cannot be referred as a file.

This makes it possible to detect the disapproved reproduction of the video data whose use is not declared in the field video_file_name, before reading out the video data. Accordingly, time required for the detection is shortened.

Further, the present embodiment explains the case where one program is correlated with one video data; however, in the present invention, a plurality of programs may be correlated with a plurality of video data, and one program may correspond to a plurality of video data to be reproduced, and a plurality of programs may correspond to one video data to be reproduced.

In the present embodiment, one video data corresponding to the program is entirely reproduced; however, it is easy to arrange the video disk player 1" such that a part, corresponding to the program, of the video data is reproduced. This can be achieved by adding, to the entry video_info( ), a field indicating reproduction start time/reproduction end time of the video data.

Further, one pair made up of the public key and the private key is used in one video data; however, a different pair made up of a public key and a private key may be used in a part of the video data.

For example, consider an optical disk containing (i) contents a and b respectively provided by content providers A and B, (ii) a menu content c which is provided by a content provider C and which introduces the contents a and b. In this case, a different pair made up of a public key and a private key is used in a part, which is allowed to be used for the content c, of each of the contents a and b. The private key of the different pair is used for preparation of the field certificate of a program of the content c, i.e., is used for encryption of the field certificate. The field certificate thus prepared is recorded onto the optical disk, with the result that only the required part can be allowed to be reproduced by using the program of the menu content c for introducing the contents a and b.

Further, in the present embodiment, the verification using the public key and the field certificate is carried out for the reproduction of all the video data; however, it is easy to arrange the video disk player 1" such that the verification is carried out with respect to only the video data which the copyright holder of the video data consider it necessary to verify.

For example, consider a case where the public key data is multiplexed only in the video data required to be verified. In this case, the video disk player 1" is arranged as follows. That is, when reproducing video data in which no public key data is multiplexed, the video reproducing section 20 notifies, to the general control section 80', the filename of the video data. In addition, the general control section 80' checks whether or not the public key is contained in the video data. The checking is carried out after the step S102 and before the step S103 shown in FIG. 33. In cases where no public key is found, the verifying process is terminated. As such, the verification is carried out only with respect to the video data which the copyright holder of the video data considers it necessary to verify. This makes it possible to omit the verification of the video data which does not need to be verified with the use of the public key and the field certificate. Accordingly, processing speed is improved, and power consumption is reduced. These are additional effects.

In the present embodiment, the video data is not encrypted; however, the video data may be encrypted for prevention of unauthorized copy thereof. In this case, the key for encrypting the video data, and the key for verifying the video reproduction are different. On this account, even when one of the keys is decrypted wrongly, the other key protects the video data from being wrongly reproduced.

Further, in the present embodiment, the public key for use in verifying the program is multiplexed in the video data; however, the public key may be provided in any place other than the video data, as long as no one but the content provider surely can prepare the public key.

For example, consider a case where one video management information item is prepared for one video data. In this case, the public key (public key a) is stored in the video data management information, and another public key (public key b) is multiplexed in the video data. Moreover, a hash value, encrypted by using the private key corresponding to the public key b, of the video data management information is added to the video data management information as the verification-use data. This makes it possible to verify, upon the reproduction, that the video data management information is not unauthorized one. Accordingly, the public key a contained in the video data management information is verified as an authorized (approved) one.

Further, in the present embodiment, the program and the video data are stored in the same read-only recording medium; however, the present invention is applicable to (i) a case where the program and the video data are stored in different media, and (ii) a case where the program and the video data are stored in a re-writable recording medium.

For example, consider a case where an additional program corresponding to the optical disk 2 is downloaded with the use of a network connection function additionally rendered to the video disk player 1", and is stored in a recording medium additionally provided in the video disk player 1". A specific example of the recording medium is a hard disk. In this case, an unauthorized program is likely to be downloaded from a server of the network, or an authorized program stored in the hard disk is likely to be wrongly tampered. However, the use of the present invention makes it possible to prevent such an unauthorized program from causing the video data of the optical disk 2 to be reproduced without any approval.

Further, the general control section 80' is provided in the present embodiment; however, no general control section may be provided as is the case with Embodiment 1. In this case, the program executing section carries out the verification.

In the present embodiment, the hash value of the program is encrypted; however, the present invention is not limited to this as long as a different program is surely correlated with a different value.

Embodiment 6

Another embodiment of the present invention will be explained below with reference to FIG. 18. The present embodiment is similar to Embodiment 4, so that only difference therebetween is explained.

<Synchronization Timing Information>

The present embodiment has the same data structure as the data structure shown in FIG. 18. However, meanings respectively rendered to the fields are different as follows.

Firstly, a value ALWAYS which does not specify an interrupt timing is defined in the field timing. In cases where the field timing has a value coinciding with the value ALWAYS, the sub fields in the field condition( ) are interpreted as interruption execution conditions, respectively. For example, in cases where the sub field normal is indicative of "1", interruption is carried out in accordance with the entry sync_info( ) containing the sub field normal, at the moment at which the synchronization control section 22 is brought into the normal reproduction state from the other reproduction state.

<Video Reproducing Section>

When the synchronization control section 22 is brought into a reproduction state, the synchronization control section 22 checks the entry sync_info( ) in which the field timing has a value corresponding to the value ALWAYS, and carries out the interruption in accordance with the value of the field condition( ).

Such a structure makes it possible to carry out the process in accordance with the change of the reproduction state. For example, a special graphics is displayed only during the fast-forwarding. This allows the user to enjoy the content repeatedly, with the result that an additional value of the content is improved.

In the present embodiment, the process is carried out in the reproduction state resulted from the change of the reproduction state. However, the process may be carried out in a reproduction state selected before the change of the reproduction state. Moreover, the process may be carried out in each of the reproduction states.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

In each of the foregoing embodiments, the video data is directly referred in accordance with the program and the program management information; however, the present invention is not limited to this. For example, the video disk player may make a reference to either (i) video data management information containing various types of information concerning the video data, or (ii) play list information indicating an order in which the video data is reproduced. Examples of the various types of information concerning the video data include: attribution information, random access information, and the like.

In each of the foregoing embodiments, the video data, the synchronization timing information, and the program are stored in the optical disk; however, the video data, the synchronization timing information, and the program may be stored in either (i) another recording medium such as a hard disk, or (ii) another recording medium connected to the video disk player via a network.

In each of the foregoing embodiment, the program and the synchronization timing information are managed by using different files, respectively; however, the program and the synchronization timing information may be managed by using the same file. In this case, the synchronization timing information is sent from the program executing section to the video reproducing section, unlike the foregoing embodiments. Accordingly, the number of files to be read out is reduced, with the result that the overhead is reduced. This is an additional effect.

The foregoing embodiments assume that the outputs respectively sent from the program executing section and the video reproducing section, i.e., the outputs to be combined together are images; however, a structure similar to the above structure is applicable to the case of combining sounds (audio).

The foregoing embodiments assume that the program executing section executes a versatile program; however, the present invention is not limited to this. For example, even when the program executing section is a process section having a single function such as a function of carrying out a still image slide show reproduction, the effects of the present invention can be exhibited. The effects of the present invention also can be exhibited even when the program executing section is a WEB browser and deals with a combination of the HTML (Hyper Text Markup Language) and the ECMA Script.

The foregoing embodiments assume that each of the processes executed by the program (synchronization executing program) and the interrupt handler is a process of outputting an image; however, the process may be any process executed at a certain timing in synchronization with the reproduction of the video data. Note that the process excludes a process of using the output control section for the purpose of carrying out output control of an image and a sound each generated by the program executing section. Specifically, a specific example of the process includes: (i) a process of (a) reading out data from the recording medium and (b) writing data therein; (ii) a process of making access to a network; or (iii) a process of incrementing a variable in the program.

In the foregoing embodiments, the program executing section and the output control section are controlled in accordance with the synchronization timing information; however, both the program executing section and the output control section are not necessarily controlled in accordance with the synchronization timing information. For example, the control can be carried out at a frame rate, even when only the output control section is controlled in accordance with the synchronization timing information and when the program executing section uses an individual clock so as to set a timing at which the bitmap image is generated. Further, even when no output control section is provided and only the program is executed, no overhead occurs due to the polling process.

In the foregoing embodiments, only the switching of the display buffer memories of the output control section is carried out in accordance with the field action_id; however, the present invention is not limited to this.

Further, the foregoing embodiments assume that the program executing section and the output control section are targets to be controlled; however, the combining section may be the target to be controlled. In this case, a specific example of the control over the combining section is a control of changing an order of display planes; or the like.

Figure 34:
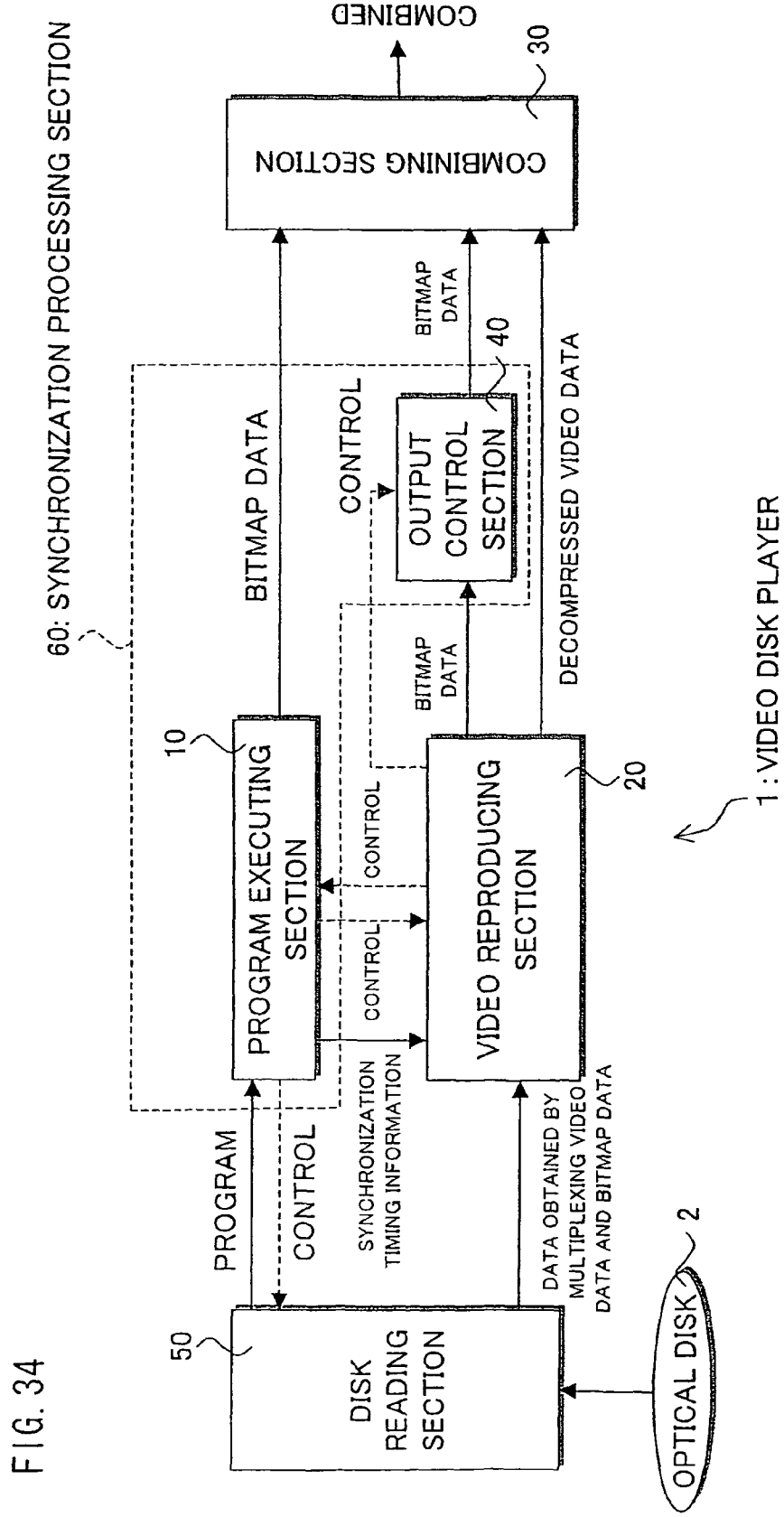
FIG. 34 is a function block diagram schematically illustrating a structure of a video disk player according to another embodiment of the present invention.
Figure 35:
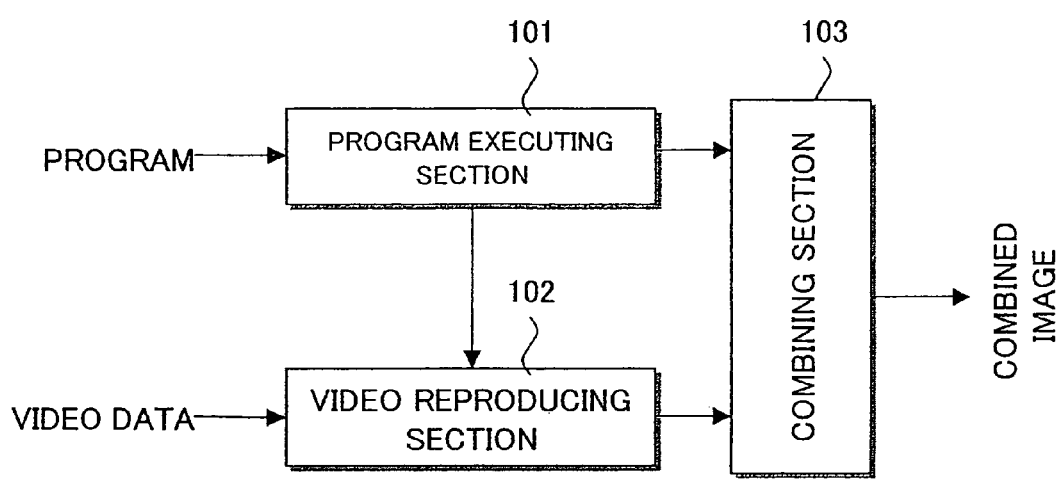
FIG. 35 is a function block diagram schematically illustrating a structure of a conventional AV device.

FIG. 34 is an example of another structure of the video disk player 1. In the foregoing embodiments, the output control section switches the images generated by using the program executing section; however, the present invention is applicable to any structure as long as the image outputting and the sound outputting are controlled in accordance with the synchronization timing information. FIG. 34 illustrates one example of such a structure. In this example, the video reproducing section 20 receives data obtained by multiplexing bitmap data with video data, and outputs decompressed video data and the bitmap data. Therefore, the video reproducing section 20 includes two decoders: (i) a decoder for generating the decompressed video data, and (ii) a decoder (output generating means) for generating the bitmap data (second output data). The decoders operate in accordance with a clock generated by the clock 23. Further, the output control section 40 controls the outputting of the bitmap data, which outputting is carried out by the video reproducing section 20. Moreover, the output control section 40 causes the synchronization timing information to be supplied from the program executing section 10 to the video reproducing section 20. Such a structure makes it possible to control, at the video frame precision, the outputting of the bitmap data generated by using the program.

Further, the foregoing embodiment uses the two display buffer memories; however, the present invention is not limited to this. The effects of the present invention can be exhibited even when using one or not less than three display buffers.

In the foregoing embodiments, one block, i.e., the program executing section is used to output the image concurrently with the video reproducing section; however, the effects of the present invention can be exhibited even when a plurality of image outputting blocks are used.

In the foregoing embodiments, the video reproducing section carries out the control in accordance with the synchronization timing information; however, the present invention is not limited to this. The effects of the present invention can be exhibited as long as a component using the same clock as that of the video reproducing section is used.

In the foregoing embodiments, the value of the field merged_flag of the entry sync_info( ) is set at "1" so as to specify a merged synchronization executing program allowing the same result as a result obtained by executing a plurality of synchronization executing programs; however, the present invention is not limited to this. For example, the value of the field merged_flag may be set so as to specify either (i) a program for displaying a warning, or (ii) a program for displaying, when starting the reproduction from a certain point of the video, a graphics different from a graphics displayed when starting the video from the beginning.

The reproducing apparatus of the present invention may be arranged such that: the data acquiring means acquires an arbitrary-point reproduction synchronization executing program, which is executed only when starting reproduction from a certain point of the content data, and the synchronization timing information including the timing specifying information includes (i) an action specifying information item indicating a synchronization executing program to be executed, and (ii) an arbitrary-point reproduction synchronization executing program identifying information item (e.g., setting a value other than "1" at the field merged_flag) indicating whether or not the synchronization executing program specified by the action specifying information is the arbitrary-point reproduction synchronization executing program, and for starting reproduction from a certain point of the content data, the synchronization control means transmits the synchronization control signals in accordance with (I) a synchronization timing information item that includes a timing specifying information item indicating a time point which comes before but is closest to a time point from which the reproduction is started, and that includes an arbitrary-point reproduction synchronization executing program identifying information item indicating that the synchronization executing program to be executed is the arbitrary-point reproduction synchronization executing program, and (II) synchronization timing information items that include timing specifying information items each indicating a time point which comes after the time point specified by the synchronization timing information item (I), and that include arbitrary-point reproduction synchronization executing program identifying information items each indicating that the synchronization executing program to be executed is the arbitrary-point reproduction synchronization executing program, the synchronization control signals being transmitted in order from a synchronization control signal corresponding to earliest one of the time points respectively specified by the timing specifying information items. Note that the arbitrary-point reproduction synchronization executing program, and the other synchronization executing programs may be stored in the same optical disk.

This makes it possible to obtain different outputs depending on reproduction start time points, with the result that the user can enjoy the content repeatedly. This allows improvement of the additional value of the content. In other words, this makes it possible to create a content which renders a result different from a result obtained when intentionally starting the reproduction from such a certain point.

The reproducing apparatus of the present invention may include the first output generating section and the second output generating section, and the means for controlling outputting of the second generating section in accordance with the synchronization timing information and the clock of the first output generating section.

Further, the reproducing apparatus of the present invention may be arranged such that the synchronization timing information is separated from the information for use in generating the output of the first output generating section.

The reproducing apparatus of the present invention may be arranged such that the synchronization timing information at least include (i) information indicative of a time point in a time period of the first output generating section, and (ii) either one of (a) information indicative of a control target or (b) information indicative of what control is to be carried out.

Further, the reproducing apparatus of the present invention may be arranged such that: the first output generating section is a video reproducing section, and the second output generating section is a program executing section.

Further, the reproduction method of the reproducing apparatus, which includes the first output generating section and the second output generating section, of the present invention may include: (i) a step of comparing the synchronization timing information with the clock of the first output generating section; and (ii) a step of outputting the control signal in accordance with the comparison result.

Further, the recording medium of the present invention may be a recording medium which stores (i) the information for use in generating the output of the first output generating section; (ii) the information for use in generating the output of the second output generating section; and (iii) the synchronization timing information for controlling the outputting of the second output generating section in accordance with the clock of the first output generating section.

Further, the recording medium of the present invention may be arranged such that the timing information is stored in the vicinity of the information for use in generating the output of the second output generating section.

Further, the recording medium of the present invention may be arranged such that the timing information and the program are stored in the same file.

Here, the blocks of each of the video disk players 1, 1' and 1" may be constituted by hardware logic, or by software with the use of a CPU as follows.

That is, each of the video disk players 1, 1', and 1" has: (i) the CPU (central processing unit) for executing an instruction of a control program realizing various functions; (ii) a ROM storing the program; (iii) a RAM for expanding the program; (iv) a storage device (storage medium) such as a memory storing the program and various data; and (v) the like. The object of the present invention also can be achieved by (i) providing, for each of the video disk players 1, 1', and 1", a storage medium storing, in a computer readable manner, a program code (executable program; intermediate code; source program) of the control program for the video disk players 1, 1', and 1", and (ii) causing a computer (CPU or MPU) to read and execute the program code stored in the storage medium, the program code being the software realizing the aforementioned functions.

Examples of the storage medium are: (i) tapes such as a magnetic tape and a cassette tape; (ii) magnetic disks such as a Floppy® disk and a hard disk; (iii) optical disks such as a CD-ROM (compact disk read only memory), a magnetic optical disk (MO), a mini disk (MD), a digital video disk (DVD), and a CD-R (CD-Rewritable); (iv) cards such as an IC card (inclusive of a memory card) and an optical card; and (v) semiconductor memories such as a mask ROM, an EPROM (electrically programmable read only memory), an EEPROM (electrically erasable programmable read only memory), and a flash ROM.

Each of the video disk player 1, 1', and 1" may be connectable to the communication network, and the program code may be supplied via the communication network. The communication network is not particularly limited. Specific examples thereof are: the Internet, Intranet, Extranet, LAN (local area network), ISDN (integrated services digital network), VAN (value added network), CATV (cable TV) communication network, virtual private network, telephone network, mobile communication network, satellite communication network, and the like. Further, the transmission medium constituting the communication network is not particularly limited. Specific examples thereof are: (i) a wired channel using an IEEE 1394, a USB (universal serial bus), a power-line communication, a cable TV line, a telephone line, a ADSL line, or the like; or (ii) a wireless communication using IrDA, infrared rays used for a remote controller, Bluetooth®, IEEE 802.11, HDR (High Data Rate), a mobile phone network, a satellite connection, a terrestrial digital network, or the like. Note that, the present invention can be realized by (i) a carrier wave realized by electronic transmission of the program code, or (ii) a form of a series of data signals.

Finally, a reproducing apparatus according to the present invention includes: data acquiring means for acquiring content data and synchronization timing information items; clock generating means for generating a clock signal; decoding means for converting, in accordance with the clock signal, the content data into reproduction data for reproduction output; synchronization control means for transmitting synchronization control signals to synchronization processing means, in accordance with the clock signal, at timings specified by timing specifying information items included in the synchronization timing information items, respectively; and the synchronization processing means for carrying out a process in accordance with each of the synchronization control signals received from the synchronization control means.

Further, a method, according to the present invention, for controlling a reproducing apparatus including data acquiring means, decoding means, and synchronization processing means, includes the steps of: causing the data acquiring means to acquire content data and synchronization timing information; causing the decoding means to (i) convert, in accordance with the clock signal, the content data into reproduction data for reproduction output, and (ii) send a synchronization control signal to the synchronization processing means in accordance with the clock signal at a timing specified by timing specifying information included in the synchronization timing information; and causing the synchronization processing means to carry out a process in accordance with the synchronization control signal.

The above arrangements make it possible to supply, to the synchronization processing means, the synchronization control signal (trigger) that specifies the timing at which the process is carried out. The supply of the synchronization control signal is carried out in synchronization with the reproduction process that the decoding means carries out with respect to the content data. Here, examples of the "process" to be carried out by the synchronization processing means include: a process of controlling data outputting, a process of executing a program, and the like. The other examples of the "process" include: a process of making access to a network, a process of reading out from and writing in a recording medium, and the like.

This makes it easier to (i) carry out a process to be carried out in synchronization with the reproduction process of the content data, and to be carried out concurrently with the supply of the content data; and (ii) add a process to be carried out in synchronization with the reproduction process of the content data, and to be carried out after the supply of the content data. Further, the stream synchronization processing means does not need to check the reproduction clock of the decoding means, so that no load is imposed for the synchronization on the synchronization processing means. This makes it possible to flexibly create a content.

The reproducing apparatus according to the present invention may be arranged such that: the data acquiring means further acquires synchronization executing programs, and the synchronization processing means includes program executing means for executing each of the synchronization executing programs in accordance with the synchronization control signal received from the synchronization control means.

The above arrangement makes it possible to supply, to the synchronization processing means, the synchronization control signal (trigger) that specifies the timing at which the output data is generated by executing the synchronization executing program. The supply of the synchronization control signal is carried out in synchronization with the reproduction process that the decoding means carries out with respect to the content data.

Accordingly, the synchronization processing means does not need to check the reproduction clock of the decoding means, so that no load is imposed for the synchronization on the synchronization processing means. This makes it possible to effectively execute a program in synchronization with reproduction of AV data or the like.

The reproducing apparatus may further include: output generating means for generating second output data which is an output other than the reproduction data, wherein: the synchronization processing means includes output control means for controlling outputting of the second output data in accordance with the synchronization control signal received from the synchronization control means.

The above arrangement makes it possible to control the outputting of the second output data which is outputted in synchronization with the reproduction process that the decoding means carries out with respect to the content data. Here, the examples of the "second output data" generated by the output generating means include: (i) graphics data generated by executing a program, and (ii) data obtained by decoding bitmap data multiplexed in the video data. Further, the second output data is not limited to such a visual information output. That is, the other examples of the "second output data" include an auditory information output such as (i) audio data generated by executing a program, and (ii) data obtained by decoding audio data multiplexed in video data.

Accordingly, the synchronization processing means does not need to check the reproduction clock of the decoding means, so that no load is imposed for the synchronization on the synchronization processing means. This allows the reproducing apparatus to efficiently control outputting of AV data in synchronization with reproduction of different AV data or the like.

For example, in the case of starting/ending display of a graphics at a specific timing in the video reproduction, the clock does not need to be checked by using the software constituting the synchronization processing means, so that no overhead occurs due to the process. This makes it possible to coincide the timings at a frame rate. In other words, high-precision control can be carried out. The arrangement is excellent also in terms of process efficiency.

Further, the reproducing apparatus according to the present invention may be arranged such that the synchronization processing means executes the synchronization executing program so as to generate output data, and outputs the output data in accordance with the synchronization control signal received from the synchronization control means.

The above arrangement makes it easier to display a graphics, by using the synchronization executing program, in synchronization with the reproduction process that the decoding means carries out with respect to the content data. Moreover, the above arrangement makes it possible to efficiently carry out the display of the graphics.

Further, the reproducing apparatus according to the present invention may be arranged such that: the synchronization processing means executes the synchronization executing program, in accordance with the synchronization control signal received from the synchronization control means, so as to generate output data, and outputs the output data.

The above arrangement makes it easier to display a graphics, by using the synchronization executing program, in synchronization with the reproduction process that the decoding means carries out with respect to the content data. Moreover, the above arrangement makes it possible to efficiently carry out the display of the graphics.

Further, the reproducing apparatus according to the present invention may be arranged such that: the synchronization processing means includes output control means for controlling the outputting of the output data in accordance with the synchronization control signal received from the synchronization control means, which outputting is caused by the synchronization control program.

With this arrangement, in the case of starting/ending display of a graphics at a specific timing in the video reproduction, the clock does not need to be checked by using the software constituting the synchronization processing means, so that no overhead occurs due to the process. This makes it possible to coincide the timings at a frame rate. In other words, high-precision control can be carried out. The arrangement is excellent also in terms of process efficiency.

Note that, a reproducing apparatus according to the present invention may include: data acquiring means for acquiring content data, a synchronization executing program, and synchronization timing information items; clock generating means for generating a clock signal; decoding means for converting, in accordance with the clock signal, the content data into reproduction data for reproduction output; synchronization control means for transmitting synchronization control signals to synchronization processing means, in accordance with the clock signal, at timings specified by timing specifying information items included in the synchronization timing information items, respectively; and the synchronization processing means for generating output data by executing the synchronization executing program, and for outputting the output data in accordance with each of the synchronization control signals received from the synchronization control means.

Further, a method, according to the present invention, for controlling a reproducing apparatus including decoding means and synchronization processing means may include the steps of: (a) acquiring content data, a synchronization executing program, and synchronization timing information items; (b) causing the decoding means to (i) convert, in accordance with a clock signal, the content data into reproduction data for reproduction output, and (ii) transmit synchronization control signals to synchronization processing means, in accordance with the clock signal, at timings specified by timing specifying information items included in the synchronization timing information items, respectively; and (c) causing the synchronization processing means to (i) generating output data by executing the synchronization executing program, and (ii) output the output data in accordance with each of the synchronization control signals received from the synchronization control means.

The above arrangement makes it possible to supply, to the synchronization processing means, each synchronization control signal (trigger) that specifies the timing at which the result (output data) obtained by executing the synchronization executing program is outputted. The supply of the synchronization control signal is carried out in synchronization with the reproduction process that the decoding means carries out with respect to the content data.

Accordingly, the synchronization processing means does not need to check the reproduction clock of the decoding means, so that no load is imposed for the synchronization on the synchronization processing means. This makes it possible to effectively execute a program in synchronization with reproduction of AV data or the like.

For example, in the case of starting/ending display of a graphics at a specific timing in the video reproduction, the clock does not need to be checked by using the software constituting the synchronization processing means, so that no overhead occurs due to the process. This makes it possible to coincide the timings at a frame rate. In other words, high-precision control can be carried out. The arrangement is excellent also in terms of process efficiency.

Further, a reproducing apparatus according to the present invention may include: data acquiring means for acquiring content data, a synchronization executing program, and synchronization timing information items; clock generating means for generating a clock signal; decoding means for converting, in accordance with the clock signal, the content data into reproduction data for reproduction output; synchronization control means for transmitting synchronization control signals to synchronization processing means, in accordance with the clock signal, at timings specified by timing specifying information items included in the synchronization timing information items, respectively; and the synchronization processing means for generating output data by executing the synchronization executing program in accordance with each of the synchronization control signals received from the synchronization control means, and for outputting the output data.

Further, a method, according to the present invention, for controlling a reproducing apparatus including decoding means and synchronization processing means may include the steps of: (a) acquiring content data, a synchronization executing program, and synchronization timing information items; (b) causing the decoding means to (i) convert, in accordance with a clock signal, the content data into reproduction data for reproduction output, and (ii) transmit synchronization control signals to synchronization processing means, in accordance with the clock signal, at timings specified by timing specifying information items included in the synchronization timing information items, respectively; and (c) causing the synchronization processing means to (i) generating output data by executing the synchronization executing program in accordance with each of the synchronization control signals received from the synchronization control means, and (ii) output the output data.

The above arrangement makes it possible to supply, to the synchronization processing means, the synchronization control signal (trigger) that specifies the timing at which the output data is generated by executing the synchronization executing program. The supply of the synchronization control signal is carried out in synchronization with the reproduction process that the decoding means carries out with respect to the content data.

Accordingly, the synchronization processing means does not need to check the reproduction clock of the decoding means, so that no load is imposed for the synchronization on the synchronization processing means. This makes it possible to effectively execute a program in synchronization with reproduction of AV data or the like.

For example, in the case of starting/ending display of a graphics at a specific timing in the video reproduction, the clock does not need to be checked by using the software constituting the synchronization processing means, so that no overhead occurs due to the process. This makes it possible to coincide the timings at a frame rate. In other words, high-precision control can be carried out. The arrangement is excellent also in terms of process efficiency.

Note that the data acquiring means may be either (i) means for reading out the content data, the synchronization executing program, and the synchronization timing information from the content recording medium, or (ii) communication means for acquiring the content data, the synchronization executing program, and the synchronization timing information via a network. In other words, the supply of the video data, the program, and the synchronization timing information to the reproducing apparatus can be carried out in various manners. For example, the reproducing apparatus may read out the video data, the program, and the synchronization timing information from the content recording medium. Alternatively, any one of the video data, the synchronization executing program, and the synchronization timing information may be acquired via the network, and may be combined with the other data read out from the content recording medium, with the result that the reproduction is carried out. Further, a part or all of the synchronization executing programs stored in the content recording medium may be replaced with programs acquired via the network for the sake of the reproduction. Further, a part or all of the content data stored in the content recording medium may be replaced with content data acquired via the network for the sake of the reproduction. Further, a part or all of the synchronization timing information stored in the content recording medium may be replaced with synchronization timing information acquired via the network for the sake of the reproduction.

Further, examples of the program include: (i) a program for generating data of an image (still image; animation) to be overlaid with a video image, (ii) a program for outputting only a sound such as a sound effect or narration.

Further, the reproducing apparatus according to the present invention may be arranged such that: the synchronization processing means includes program executing means for generating output data by executing the synchronization executing program in accordance with the synchronization control signal received from the synchronization control means.

The above arrangement makes it possible to execute the synchronization executing program in accordance with the synchronization control signal generated in accordance with the clock signal used for the reproduction of the content data. Accordingly, the output data can be generated by executing the synchronization executing program in synchronization with the reproduction of the content data.

Further, the reproducing apparatus according to the present invention may be arranged such that: the synchronization processing means includes output control means for outputting, in accordance with the synchronization control signal received from the synchronization control means, the output data generated by using the program executing means.

The above arrangement makes it possible to output, in accordance with the synchronization control signal generated in accordance with the clock signal used for the reproduction of the content data, the output data generated by using the synchronization executing program. Accordingly, the output caused by the synchronization executing program can be controlled in accordance with the reproduction of the content data.

The reproducing apparatus according to the present invention may be arranged such that: the synchronization timing information items including the timing specifying information items includes action specifying information items, respectively and when respectively transmitting the synchronization control signals to the program executing means at the timings specified by the timing specified information items, the synchronization control means adds, to the synchronization control signals, action specifying information items corresponding to the timing specifying information items, respectively and the program executing means executes a synchronization executing program specified by each of the action specifying information items included in the synchronization control signals received from the synchronization control means.

The above arrangement allows the synchronization control means to control the synchronization executing program at such a timing that the program executing means carries out the process. This makes it possible that the program executing means switchably executes a plurality of synchronization executing programs (instructions).

Further, the reproducing apparatus according to the present invention may be arranged such that: for starting reproduction from a certain point of the content data, the synchronization control means transmits, in accordance with synchronization timing information items respectively including timing specifying information items each indicating a time point coming before a time point from which the reproduction is started, the synchronization control signals in order from a synchronization control signal corresponding to earliest one of the time points respectively specified by the timing specifying information items.

With the above arrangement, a video clock change occurring until the reproduction start time point of the content data does not need to be produced again. This shortens time required in starting the reproduction.

The reproducing apparatus according to the present invention may be arranged such that: each of the synchronization timing information items respectively including the timing specifying information items includes a dependency information item indicating a dependency relation with another synchronization timing information item, for starting reproduction from a certain point of the content data, the synchronization control means transmits the synchronization control signals in accordance with (I) a synchronization timing information item that includes a timing specifying information item indicating a time point which comes before but is closest to a time point from which the reproduction is started, and that includes a dependency information item indicating that the synchronization timing information item is independent from other synchronization timing information items, and (II) synchronization timing information items that include timing specifying information items each indicating a time point which comes after the time point specified by the synchronization timing information item (I), and that include dependency information items respectively indicating that the synchronization timing information items are independent from other synchronization timing information items, the synchronization control signals being transmitted in order from a synchronization control signal corresponding to earliest one of the time points respectively specified by the timing specifying information items.

The above arrangement makes it possible to immediately carry out the process when starting the reproduction from the certain point of the content data, so that unnecessary processes do not need to be carried out. This makes it possible to shorten time required in displaying a graphics and starting the reproduction. Examples of the process include: the process of displaying a graphics corresponding to the reproduction start time point, and the like.

The reproducing apparatus according to the present invention may be arranged such that: the data acquiring means acquires a merged synchronization executing program allowing a result identical to a result obtained by executing a plurality of synchronization executing programs, and each of the synchronization timing information items respectively including the timing specifying information items includes (i) an action specifying information item indicating a synchronization executing program to be executed, and (ii) a merged synchronization executing program identifying information item indicating whether or not the synchronization executing program indicated by the action specifying information item is the merged synchronization executing program, and for starting reproduction from a certain point of the content data, the synchronization control means transmits the synchronization control signals in accordance with (I) a synchronization timing information item that includes a timing specifying information item specifying a time point which comes before but is closest to a time point from which the reproduction is started, and that includes a merged synchronization executing program identifying information item indicating that the synchronization executing program to be executed is the merged synchronization executing program, and (II) synchronization timing information items that include timing specifying information items each indicating a time point which comes after the time point specified by the synchronization timing information item (I), and that include merged synchronization executing program identifying information items each indicating that the synchronization executing program to be executed is the merged synchronization executing program, the synchronization control signals being transmitted in order from a synchronization control signal corresponding to earliest one of the time points respectively specified by the timing specifying information items.

The above arrangement makes it possible to immediately carry out the process when starting the reproduction from the certain point of the content data, so that unnecessary processes do not need to be carried out. This makes it possible to shorten time required in displaying a graphics and starting the reproduction. Examples of the process include: the process of displaying a graphics corresponding to the reproduction start time point, and the like.

The reproducing apparatus according to the present invention may be arranged such that: the data acquiring means acquires an arbitrary-point reproduction synchronization executing program, which is executed only when starting reproduction from a certain point of the content data, and each of the synchronization timing information items respectively including the timing specifying information items includes (i) an action specifying information item indicating a synchronization executing program to be executed, and (ii) an arbitrary-point reproduction synchronization executing program identifying information item indicating whether or not the synchronization executing program specified by the action specifying information is the arbitrary-point reproduction synchronization executing program, and for starting reproduction from a certain point of the content data, the synchronization control means transmits the synchronization control signals in accordance with (I) a synchronization timing information item that includes a timing specifying information item indicating a time point which comes before but is closest to a time point from which the reproduction is started, and that includes an arbitrary-point reproduction synchronization executing program identifying information item indicating that the synchronization executing program to be executed is the arbitrary-point reproduction synchronization executing program, and (II) synchronization timing information items that include timing specifying information items each indicating a time point which comes after the time point specified by the synchronization timing information item (I), and that include arbitrary-point reproduction synchronization executing program identifying information items each indicating that the synchronization executing program to be executed is the arbitrary-point reproduction synchronization executing program, the synchronization control signals being transmitted in order from a synchronization control signal corresponding to earliest one of the time points respectively specified by the timing specifying information items.

The arrangement makes it possible to select an interruption process in accordance with the reproduction start time point, with the result that a process can be carried out in accordance with the reproduction condition. For example, special graphics is displayed only when starting the reproduction from the certain time point. This allows the user to enjoy the content repeatedly, with the result that an additional value of the content is improved.

Further, the reproducing apparatus according to the present invention may be arranged such that: each of the synchronization timing information items includes an execution condition information item indicating a condition in which the decoding means is when the synchronization executing program should be executed, and the synchronization control means monitors the condition of the decoding means, and transmits the synchronization control signal in accordance with (i) the condition of the decoding means and (ii) the execution condition information item.

The above arrangement makes it possible to select an interruption process in accordance with the reproduction condition, with the result that a process can be carried out in accordance with the reproduction condition. For example, a special graphics is displayed only during the fast forwarding. This allows the user to enjoy the content repeatedly, with the result that an additional value of the content is improved.

Further, the reproducing apparatus according to the present invention may be arranged such that: the decoding means reproduces video data as the content data in order to output a video image, and the program executing means executes, as the synchronization executing program, a program for generating image data to be overlaid with the video image.

The above arrangement makes it possible to overlay (i) the video image reproduced by the decoding means, with (ii) the image data generated by using the program executing means. The overlaying is carried out in synchronization with the reproduction of the video image. Note that the image data generated by using the program executing means may be either a still image or an animation.

Further, a reproducing apparatus according to the present invention may include: data acquiring means for acquiring content data and a synchronization executing program; program executing means for executing the synchronization executing program; clock generating means for generating a clock signal; decoding means for converting, in accordance with the clock signal, the content data into reproduction data for reproduction output; synchronization control means for transmitting a synchronization control signal to the program executing means at a predetermined timing in accordance with the clock signal; and input means for receiving reproduction control manipulation from outside, and for converting the reproduction control manipulation into reproduction control information, the decoding means being controlled in accordance with the reproduction control information sent from the input means, the program executing means executing the synchronization executing program in accordance with at least the synchronization control signal sent from the synchronization control means.

Further, a method, according to the present invention, for controlling a reproducing apparatus including data acquiring means, program executing means, clock generating means, decoding means, synchronization control means, and input means, may include the steps of: (A) causing the data acquiring means to acquire content data and a synchronization executing program; (B) causing the program executing means to execute the synchronization executing program; (C) causing the clock generating means to generate a clock signal; (D) causing the decoding means to convert, in accordance with the clock signal, the content data into reproduction data for reproduction output; (E) causing the synchronization control means to transmit a synchronization control signal to the program executing means at a predetermined timing in accordance with the clock signal; and (F) causing the input means to (i) receive reproduction control manipulation from outside, and (ii) convert the reproduction control manipulation into reproduction control information, in the step (D), the decoding means being controlled in accordance with the reproduction control information sent from the input means, in the step (B), the program executing means executing the synchronization executing program in accordance with at least the synchronization control signal sent from the synchronization control means.

The above arrangements make it possible to (i) execute the synchronization executing program in synchronization with the reproduction of the content data; and (ii) control the content reproduction, without using the synchronization executing program, in accordance with the reproduction control manipulation (user's manipulation) supplied from outside. This eliminates the overhead occurring when the synchronization executing program is used for the control of the content reproduction, with the result that responsiveness to the user's reproduction control manipulation can be improved.

Here, the "predetermined timing" at which the synchronization control means sends the synchronization control signal to the program executing means corresponds to, e.g., either (i) a timing at which the reproduction of the content data is ended, or (ii) a timing specified by the synchronization timing information.

Further, a reproducing apparatus according to the present invention may include: data acquiring means for acquiring content data items, synchronization executing programs, and program management information items; decoding means for converting each of the content data items to reproduction data for reproduction output; and program executing means for executing each of the synchronization executing programs, each of the program management information items including (i) a program specifying information item for specifying a program to be simultaneously used for the reproduction output together with a content data item, and (ii) a content data specifying information item for specifying the content data item to be simultaneously used for the reproduction output together with the program, said reproducing apparatus, further comprising: general control means for (i) instructing the program executing means to execute the synchronization executing program specified by the program specifying information item, and either (ii) instructing the decoding means to convert the content data item specified by the content specified information item, or (iii) instructing the data acquiring means to acquire the content data item specified by the content specifying information item.

Further, a method, according to the present invention, for controlling a reproducing apparatus including decoding means, program executing means, and data acquiring means, may include the steps of: causing the data acquiring means to acquire content data items, synchronization executing programs, and program management information items; causing decoding means to convert each of the content data items to reproduction data for reproduction output; and causing the program executing means to execute each of the synchronization executing programs, each of the program management information items including (i) a program specifying information item for specifying a program to be simultaneously used for the reproduction output together with a content data item, and (ii) a content data specifying information item for specifying the content data item to be simultaneously used for the reproduction output together with the program, the method, further including the step of: instructing the program executing means to execute the synchronization executing program specified by the program specifying information item, and either (ii) instructing the decoding means to convert the content data item specified by the content specified information item, or (iii) instructing the data acquiring means to acquire the content data item specified by the content specifying information item.

The above arrangements make it possible that the readout of the content data item from the medium, the decoding thereof, the reproduction thereof are carried out independently from the execution of the synchronization executing program, with the result that time required in starting the reproduction of the content data item can be shortened. Especially, the content data item can be read out prior to the completion of the synchronization executing program by instructing the data acquiring means to acquire the content data item. Note that, in the above arrangement, the synchronization executing program is not limited to a program for generating the output data.

Further, the reproducing apparatus according to the present invention may be arranged such that: each of the program management information items includes a reproduction start instruction necessity information item indicating whether or not an instruction from a synchronization executing program is required for start of reproduction of each of the content data items, and in cases where the reproduction start necessity information indicates that the instruction from the synchronization executing program is required, the decoding means do not start reproducing the content data item until the decoding means receives the instruction from the synchronization executing program.

The above arrangement makes it possible that the readout of the content data item from the medium, the decoding thereof, the reproduction thereof are carried out independently from the execution of the synchronization executing program, with the result that time required in starting the reproduction of the content data item can be shortened. Moreover, the above arrangement makes it possible to coincide (i) a phase of starting the execution of the synchronization executing program with (ii) a phase of starting the reproduction of the content data.

Further, a reproducing apparatus according to the present invention may include: data acquiring means for acquiring content data, a synchronization executing program, and program management information; decoding means for converting the content data into reproduction data for reproduction output; program executing means for executing the synchronization executing program; input means for receiving reproduction control manipulation from outside, and for converting the reproduction control manipulation into reproduction control information; and switching means for (a) selecting, in accordance with reproduction control switching information included in the program management information, either one of (i) the reproduction control information sent from the input means and (ii) reproduction control information sent from the program executing means, and (b) sending the selected reproduction control information to the decoding means.

The above arrangement makes it possible to switchably carry out (i) the reproduction control to be done by user and (ii) the reproduction control to be done by the synchronization executing program. This allows the content creator to select whether (i) responsiveness to the reproduction control manipulation carried out by the user is taken into great consideration, or (ii) freedom in the program takes priority over the responsiveness. Note that, in the above arrangement, the synchronization executing program is not limited to a program for generating output data.

Further, a reproducing apparatus according to the present invention may include: data acquiring means for acquiring content data, a synchronization executing program, and program management information; decoding means for converting the content data into reproduction data for reproduction output; program executing means for executing the synchronization executing program; and general control means for suspending the reproduction output obtained by using the content data and the synchronization executing program, and for resuming the reproduction from a point at which the reproduction output was suspended; the program management information including resuming capability information indicating whether or not a resuming function is enabled, which resuming function is a function for resuming the reproduction from the point at which the reproduction output obtained by using the content data and the synchronization executing program was suspended, in cases where the program management information indicates that the resuming function is not enabled, the general control means never instructing start of the reproduction from the point at which the reproduction output was suspended.

With the above arrangement, no resuming is carried out with respect to a content whose reproduction cannot be resumed, with the result that the operation of the reproducing apparatus becomes stable and the user becomes less confused.

Further, a reproducing apparatus according to the present invention may include: data acquiring means for acquiring content data, a synchronization executing program, and program management information; decoding means for converting the content data into reproduction data for reproduction output; and program executing means for executing the synchronization executing program, the program management information including resuming capability information whether or not a resuming function is enabled, which resuming function is a function for resuming the reproduction from the point at which the reproduction output obtained by using the content data and the synchronization executing program was suspended, the reproducing apparatus, further including: notifying means for notifying, in cases where the resuming capability information indicates that the resuming function is not enabled, a user that the resuming function is not enabled, the notifying being carried out in response to any one of a user's suspending instruction, a user's instruction requiring suspending, and an instruction for resuming reproduction from a suspension point.

The arrangement makes it possible that: upon reception of the user's suspending instruction, the user's instruction requiring suspending, and the instruction for resuming reproduction from the suspension point, a warning message or the like can be given to the user before carrying out the operations corresponding to the user's instructions. This allows the user to be less confused.

Examples of the instructions for the operations include: (i) the user's menu calling-up instruction, and (ii) the user's instruction of returning from the menu to the previous reproduction state. The above arrangement is particularly suitable for these instructions. The notifying means carries out the notification by, e.g., blinking a lamp, making a warning sound, or displaying a message on a display screen. Note that, in the above arrangement, the synchronization executing program is not limited to a program for generating output data.

Further, a reproducing apparatus according to the present invention may include: data acquiring means for acquiring content data items, a synchronization executing program, and program management information; decoding means for converting each of the content data items into reproduction data for reproduction output; and program executing means for executing the synchronization executing program, the program management information including at least content data specifying information for specifying a content data item which is simultaneously used for the reproduction output together with the synchronization executing program, the reproducing apparatus, further including: verifying means for verifying whether or not the content data item which the synchronization executing program instructs the decoding means to decode is the content data item specified by the program management information.

Further, a method, according to the present invention, for controlling a reproducing apparatus including decoding means, program executing means, data acquiring means, and verifying means, may include the steps of: causing the data acquiring means to acquire content data items, a synchronization executing program, and program management information; causing the decoding means to convert each of the content data items into reproduction data for reproduction output; and causing the program executing means to execute the synchronization executing program, the program management information including at least content data specifying information for specifying a content data item which is simultaneously used for the reproduction output together with the synchronization executing program, the method, further including the step of: causing the verifying means to verify whether or not the content data item which the synchronization executing program instructs the decoding means to decode is the content data item specified by the program management information.

The above arrangements make it possible to verify whether or not the content data item to be reproduced by using the synchronization executing program is the content data item specified by the content data specifying information. This makes it possible to detect a reproduction operation carried out by a program that is not approved to reproduce the content data, with the result that the content data can be prevented from being reproduced without authorization. Note that, in the above arrangements, the synchronization executing program is not limited to a program for generating output data.

Further, the following can be attained by arranging the reproducing apparatus such that the synchronization executing program can reproduce only the content data item specified (declared) by the content data specifying information of the content management information. That is, the copyright holder of the content data item does not need to execute the synchronization executing program so as to check unauthorized use of the content data. In other words, the copyright holder of the content data item can check the unauthorized use of the content data by merely checking the static information, i.e., the content data specifying information provided outside the synchronization executing program.

Further, a reproducing apparatus according to the present invention may include: data acquiring means for acquiring content data items, a synchronization executing program, program management information, and verification-use information; decoding means for converting each of the content data items into reproduction data for reproduction output; and program executing means for executing the synchronization executing program, the program management information including at least authorization information which approves use of a content data item that is simultaneously used for the reproduction output together with the synchronization executing program, the reproducing apparatus, further including: verifying means for verifying, by using the verification-use information, authorization information of the content data item which the synchronization executing program instructs the decoding means to decode.

Further, a method, according to the present invention, for controlling a reproducing apparatus including decoding means, program executing means, data acquiring means, and verifying means may include the steps of: causing the data acquiring means to acquire content data items, a synchronization executing program, program management information, and verification-use information; causing the decoding means to convert each of the content data items into reproduction data for reproduction output; and causing the program executing means to execute the synchronization executing program, the program management information including at least authorization information which approves use of a content data item that is simultaneously used for the reproduction output together with the synchronization executing program, the reproducing apparatus, further including: verifying means for verifying, by using the verification-use information, authorization information of the content data item which the synchronization executing program instructs the decoding means to decode.

The above arrangements make it possible to verify, by using the verification-use information, whether or not the reproduction is carried out by using a synchronization executing program having program management information onto which appropriate authorization information is recorded. This makes it possible to verify whether or not the reproduction of the content data item is approved by the copyright holder of the content data item, which reproduction is carried out with the use of the currently executed synchronization executing program. This makes it possible to detect a reproduction operation carried out by a program that is not approved to reproduce the content data item, with the result that the content data item can be prevented from being reproduced without authorization. Note that the synchronization executing program is not limited to a program for generating the output data for use in the reproduction output. Note that, in the above arrangements, the synchronization executing program is not limited to a program for generating output data.

Further, it is preferable to arrange the reproducing apparatus according to the present invention such that: the verifying information is a public key, and the authorization information is information obtained by encrypting information specific to the synchronization executing program by using a private key corresponding to the public key, and the verifying means decrypts the authorization information by using the verification-use information, and carries out verification in accordance with a result obtained through the decrypting. Used as the "information specific to the synchronization executing program" can be (i) a code of the synchronization program, and (ii) a hash value obtained by carrying out a hash process with respect to the code of the synchronization program.

Further, the reproducing apparatus according to the present invention may be arranged such that: in cases where the authorization information is not so confirmed as to be appropriate as a result of the verification carried out by the verifying means, the program executing means terminates the execution of the synchronization executing program.

The arrangement makes it possible to prevent the content data item from being intentionally reproduced by the program which is not approved to reproduce the content data item, or from being reproduced by a bug of the program which is not approved to reproduce the content data item.

Note that the reproducing apparatus may be realized by a computer. In this case, the present invention encompasses (i) a control program for causing a computer to operate as the aforementioned various means, particularly the synchronization control means and the synchronization processing means, so that the reproducing apparatus is realized by the computer; and (ii) a computer-readable recording medium storing the control program.

Further, a content recording medium according to the present invention may be so arranged as to store at least any one of content data, a synchronization executing program, and synchronization timing information such that the content data, the synchronization executing program, and the synchronization timing information are able to be supplied to the reproducing apparatus.

Further, a content recording medium according to the present invention may be so arranged as to store content data and synchronization timing information such that the content data and the synchronization timing information are able to be supplied to the reproducing apparatus, the synchronization timing information being separated from the content data.

With the arrangement, the content data (video data) and the synchronization timing information are separately managed. This makes it easier to share one content data with a plurality of synchronization executing programs. Further, the synchronization timing information and each of the synchronization executing programs are managed as different files, so that the synchronization executing program does not need to be rewritten even in cases where the video data is edited after creating the program.

Further, a content recording medium may be so arranged as to store a synchronization executing program and synchronization timing information such that the synchronization executing program and the synchronization timing information are able to be supplied to the reproducing apparatus, the synchronization timing information being stored in a vicinity of the synchronization executing program.

With the above arrangement, the pickup travels only a short distance so as to read out these data when executing the synchronization executing program. This makes it possible to (i) shorten latency time required in starting the reproduction, and (ii) prevent discontinuity of the video reproduction, and (iii) restrain increase of power consumption and occurrence of noise.

Further, a content recording medium according to the present invention may be so arranged as to store a synchronization executing program and synchronization timing information such that the synchronization executing program and the synchronization timing information are able to be supplied to the reproducing apparatus, the synchronization timing information and the synchronization executing program being stored in a same file.

The above arrangement makes it possible to reduce the number of files to be read out, with the result that overhead occurring due to the readout is reduced.

Further, a content recording medium according to the present invention may be so arranged as to store at least any one of content data, a synchronization executing program, and synchronization timing information such that the content data, the synchronization executing program, and the synchronization timing information are able to be supplied to the reproducing apparatus.

Further, a content recording medium according to the present invention may be so arranged as to store at least content data items, program management information, and verification-use information items such that the content data items, the program management information, and the verification-use information items are able to be supplied to the reproducing apparatus, the program management information including at least authorization information which approves use of a content data item that is simultaneously used for reproduction output together with the synchronization executing program, the verification-use information items being included in the content data items, respectively.

Further, the content recording medium according to the present invention may be arranged such that the verification-use information items are multiplexed in each of the content data items with predetermined intervals therebetween.

With the arrangement, the pickup does not travel for the sake of reading out the verification-use information items, with the result that the latency time required in starting the reproduction is shortened. Note that the synchronization executing program may be stored in the content recording medium together with the content data items, the program management information, and the verification-use information items.

Further, the content recording medium according to the present invention may be arranged such that: each of the content data items has (i) a part in which a verification-use information item of the verification-use information items is used, and (ii) a part in which a different verification-use information item is used.

The above arrangement allows only the required part to be reproduced by the program.

Further, a data structure according to the present invention may include: a content data storing region for storing content data to be reproduced by a reproducing apparatus; a synchronization executing program storing region for storing a synchronization executing program to be executed by the reproducing apparatus in synchronization with the reproduction of the content data; and a synchronization timing information storing region for storing synchronization timing information indicating a timing at which the synchronization executing program is executed.

The arrangement allows realization of the content recording medium storing these data, with the result that these data can be supplied to the reproducing apparatus with ease.

Further, a data structure according to the present invention may include: a content data storing region for storing content data items to be reproduced by a reproducing apparatus; a synchronization executing program storing region for storing synchronization executing programs to be executed by the reproducing apparatus in synchronization with the reproduction of the content data items, respectively; and a program management information storing region for storing program management information items each including (i) a program specifying information item for specifying a program to be simultaneously used for reproduction output together with a content data item, and (ii) a content data specifying information item for specifying the content data item to be simultaneously used for the reproduction output together with the program.

The arrangement allows realization of the content recording medium storing these data, with the result that these data can be supplied to the reproducing apparatus with ease.

Further, the data structure according to the present invention may be arranged such that: each of the program management information items includes at least authorization information which approves use of the content data item that is simultaneously used for the reproduction output together with the synchronization executing program, and each of the content data items includes verification-use information for verifying the authorization information.

The arrangement allows realization of the content recording medium storing these data, with the result that these data can be supplied to the reproducing apparatus with ease.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

A reproducing apparatus of the present invention makes it possible to execute a program in synchronization with reproduction of AV data or the like. For this reason, the reproducing apparatus can be suitably used for a video player for overlaying, with currently reproduced video data, a graphic output generated by using a computer program; and the like.

The invention claimed is:

1. A reproducing apparatus, comprising:
   a data acquiring section for acquiring (i) video data, (ii) a program for reproducing the video data, (iii) a play list or play lists each indicating (a) the video data to be reproduced by the program and (b) an order in which the video data is reproduced, and (iv) program management information for controlling execution of the program; and
   a program executing section for executing the program,
   the program management information including specifying information which specifies the play list to be reproduced by the program, and
   the reproducing apparatus selectively permitting the program, which is to be executed by the program executing section, to reproduce the play list specified by the specifying information, and, when the program is not permitted to reproduce the play list, terminating execution of the program.

2. The reproducing apparatus as set forth in claim 1, wherein:
   the data acquiring section acquires plural pieces of the program management information for controlling a plurality of programs, respectively and
   for each of the programs, the reproducing apparatus permits the program, which is controlled by corresponding one of the plural pieces of program management information, to reproduce the play list specified by the specifying information included in the corresponding one of the plural pieces of program management information.

3. A non-transitory computer-readable recording medium on which a control program for causing a computer to operate as a reproducing apparatus is stored, the control program causing the computer to execute the steps of:
   (A) acquiring (i) video data, (ii) a program for reproducing the video data, (iii) a play list or play lists each indicating (a) the video data to be reproduced by the program and (b) an order in which the video data is reproduced, and (iv) program management information for controlling execution of the program, the program management information including specifying information which specifies the play list to be reproduced by the program;
   (B) executing the program; and
   (C) selectively permitting the program, which is executed in step (B), to reproduce the play list specified by the specifying information, and, when the program is not permitted to reproduce the play list, terminating execution of the program.

4. A method of reproducing video data on a reproducing apparatus, comprising the steps of:
   (A) acquiring (i) video data, (ii) a program for reproducing the video data, (iii) a play list or play lists each indicating (a) the video data to be reproduced by the program and (b) an order in which the video data is reproduced, and (iv) program management information for controlling execution of the program, the program management information including specifying information which specifies the play list to be reproduced by the program;
   (B) executing the program; and
   (C) selectively permitting the program, which is executed in step (B), to reproduce the play list specified by the specifying information, and, when the program is not permitted to reproduce the play list, terminating execution of the program.

* * * * *